US011073604B2

(12) United States Patent
Hallstig et al.

(10) Patent No.: US 11,073,604 B2
(45) Date of Patent: Jul. 27, 2021

(54) SCANNING LIDAR SYSTEM AND METHOD

(71) Applicant: Veoneer US, Inc., Southfield, MI (US)

(72) Inventors: Emil Hallstig, Southfield, MI (US);
Jonas Wihlbeck, Southfield, MI (US);
Peter Hansson, Southfield, MI (US);
Bernard de Mersseman, Southfield,
MI (US); Kenneth Puglia, Southfield,
MI (US)

(73) Assignee: VEONEER US, INC., Southfield, MI (US)

( * ) Notice: Subject to any disclaimer, the term of this patent is extended or adjusted under 35 U.S.C. 154(b) by 0 days.

(21) Appl. No.: 16/810,205

(22) Filed: Mar. 5, 2020

(65) Prior Publication Data

US 2020/0200879 A1    Jun. 25, 2020

Related U.S. Application Data

(63) Continuation of application No. 15/895,460, filed on Feb. 13, 2018, now Pat. No. 10,613,200, which is a (Continued)

(51) Int. Cl.
G01S 7/481    (2006.01)
G01S 7/487    (2006.01)
(Continued)

(52) U.S. Cl.
CPC .......... G01S 7/4817 (2013.01); G01S 7/4811 (2013.01); G01S 7/4812 (2013.01); G01S 7/4815 (2013.01);
(Continued)

(58) Field of Classification Search
None
See application file for complete search history.

(56) References Cited

U.S. PATENT DOCUMENTS 3,712,985 A    1/1973 Swarner et al.
4,125,864 A    11/1978 Aughton
(Continued)

FOREIGN PATENT DOCUMENTS

AT    509180 B1    1/2016
DE    19757840 C1    9/1999
(Continued)

OTHER PUBLICATIONS

Church et al., "Evaluation of a steerable 3D laser scanner using a double Risley prism pair," SPIE Paper.
(Continued)

Primary Examiner — Eric L Bolda
(74) Attorney, Agent, or Firm — Burns & Levinson LLP; Steven M. Mills

(57) ABSTRACT

A LiDAR detection system includes optical sources generating a plurality of output optical signals disposed along a first direction. A modulation circuit applies an output signal from a signal generator to the optical sources to modulate the output optical signals such that the output optical signals are envelope-modulated output optical signals having frequency-modulated modulation envelopes. A scanning device scans the output optical signals into a region over a second direction. A receiver comprising a two-dimensional array of optical detectors receives return optical signals and generates receive signals indicative of the return optical signals. The return optical signals impinge on a mask between the region and the array, the mask comprising a plurality of apertures aligned with a first dimension of the array. The receive signals are generated for a set of detectors in the array disposed along the first dimension of the array and aligned with the mask apertures.

17 Claims, 65 Drawing Sheets

Related U.S. Application Data continuation-in-part of application No. 15/813,404, filed on Nov. 15, 2017, now Pat. No. 10,838,043, and a continuation-in-part of application No. 15/708,412, filed on Sep. 19, 2017.

(51) Int. Cl.
*G01S 7/493* (2006.01)
*G01S 7/4863* (2020.01)
*G01S 7/4914* (2020.01)
*G01S 17/931* (2020.01)

(52) U.S. Cl.
CPC .......... *G01S 7/4816* (2013.01); *G01S 7/4863* (2013.01); *G01S 7/4876* (2013.01); *G01S 7/493* (2013.01); *G01S 7/4914* (2013.01); *G01S 17/931* (2020.01)

(56) References Cited

U.S. PATENT DOCUMENTS

| | | | |
|---|---|---|---|
| 4,184,154 A | 1/1980 | Albanese et al. | |
| 4,362,361 A | 12/1982 | Campbell et al. | |
| 4,439,766 A | 3/1984 | Kobayashi et al. | |
| 4,765,715 A | 8/1988 | Matsudaira et al. | |
| 4,957,362 A | 9/1990 | Peterson | |
| 5,200,606 A | 4/1993 | Krasutsky et al. | |
| 5,210,586 A | 5/1993 | Grage et al. | |
| 5,274,379 A | 12/1993 | Carbonneau et al. | |
| 5,428,215 A | 6/1995 | Dubois et al. | |
| 5,604,695 A | 2/1997 | Cantin et al. | |
| 5,793,491 A | 8/1998 | Wangler et al. | |
| 5,889,490 A | 3/1999 | Wachter et al. | |
| 5,966,226 A | 10/1999 | Gerber | |
| 6,078,395 A | 6/2000 | Jourdain et al. | |
| 6,437,854 B2 | 8/2002 | Hahlweg | |
| 6,556,282 B2 | 4/2003 | Jamieson et al. | |
| 6,559,932 B1 | 5/2003 | Halmos | |
| 7,202,941 B2 | 4/2007 | Munro | |
| 7,227,116 B2 | 6/2007 | Gleckler | |
| 7,272,271 B2 | 9/2007 | Kaplan et al. | |
| 7,440,084 B2 | 10/2008 | Kane | |
| 7,483,600 B2 | 1/2009 | Achiam et al. | |
| 7,489,865 B2 | 2/2009 | Varshneya et al. | |
| 7,544,945 B2 | 6/2009 | Tan et al. | |
| 7,570,347 B2 | 8/2009 | Ruff et al. | |
| 7,675,610 B2 | 3/2010 | Redman et al. | |
| 7,832,762 B2 | 11/2010 | Breed | |
| 8,044,999 B2 | 10/2011 | Mullen et al. | |
| 8,050,863 B2 | 11/2011 | Trepagnier et al. | |
| 8,134,637 B2 | 3/2012 | Rossbach et al. | |
| 8,223,215 B2 | 7/2012 | Oggier et al. | |
| 8,363,511 B2 | 1/2013 | Frank et al. | |
| 8,508,723 B2 | 8/2013 | Chang et al. | |
| 8,629,975 B1 | 1/2014 | Dierking et al. | |
| 8,742,325 B1 | 6/2014 | Droz et al. | |
| 8,836,761 B2 | 9/2014 | Wang et al. | |
| 8,836,922 B1 | 9/2014 | Pennecot et al. | |
| 8,879,050 B2 | 11/2014 | Ko | |
| 9,007,569 B2 | 4/2015 | Amzajerdian et al. | |
| 9,063,549 B1 | 6/2015 | Pennecot et al. | |
| 9,086,273 B1 | 7/2015 | Gruver et al. | |
| 9,090,213 B2 | 7/2015 | Lawlor et al. | |
| 9,097,646 B1 | 8/2015 | Campbell et al. | |
| 9,140,792 B2 | 9/2015 | Zeng | |
| 9,157,790 B2 | 10/2015 | Shpunt et al. | |
| 9,267,787 B2 | 2/2016 | Shpunt et al. | |
| 9,285,477 B1 | 3/2016 | Smith et al. | |
| 9,575,162 B2 | 2/2017 | Owechko | |
| 9,618,742 B1 | 4/2017 | Droz et al. | |
| 9,651,417 B2 | 5/2017 | Shpunt et al. | |
| 9,658,322 B2 | 5/2017 | Lewis | |
| 9,696,427 B2 | 7/2017 | Wilson et al. | |
| 9,711,493 B2 | 7/2017 | Lin | |
| 9,753,351 B2 | 9/2017 | Eldada | |
| 9,823,351 B2 | 11/2017 | Haslim et al. | |
| 9,857,472 B2 | 1/2018 | Mheen et al. | |
| 9,869,754 B1 | 1/2018 | Campbell et al. | |
| 10,018,725 B2 | 7/2018 | Liu | |
| 10,018,726 B2 | 7/2018 | Hall et al. | |
| 10,024,655 B2 | 7/2018 | Raguin et al. | |
| 10,078,133 B2 | 9/2018 | Dussan | |
| 10,088,557 B2 | 10/2018 | Yeun | |
| 10,148,060 B2 | 12/2018 | Hong et al. | |
| 10,175,360 B2 | 1/2019 | Zweigle et al. | |
| 10,183,541 B2 | 1/2019 | Van Den Bossche et al. | |
| 10,411,524 B2 | 9/2019 | Widmer et al. | |
| 10,416,292 B2 | 9/2019 | de Mersseman et al. | |
| 10,473,767 B2 | 11/2019 | Xiang et al. | |
| 10,473,784 B2 | 11/2019 | Puglia | |
| 10,473,943 B1 | 11/2019 | Hughes | |
| 10,557,923 B2 | 2/2020 | Watnik et al. | |
| 10,558,044 B2 | 2/2020 | Pan | |
| 10,564,268 B2 | 2/2020 | Turbide et al. | |
| 10,578,724 B2 | 3/2020 | Droz et al. | |
| 10,678,117 B2 | 6/2020 | Shin et al. | |
| 2001/0052872 A1 | 12/2001 | Hahlweg | |
| 2003/0043363 A1 | 3/2003 | Jamieson et al. | |
| 2004/0028418 A1 | 2/2004 | Kaplan et al. | |
| 2004/0031906 A1 | 2/2004 | Glecker | |
| 2004/0135992 A1 | 7/2004 | Munro | |
| 2006/0221250 A1 | 10/2006 | Rossbach et al. | |
| 2006/0232052 A1 | 10/2006 | Breed | |
| 2007/0140613 A1 | 6/2007 | Achiam et al. | |
| 2007/0181810 A1 | 8/2007 | Tan et al. | |
| 2007/0219720 A1 | 9/2007 | Trepagnier et al. | |
| 2008/0088499 A1 | 4/2008 | Bonthron et al. | |
| 2008/0219584 A1 | 9/2008 | Mullen et al. | |
| 2008/0246944 A1 | 10/2008 | Redman et al. | |
| 2009/0002680 A1 | 1/2009 | Ruff et al. | |
| 2009/0010644 A1 | 1/2009 | Varshneya et al. | |
| 2009/0190007 A1 | 7/2009 | Oggier et al. | |
| 2010/0157280 A1 | 6/2010 | Kusevic et al. | |
| 2010/0182874 A1 | 7/2010 | Frank et al. | |
| 2012/0075422 A1 | 3/2012 | Wang et al. | |
| 2012/0206712 A1 | 8/2012 | Chang et al. | |
| 2012/0236379 A1 | 9/2012 | da Silva et al. | |
| 2012/0310516 A1 | 12/2012 | Zeng | |
| 2012/0310519 A1 | 12/2012 | Lawlor et al. | |
| 2013/0088726 A1* | 4/2013 | Goyal | G01S 17/10 356/634 |
| 2013/0093584 A1 | 4/2013 | Schumacher | |
| 2013/0120760 A1 | 5/2013 | Raguin et al. | |
| 2013/0206967 A1 | 8/2013 | Shpunt et al. | |
| 2013/0207970 A1 | 8/2013 | Shpunt et al. | |
| 2013/0250276 A1 | 9/2013 | Chang et al. | |
| 2014/0036252 A1 | 2/2014 | Amzajerdian et al. | |
| 2014/0049609 A1 | 2/2014 | Wilson et al. | |
| 2014/0152975 A1 | 6/2014 | Ko | |
| 2014/0168631 A1 | 6/2014 | Haslim et al. | |
| 2014/0313519 A1 | 10/2014 | Shpunt et al. | |
| 2015/0009485 A1 | 1/2015 | Mheen et al. | |
| 2015/0055117 A1 | 2/2015 | Pennecot et al. | |
| 2015/0260843 A1 | 9/2015 | Lewis | |
| 2015/0301162 A1 | 10/2015 | Kim | |
| 2015/0371074 A1 | 12/2015 | Lin | |
| 2015/0378011 A1 | 12/2015 | Owechko | |
| 2016/0047895 A1 | 2/2016 | Dussan | |
| 2016/0178749 A1 | 6/2016 | Lin et al. | |
| 2016/0200161 A1 | 7/2016 | Van Den Bossche et al. | |
| 2016/0245902 A1 | 8/2016 | Watnik et al. | |
| 2016/0291160 A1 | 10/2016 | Zweigle et al. | |
| 2016/0357187 A1 | 12/2016 | Ansari | |
| 2016/0363669 A1 | 12/2016 | Liu | |
| 2016/0380488 A1 | 12/2016 | Widmer et al. | |
| 2017/0090013 A1 | 3/2017 | Paradie et al. | |
| 2017/0269215 A1 | 9/2017 | Hall et al. | |
| 2017/0285346 A1 | 10/2017 | Pan | |
| 2017/0307736 A1 | 10/2017 | Donovan | |
| 2018/0052378 A1 | 2/2018 | Shin et al. | |
| 2018/0241477 A1 | 8/2018 | Turbide et al. | |
| 2018/0341009 A1 | 11/2018 | Niclass et al. | |
| 2018/0364334 A1 | 12/2018 | Xiang et al. | |
| 2018/0372870 A1 | 12/2018 | Puglia | |

(56) References Cited

U.S. PATENT DOCUMENTS

| | | |
|---|---|---|
| 2019/0101644 A1 | 4/2019 | DeMersseman et al. |
| 2019/0129009 A1 | 5/2019 | Eichenholz et al. |
| 2019/0146060 A1 | 5/2019 | Qiu et al. |
| 2019/0195990 A1 | 6/2019 | Shand |
| 2019/0235064 A1 | 8/2019 | Droz et al. |
| 2020/0081129 A1 | 3/2020 | de Mersseman et al. |
| 2020/0088847 A1 | 3/2020 | DeMersseman et al. |

FOREIGN PATENT DOCUMENTS

| | | |
|---|---|---|
| DE | 102004033944 A | 2/2006 |
| DE | 102006031114 B4 | 7/2008 |
| DE | 102008045387 A1 | 3/2010 |
| DE | 102015217908 A | 3/2017 |
| EP | 0112188 B1 | 6/1987 |
| EP | 0578129 A2 | 1/1994 |
| EP | 2696166 A3 | 12/2014 |
| EP | 2824418 A1 | 1/2015 |
| EP | 3203259 A1 | 8/2017 |
| EP | 3457080 A1 | 3/2019 |
| EP | 3147685 B1 | 1/2020 |
| WO | 1994019705 | 9/1994 |
| WO | 2008008970 A3 | 1/2008 |
| WO | 2015014556 A3 | 2/2015 |
| WO | 2016097409 A3 | 6/2016 |
| WO | 2019050643 A1 | 3/2019 |
| WO | 2019099166 A1 | 5/2019 |

OTHER PUBLICATIONS

Luhmann, "A historical review on panorama photogrammetry," http://www.researchgate.net/publication/228766550.

International Search Report and Written Opinion for International Application No. PCT/US2020/039760, dated Sep. 18, 2020.

Kasturi et al., UAV-Borne LiDAR with MEMS Mirror Based Scanning Capability; SPIE Defense and Commercial Sensing Conference 2016, Baltimore, MD; 10 pages, 2016.

Internet URL: https://www.continental-automotive.com/en-gl/Passenger-Cars/Chassis-Safety/Advanced-Driver-Assistance-Systems/Cameras [retrieved on Dec. 20, 2018].

Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].

Hi-Res 3d Flash LIDAR will Supplement Continental's Existing Portfolio for Automated Driving [online], Press Release, Mar. 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driving-15758.

A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_lasersensors_in_self-driving_carsjsp.

Hewlett-Packard Application Note 77-4, Swept-Frequency Group Delay Measurements, Hewlett-Packard Co., September, 7 pages, 1968.

Kravitz et al., High-Resolution Low-Sidelobe Laser Ranging Based on Incoherent Pulse Compression, IEEE Jhotonic,s Technology Letters, vol. 24, No. 23, pp. 2119-2121, 2012.

Journet et al., A Low-Cost Laser Range Finder Based on an FMCW-like Method, IEEE Transactions on nstrumentation and Measurement, vol. 49, No. 4, pp. 840-843, 2000.

Campbell et al., Advanced Sine Wave Modulation of Continuous Wave Laser System for Atmospheric CO2 Differential Absorption Measurements; NASA Langley Research Center, 32 pages, 2018.

Levanon et al., Non-coherent Pulse Compression-Aperiodic and Periodic Waveforms; The Institution of Engineering and Technology, 9 pages, 2015.

Peer et al., Compression Waveforms for Non-Coherent Radar, Tel Aviv University, 6 pages, 2018.

Li, Time-of-Flight Camera—An Introduction, Technical White Paper, SLOA190B, Texas Instruments, 10 pages, 2014.

Pierrottet et al., Linear FMCW Laser Radar for Precision Range and Vector Velocity Measurements, Coherent Applications, Inc., NASA Langley Research Center, 9 pages, 2018.

Kahn, Modulation and Detection Techniques for Optical Communication Systems, Stanford University, Department of Electrical Engineering, 3 pages, 2006.

Niclass et al., Development of Automotive LIDAR, Electronics and Communications in Japan, vol. 98, No. 5, 6 pages, 2015.

Su et al, 2-D FFT and Time-Frequency Analysis Techniques for Multi-Target Recognition of FMCW Radar Signal, Proceedings of the Asia-Pacific Microwave Conference 2011, pp. 1390-1393.

Wojtkiewicz et al, Two-Dimensional Signal Processing in FMCW Radars, Instytut Podstaw Elektroniki Politechnika Warszawska, Warszawa, 6 pages, 2018.

Winkler, Range Doppler Detection for Automotive FMCW Radars, Proceedings of the 4th European Radar Conference, Munich Germany, 4 pages, 2007.

Li et al., Investigation of Beam Steering Performances in Rotation Risley-Prism Scanner, Optics Express, vol. 24, No. 12, 11 pages, 2016.

Thorlabs Application Note, Risley Prism Scanner, 33 pages, 2018.

Simpson et al., Intensity-Modulated, Stepped Frequency CW Lidar for Distributed Aerosol and Hard Target Measurements, Applied Optics, vol. 44, No. 33, pp. 7210-7217, 2005.

Skolnik, Introduction to Radar Systems, 3rd Edition, McGraw-Hill, New York, NY 2001, pp. 45-48.

Wang et al., Range-Doppler image processing in linear FMCW Radar and FPGA Based Real-Time Implementation, Journal of Communication and Computer, vol. 6, No. 4, 2009.

International Search Report and Written Opinion for International Application No. PCT/US2018/057727 dated Jan. 28, 2019.

International Search Report and Written Opinion for International Application No. PCT/US2018/052837 dated Jan. 24, 2019.

International Search Report and Written Opinion for International Application No. PCT/US2017/033263 dated Aug. 29, 2017.

International Search Report and Written Opinion for International Application No. PCT/US2018/048869 dated Nov. 8, 2018.

International Search Report and Written Opinion for International Application No. PCT/US2018/051281 dated Nov. 22, 2018.

International Search Report and Written Opinion for International Application No. PCT/US2018/054992 dated Dec. 11, 2018.

International Search Report and Written Opinion for International Application No. PCT/US2018/049038 dated Dec. 12, 2018.

International Search Report and Written Opinion for International Application No. PCT/US2017/033265 dated Sep. 1, 2017.

International Search Report and Written Opinion for International Application No. PCT/US2017/033271 dated Sep. 1, 2017.

Invitation to Pay Additional Fees for International Application No. PCT/US2018/052849 dated Mar. 8, 2019.

http://www.advancedscientificconcepts.com/products/overview.html.

Roncat, Andreas, The Geometry of Airbome Laser Scanning in a Kinematical Framework, Oct. 19, 2016, www.researchgate.net/profile/Andreas_Roncat/publication/310843362_The_Geometry_of_Airborne_Laser_Scanningin_a_Kinematical_Frameworldinks/5839add708ae3a74b49ea03b1The-Geometry-of-Airbome-Laser-Scanning-in-a-Kinematical-Framework.pdf.

International Search Report and Written Opinion for International Application No. PCT/US2020/064474, dated Apr. 1, 2021.

\* cited by examiner

FMCW I/Q LiDAR Parametric Data Summary

| Parameter | Symbol | Value | Units | Note/Comment |
|---|---|---|---|---|
| Frequency Deviation | $\Delta F$ | 128 | MHz | |
| Time Interval \| Ramp Time | $\Delta T$ | 128 | usec | |
| Nominal Modulation Frequency | $f_m$ | 1000 | MHz | $\lambda_m$ = 0.30 meter |
| Sample Rate, Range | $f_{sR}$ | $2.0 \cdot 10^6$ | SPS | $f_{sR} = N/\Delta T$ |
| Sample Rate, Doppler | $f_{sD}$ | $7.8125 \cdot 10^3$ | SPS | $f_{sD} = 1/\Delta T$ |
| Maximum Range | $R_{max}$ | 150 | meter | |
| Range Resolution | $\delta R$ | 1.2 | meter | $\delta R = c/2 \cdot \Delta F$ |
| Number of Range Samples | $N$ | 256 | - | |
| Range Bandwidth | $B_{wR}$ | 7812.5 | Hz | $B_{wR} = f_{sR}/N$ |
| Number of Doppler Samples | $M$ | 128 | - | |
| Doppler Bandwidth | $B_{wD}$ | 61.0 | Hz | $B_{wD} = f_{sD}/M$ |
| Maximum Closing Velocity | $v_{max}$ | 70 | meter/sec | 70 meter/sec $\Rightarrow$ 250 kph |
| Maximum Doppler Frequency | $f_{D\_max}$ | 466 | Hz | $f_{d\_max} = 2 \cdot v_{max} / \lambda_m$ |
| Target Dwell Time | $T_{dw}$ | 16.7 | msec | single range bin |
| Data Acquisition Time | $T_{acq}$ | 16.4 | msec | $T_{acq} = M \cdot \Delta T$ |
| Process Gain, Range FFT | $PG_{R\_dB}$ | 24.1 | dB | $10 \cdot \log(N)$ (estimate) |
| Process Gain, Doppler FFT | $PG_{D\_dB}$ | 21.1 | dB | $10 \cdot \log(M)$ (estimate) |
| Data Matrix Dimension | $M \times N$ | 128 x 256 | - | |

*Fig. 18*

| Parameter | Symbol | Value | Units | Note/Comment |
|---|---|---|---|---|
| Scanning mirror angular extent | $\theta_{tot}$ | 24 | ° | $-12° < \theta_{tot} < +12°$ |
| Scanning mirror resolution | $\theta_{3\,dB}$ | 0.1 | ° | scan mirror 3 dB beamwidth |
| Number of scan increments | $k$ | 240 | - | $k = \theta_{tot} / \theta_{3\,dB}$ |
| Frequency Step Increment | $\Delta f$ | 0.50 | MHz | |
| Time Increment (PRF) | $\Delta t$ | 2.0 | usec | |
| Burst Modulation Frequency | $f_m$ | 1000 | MHz | $\lambda_m = 0.30$ meter |
| Burst Pulse Width | $\tau_w$ | 100 | nsec | |
| Pulse Burst Repetition Time | $T_{prf}$ | 2.0 | usec | |
| ADC Sample Rate | $f_s$ | 10.0 | MSPS | $f_s = 1/\tau_w$ |
| Number of Frequency Steps | $n$ | 256 | – | also the number of scans |
| Transmission Bandwidth | $B_T$ | 128 | MHz | $B_T = n \cdot \Delta f$ |
| Maximum Range | $R_{max}$ | 150 | meter | |
| Unambiguous Range | $R_{un}$ | 300 | meter | $R_{un} = c \cdot T_{prf} / 2$ |
| Number of Range Bin Samples | $N$ | 10 | – | |
| Pre-Processing Range Resolution | $\delta R_p$ | 15 | meter | $\delta R_p = c\tau_w/2$ |
| Post-Processing Range Resolution | $\delta R$ | 1.2 | meter | $\delta R = c/2n\Delta f$ |
| Maximum Closing Velocity | $v_{max}$ | 70 | meter/sec | 70 meter/sec ⇒250kph |
| Object Dwell Time | $T_{dw}$ | 0.214 | sec | $T_{dw} = \delta R_p / v_{max}$ |
| Data Acquisition Time | $T_{acq}$ | 0.123 | sec | $T_{acq} = k \cdot n \cdot T_{prf}$ |
| FFT Sample Rate | $f_{s\_FFT}$ | 976 | Hz | $f_{s\_FFT} = 1/2 \cdot n \cdot T_{prf}$ |
| Bandwidth of LPF | $B_w$ | 10.0 | MHz | $B_w = 1/\tau w$ |
| FFT Resolution Bandwidth | $B_{w\_FFT}$ | 3.8 | Hz | $B_{w\_FFT} = f_{s\_FFT}/n$ |
| Process Gain | $PG_{dB}$ | 24.1 | dB | $PG_{dB} = 10 \cdot \log(n)$ |
| Data Matrix Dimension | $k \times N$ | 240x10 | – | $n$ data matrices are required |

*Fig. 28*

Data Matrix for a Single Scan Angle Position

| Frequency Ramp Number | | | | | |
|---|---|---|---|---|---|
| n | $data_{n,1}$ | $data_{n,2}$ | ... | $data_{n,N-1}$ | $data_{n,N}$ |
| n-1 | $data_{n-1,1}$ | $data_{n-1,2}$ | ... | $data_{n-1,N-1}$ | $data_{n,N}$ |
| ... | ... | ... | ... | ... | ... |
| 2 | $data_{2,1}$ | $data_{2,2}$ | ... | $data_{2,N-1}$ | $data_{2,N}$ |
| 1 | $data_{1,1}$ | $data_{1,2}$ | ... | $data_{1,N-1}$ | $data_{1,N}$ |

Data Sample Point $\Delta T$ $n \cdot \Delta T$

FMCW Synthetic Doppler Simulation Parameters

Data for Single Beam Angle

| Parameter | Symbol | Value | Units | Note/Comment |
|---|---|---|---|---|
| Ramp Frequency Deviation | $\Delta F$ | 100 | MHz | |
| Ramp Time Duration | $\Delta T$ | 10.0 | usec | I-Ch and Q-Ch data acquisition |
| Number of Range FFT Points | $N$ | 512 | - | |
| Number of Doppler FFT Points | $n$ | 128 | - | |
| Object Range | $R$ | 75 | meter | |
| Range Measurement Resolution | $\delta R$ | 1.5 | meter | $\delta R = c/2\Delta F$ |
| IF Frequency at R = 75 meters | $f_{IF}$ | 5.0 | MHz | |
| ADC Sample Rate, Range Data | $f_s$ | 51.2 | MHz | $f_s = N/\Delta T$ |
| Number of Ramps | $n$ | 128 | - | Doppler CFFT dimension |
| Input Signal-to-Noise Ratio | $SNR$ | 0.0 | dB | SNR at ADC input |
| Data Acquisition Time | $T_{acq}$ | 1.28 | msec | $T_{acq} = n \cdot \Delta T$; limited by ramp rate |
| Expected Range FFT Processing Gain | $PG_{R\_dB}$ | 27.1 | dB | $10 \cdot \log(N)$ |
| Expected Doppler FFT Processing Gain | $PG_{D\_dB}$ | 21.1 | dB | $10 \cdot \log(n)$ |
| Expected Total 2-D FFT Processing Gain | $PG_{dB}$ | 48.2 | dB | $10 \cdot \log(n \cdot N)$ |

*Fig. 32*

Supplementary Data for Simulation Results B

Range CFFT MathCad Program Script

Defines CFFT single row of data from an FMCW LiDAR with parameters: R = 75 meters, ΔF = 100MHz, ΔT = 10 usec, amplitude $A_O$ = 1.0, noise = 1.0.

IF Signal amplitude   Index        IF Signal frequency $$FFT_R := \begin{vmatrix} A_o \leftarrow 1.0 \\ for\ i \in 0\_N\text{-}1 \\ \quad \begin{vmatrix} \phi_i \leftarrow 2\pi \cdot \frac{2R}{c'} \cdot \frac{\Delta F}{\Delta T} \cdot \frac{i}{N} \\ S_{IF_i} \leftarrow [A_o \cdot cos(\phi_i) + r] + rnd(25) + j \cdot [(A_o \cdot sin(\phi_i)) - rnd(25)] \\ i \leftarrow i + 1 \end{vmatrix} \\ FFT_R \leftarrow CFFT(S_{IF}) \end{vmatrix}$$

Complex FFT    IF Signal + Noise

'Doppler' CFFT MathCad Program Script

Populates a single column of data at range bin 320 from an FMCW LiDAR with parameters: R = 75 meters, ΔF = 100 MHz, ΔT = 10 usec, amplitude $A_O$ = 1.0, noise = 1.0. Each data point is incremented with a differential phase shift of $r \cdot \Delta\phi$.

Incremental phase    Index        IF signal frequency $$FFT_D := \begin{vmatrix} \Delta\phi \leftarrow \frac{3.0 \cdot \pi}{4} \\ n \leftarrow 127 \\ c \leftarrow 0 \\ for\ r \in 0\_n \\ \quad \begin{vmatrix} for\ i \in 0\_N\text{-}1 \\ \quad \begin{vmatrix} \phi_i \leftarrow 2\pi \cdot \frac{2R}{c'} \cdot \frac{\Delta F}{\Delta T} \cdot \frac{i}{N} \\ S_{IF_i} \leftarrow [A_o \cdot cos(\phi_i + r \cdot \Delta\phi) + rnd(25) - rnd(25)] + j \cdot [A_o \cdot sin(\phi_i + r \cdot \Delta\phi) + (rnd(25) - rnd(25))] \end{vmatrix} \\ FFT_R \leftarrow CFFT(S_{IF}) \\ M_{r,c} \leftarrow FFT_{R_{320}} \\ i \leftarrow i + 1 \\ r \leftarrow r + 1 \end{vmatrix} \\ M \end{vmatrix}$$

IF signal + noise and phase shift $r \cdot \Delta\phi$

Column data    Complete FFT

Complex FFT must be executed for each N row of range bin data!

*Fig. 36*

FMCW Data Acquisition Time Calculation

Data for k = 50 Beam Angle Positions

| Parameter | Symbol | Value | Units | Note/Comment |
|---|---|---|---|---|
| Scan time | $T_{scan}$ | 500 | usec | |
| Scan angle extent | $\phi_{tot}$ | 50 | ° | |
| Scan beamwidth | $\Delta\phi_{-3\_dB}$ | 1.0 | ° | Scan angle resolution |
| Number of beam positions | $k$ | 50 | - | $k = \phi_{tot} / \Delta\phi_{-3\_dB}$ |
| Beam angular velocity | $v_{ang}$ | $1.0 \cdot 10^5$ | °/sec | $v_{ang} = \phi_{tot} / T_{scan}$ |
| Beam position dwell time | $T_{dw}$ | 10.0 | usec | $T_{dw} = \Delta\phi_{-3\_dB} / v_{ang}$ | limited by DDS $\Delta T$ |
| Frequency ramp duration | $\Delta T$ | 10.0 | usec | Note same as beam position dwell time |
| Number of Scans | $n$ | 128 | - | |
| Number of range FFT data points | $N$ | 512 | - | |
| ADC sample rate | $f_s$ | 51.2 | MSPS | $f_s = N/T_{dw}$ |
| Processing gain | $PG_{dB}$ | 48.2 | dB | $10 \cdot \log(n \cdot N)$ |

$T_{acq} = n \cdot T_{scan} = 0.064$ second

Data Matrix for a Single Scan Angle Position

| Pulse or Frame Number | | | | |
|---|---|---|---|---|
| $data_{n,1}$ | $data_{n,2}$ | ⋯ | $data_{n,N-1}$ | $data_{n,N}$ |
| $data_{n-1,1}$ | $data_{n-1,2}$ | ⋯ | $data_{n-1,N-1}$ | $data_{2,N}$ |
| ⋯ | ⋯ | ⋯ | ⋯ | ⋯ |
| $data_{2,1}$ | $data_{2,2}$ | ⋯ | $data_{2,N-1}$ | $data_{2,N}$ |
| $data_{1,1}$ | $data_{1,2}$ | ⋯ | $data_{1,N-1}$ | $data_{1,N}$ |

Horizontal extent: $n \cdot T_{PRF}$

Vertical axis: Data Sample Point (Receive Interval)

Row labels (top to bottom): $n$, $n-1$, ⋯, $2$, $1$

| data*$_{n,1}$ | data*$_{n,2}$ | ⋯ | data*$_{n,N-1}$ | data*$_{n,N}$ |
| --- | --- | --- | --- | --- |
| data*$_{n-1,1}$ | data*$_{n-1,2}$ | ⋯ | data*$_{n-1,N-1}$ | data*$_{n,N}$ |
| ⋮ | ⋮ | ⋮ | ⋮ | ⋮ |
| data*$_{2,1}$ | data*$_{2,2}$ | ⋯ | data*$_{2,N-1}$ | data*$_{2,N}$ |
| data*$_{1,1}$ | data*$_{1,2}$ | ⋯ | data*$_{1,N-1}$ | data*$_{1,N}$ |

Repopulated Data Matrix(*)

Pulse or Frame Number: $n$, $n-1$, ⋯, $2$, $1$

Range Bins: $1, 2, \ldots, N-1, N$

Fig. 40D

Pulsed Synthetic Doppler Simulation Parameters

Data for Single Beam Angle

| Parameter | Symbol | Value | Units | Note/Comment |
|---|---|---|---|---|
| Pulse Width | $\tau_w$ | 20.0 | nsec | |
| Pulse Repetition Frequency | $T_{prf}$ | 2.0 | usec | |
| Transmit Duty Cycle | $DC$ | 1.0 | % | |
| Maximum Range | $R_{max}$ | 300 | meter | Unambiguous range |
| Range Measurement Resolution | $\delta R$ | 3.0 | meter | $\delta R = c \cdot \tau_w / 2$ |
| Number of Range Bins | $N$ | 100 | - | $N = R_{max} / \delta R$ |
| Number of Frames | $n$ | 512 | - | |
| Data Acquisition Time | $T_{acq}$ | 1.024 | msec | $T_{acq} = n \cdot T_{prf}$ |
| ADC Sample Rate | $f_s$ | 50 | MHz | $f_s = 1/\tau_w = N/T_{prf}$, single sample per $\delta R$ |
| Input Signal-to-Noise Ratio | $SNR$ | 0.0 | dB | |
| Estimated Processing Gain | $PG_{dB}$ | 27.1 | dB | $10 \cdot \log(n)$ |

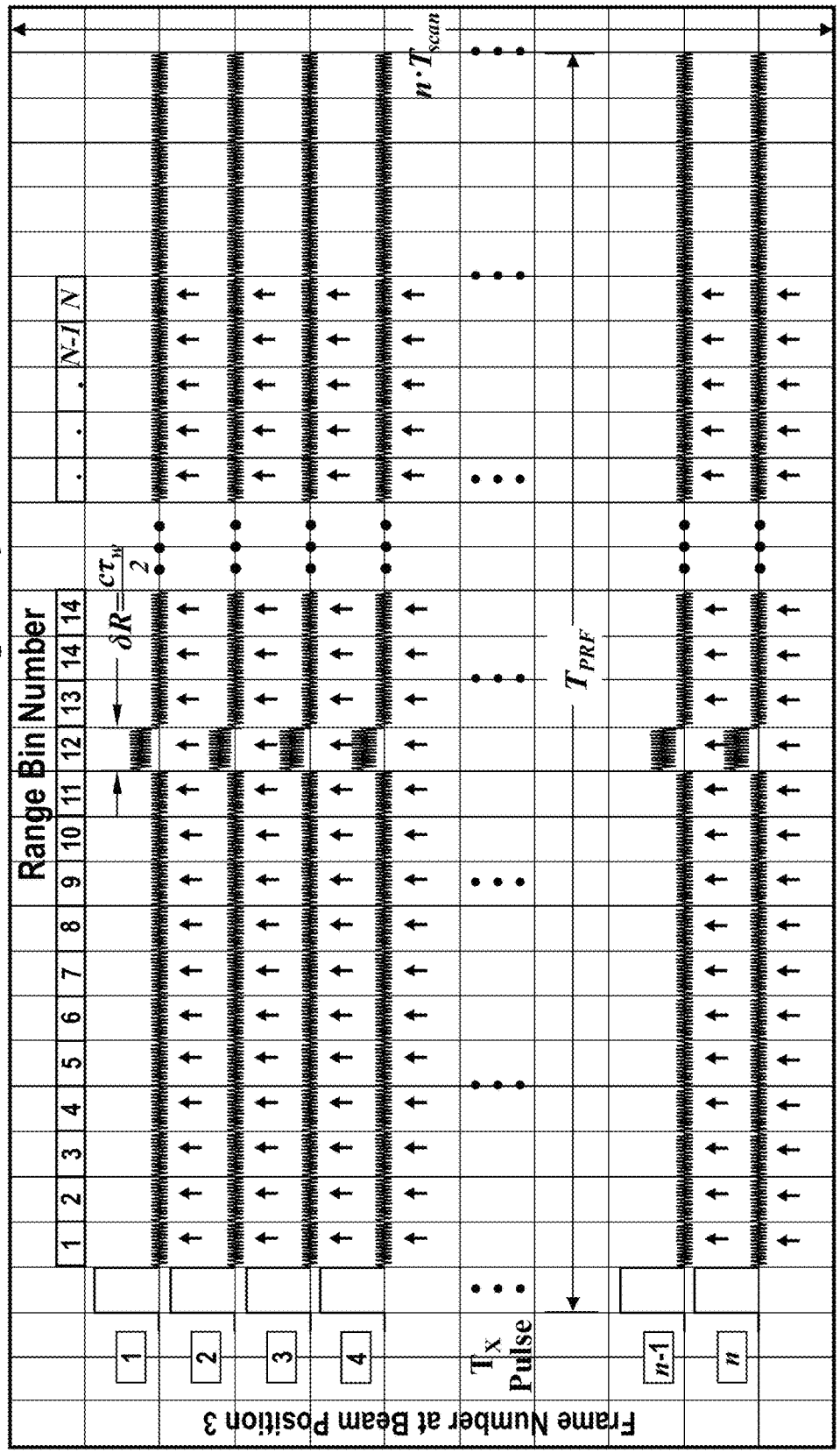

Pulsed Data Acquisition Time Calculation
Data for Multiple Beam Angle Positions

| Parameter | Symbol | Value | Units | Note/Comment |
|---|---|---|---|---|
| Scan time | $T_{scan}$ | 100 | usec | Note faster scan time |
| Scan angle extent | $\phi_{tot}$ | 50 | ° | |
| Scan beamwidth | $\Delta\phi_{-3\_dB}$ | 1.0 | ° | Scan angle resolution |
| Number of beam positions | $k$ | 50 | - | $k = \phi_{tot} / \Delta\phi_{-3\_dB}$ |
| Beam angular velocity | $v_{ang}$ | $5.0 \cdot 10^5$ | °/sec | $v_{ang} = \phi_{tot} / T_{scan}$ |
| Beam position dwell time | $T_{dw}$ | 2.0 | usec | $T_{dw} = \Delta\phi_{-3\_dB} / v_{ang}$ \| set $T_{dw} = T_{prf}$ |
| Pulse width | $\tau_w$ | 20.0 | nsec | |
| Pulse repetition interval | $T_{prf}$ | 2.0 | usec | |
| Tx Duty cycle | $DC$ | 1.0 | % | |
| Number of range bins | $N$ | 100 | - | |
| Range Measurement Resolution | $\delta R$ | 3.0 | meter | |
| Number of Scans | $n$ | 512 | - | |
| ADC sample rate | $f_s$ | 51.2 | MSPS | $f_s = N/T_{dw}$ |
| Processing gain | $PG_{dB}$ | 27.1 | dB | $10 \cdot \log(n)$ |

$T_{acq} = n \cdot T_{scan} = 0.0512$ second

*Fig. 46*

Scan pattern

SCANNING LIDAR SYSTEM AND METHOD

RELATED APPLICATIONS

This application is a continuation of U.S. patent application Ser. No. 15/895,460 filed on Feb. 13, 2018, which is a continuation-in-part of U.S. patent application Ser. No. 15/708,412, filed in the U.S. Patent and Trademark Office on Sep. 19, 2017, and a continuation-in-part of U.S. patent application Ser. No. 15/813,404, filed in the U.S. Patent and Trademark Office on Nov. 15, 2017, the entire contents of which applications are incorporated herein by reference.

BACKGROUND

1. Technical Field

The present disclosure is related to LiDAR systems and methods and, in particular, to a scanning LiDAR system and method using synthetic Doppler processing and spatial filtering for reducing ambient light, which can be used in an automotive or other applications.

2. Discussion of Related Art

LiDAR is commonly referred to as an acronym for light detection and ranging, in the sense that LiDAR is commonly considered an optical analog to radar. In general, there are two types of LiDAR systems, namely, incoherent LiDAR and coherent LiDAR. Incoherent LiDAR, also commonly referred to as direct detection or direct energy detection LiDAR, primarily uses an amplitude measurement in light returns, while coherent LiDAR is better suited for phase-sensitive measurements or other more sophisticated transmitter waveform modulation techniques. Coherent systems generally use optical heterodyne detection, which, being more sensitive than direct detection, allows them to operate at a much lower power and provide greater measurement accuracy and resolution, but at the expense of more complex transceiver requirements and cost.

A typical LiDAR detection system includes a source of optical radiation, for example, a laser, which emits light into a region. An optical detection device, which can include one or more optical detectors and/or an array of optical detectors, receives reflected light from the region and converts the reflected light to electrical signals. A processing device processes the electrical signals to identify and generate information associated with one or more target objects in the region. This information can include, for example, bearing, range, velocity, and/or reflectivity information for each target object.

One very important application for LiDAR detection systems is in automobiles, in which object detections can facilitate various features, such as parking assistance features, cross traffic warning features, blind spot detection features, autonomous vehicle operation, and many other features. In automotive LiDAR detection systems, it is important to be able to detect both bright objects at close range and low-reflectivity objects at long range with the same system configuration.

SUMMARY

According to one aspect, a LiDAR detection system is provided. The LiDAR detection system includes a plurality of optical sources disposed along a first direction for generating a plurality of output optical signals disposed along the first direction. A signal generator generates an output signal having a variable frequency. A modulation circuit receives the output signal from the signal generator and applies the output signal from the signal generator to the plurality of optical sources to modulate the output optical signals such that the output optical signals are envelope-modulated output optical signals having frequency-modulated modulation envelopes. Optical transmission elements transmit the envelope-modulated output optical signals into a region. A scanning device scans the plurality of envelope-modulated output optical signals over a second direction different than the first direction. A receiver receives return optical signals at least partially generated by reflection of the transmitted envelope-modulated output optical signals and generates receive signals indicative of the return optical signals, the receiver comprising a two-dimensional array of optical detectors. A mask is disposed in proximity to the array between the region and the array, the return optical signals impinging on the mask, the mask comprising a plurality of apertures disposed along a direction aligned with a first dimension of the array, each aperture being adapted such that the mask blocks a first portion of the return optical signals from impinging on the array and the aperture allows a second portion of the return optical signals to impinge on the array, wherein the receive signals are generated for a set of detectors in the array disposed along the first dimension of the array and aligned with the apertures in the mask and exposed to the received return optical signals, wherein the receive signals are generated for one set of detectors at a time, the sets of detectors being offset with respect to each other along a second dimension of the array substantially orthogonal to the first dimension of the array, wherein each detector in a set of detectors comprises multiple regions, a first region of each detector receiving a return optical signal at a first time and a second region of each detector receiving another return optical signal at a second time later than the first time, wherein the first and second times occur during different sweeps of the array. A processor is coupled to the receiver for receiving the receive signals and processing the receive signals to generate detections of one or more objects in the region.

In some exemplary embodiments, the first portion of the return optical signals blocked by the mask are from at least one portion of the region that is not illuminated by the output optical signals.

In some exemplary embodiments, the mask is located at or near a focal plane of a receiving lens in the receiver.

In some exemplary embodiments, the scanning device comprises a scanning mirror for scanning the transmitted envelope-modulated output optical signals at varying angles into the region. The scanning mirror can be a micro-electromechanical (MEMS) scanning mirror.

In some exemplary embodiments, the signal generator comprises a voltage-controlled oscillator (VCO), the frequency of the output signal being variable by a control input applied to the VCO. The frequency of the output signal can be controlled to vary according to a ramp between a first frequency and a second frequency.

In some exemplary embodiments, the transmitted envelope-modulated output optical signals are frequency-modulated continuous-wave (FMCW) signals.

In some exemplary embodiments, the transmitted envelope-modulated output optical signals are pulsed signals.

In some exemplary embodiments, the optical sources comprise lasers.

In some exemplary embodiments, the LIDAR detection system is an automotive LiDAR detection system.

In some exemplary embodiments, the array of optical detectors comprise at least one silicon photomultiplier (SiPM) detector.

In some exemplary embodiments, the array of optical detectors comprise at least one avalanche photodiode detector (APD).

In some exemplary embodiments, the array of optical detectors comprise at least one multi-pixel photon counter (MPPC) detector.

In some exemplary embodiments, the optical transmission elements comprise at least one optical element which shapes the output optical signals such that the divergence of each output optical signal is substantially reduced or minimize.

In some exemplary embodiments, the optical transmission elements comprise lasers.

In some exemplary embodiments, the LiDAR detection system is an automotive LiDAR detection system.

In some exemplary embodiments, the LiDAR detection system is a biaxial system. In some exemplary embodiments, the LiDAR detection system is a coaxial system.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIG. 18 includes a table which lists exemplary parametric data values for an exemplary illustrative operational configuration of a FMCW LiDAR system, according to exemplary embodiments.

FIG. 28 includes a table of parametric data in a typical automotive operational scenario of a LiDAR system using a MEMS scanning mirror for data acquisition, according to some particular exemplary embodiments.

FIGS. 30A through 30C include data matrices illustrating FMCW data acquisition for 2-D FFT processing for a single scan angle position, according to some exemplary embodiments.

FIG. 32 includes a table of FMCW synthetic Doppler parameters utilized for the simulation, for a single beam angle.

FIG. 36 includes additional supplementary data for the simulation results.

FIG. 38 includes a table listing parameters associated with data for k=50 beam angle positions.

FIG. 40C includes an original data matrix generated during pulsed data acquisition, according to some exemplary embodiments.

FIG. 40D includes a repopulated data matrix generated during pulsed data acquisition, according to some exemplary embodiments.

FIG. 42 includes a table of pulsed synthetic Doppler parameters utilized for the simulation, for a single beam angle.

FIG. 44 includes a schematic diagram illustrating data acquisition for I-channel and Q-channel for a single scan, according to exemplary embodiments.

FIG. 45 includes a schematic diagram illustrating data acquisition for I-channel and Q-channel for multiple scans, at beam position 3, according to exemplary embodiments.

FIG. 46 includes a table listing parameters associated with data for multiple beam angle positions.

FIGS. 49A and 49B illustrate scanning of transmitted optical signals into a region and reception of returning optical signals for a first angular direction of scanning of a scanning mirror and a second opposite angular scanning direction the scanning mirror, respectively, according to exemplary embodiments.

DETAILED DESCRIPTION

Direct detection LiDAR systems are characterized by construction and functional simplicity and, unlike the more complex homodyne or heterodyne LiDAR systems, do not utilize frequency translation or down conversion stages, which facilitate signal detection and processing gain advantages. The signal detection and processing gain advantages of homodyne/heterodyne LiDAR systems are enabled by advanced modulation and coding of the transmitted signal combined with sophisticated correlation processing techniques within the LiDAR receiver. Transmit signal modulation and coding, in conjunction with advanced correlation processing techniques, have been utilized within radar systems, from complex military object imaging systems to commercial automotive autonomous cruise control applications. LiDAR systems, with the exception of very advanced measurement requirements, e.g. NASA measurements of $CO_2$ emissions, have not utilized these techniques. However, according to the present disclosure, development of laser transmit signal envelope modulation and quadrature demodulation of the recovered envelope modulation signal has exhibited similar advantages to those associated and achieved via the radar science. Laser transmitter envelope modulation and quadrature demodulation represent a modest increase in complexity of direct detection LiDAR systems with significant benefits in measurement capability and lower operational power by enabling signal processing gain to direct detection LiDAR.

According to the exemplary embodiments described herein in detail, laser transmitter envelope modulation and receiver quadrature demodulation techniques are applied to direct detection LiDAR systems. Specific transmitter modulation envelope waveforms, e.g., pulse burst and frequency modulated continuous wave (FMCW) are described in detail. Data acquisition techniques and processing gain are also described herein in detail. Specific measurement enhancements and parameters associated with each envelope modulation waveform are also described in detail.

Figure 1:
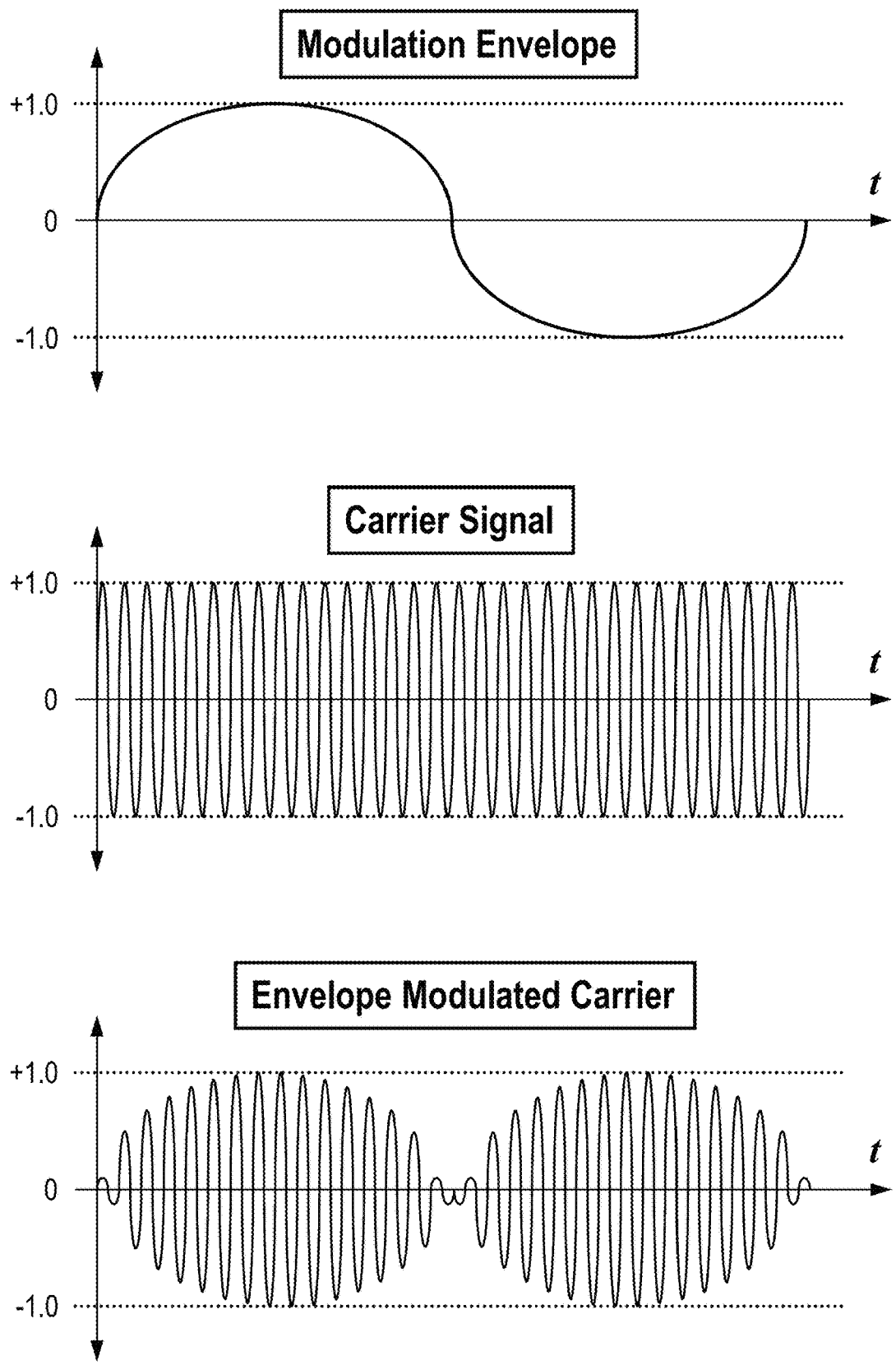
FIG. 1 includes three curves which illustrate transmitter envelope modulation techniques, using a substantially sinusoidal modulation envelope, as applied to direct detection LiDAR, according to exemplary embodiments.

FIG. 1 includes three curves which illustrate a general instance of transmitter envelope modulation techniques, using a substantially sinusoidal modulation envelope, as applied to direct detection LiDAR, according to exemplary embodiments. Referring to FIG. 1, a modulation envelope signal, a sinusoidal carrier signal and an envelope-modulated carrier waveform are illustrated. The mathematical definitions associated with the envelope modulation waveform, carrier and transmit envelope modulated waveform are in accordance with the following equation (1):

$$\text{Mod}(t) = \sin(2\pi f_m t) \rightarrow \text{modulation waveform}$$

$$\text{Car}(t) = \sin(2\pi f_c t) \rightarrow \text{carrier}$$

$$T_x(t) = \text{Mod}(t) \cdot \text{Car}(t) \rightarrow \text{envelop modulated carrier} \quad (1)$$

It is noted that the envelope-modulated carrier implies multiplication of the modulation waveform and the carrier signal. The direct detection LiDAR system performs the multiplication within the laser modulator element as described below in detail. Unlike other systems which use a modulated carrier, the envelope modulation technique results in transmission of both sidebands.

Figure 2:
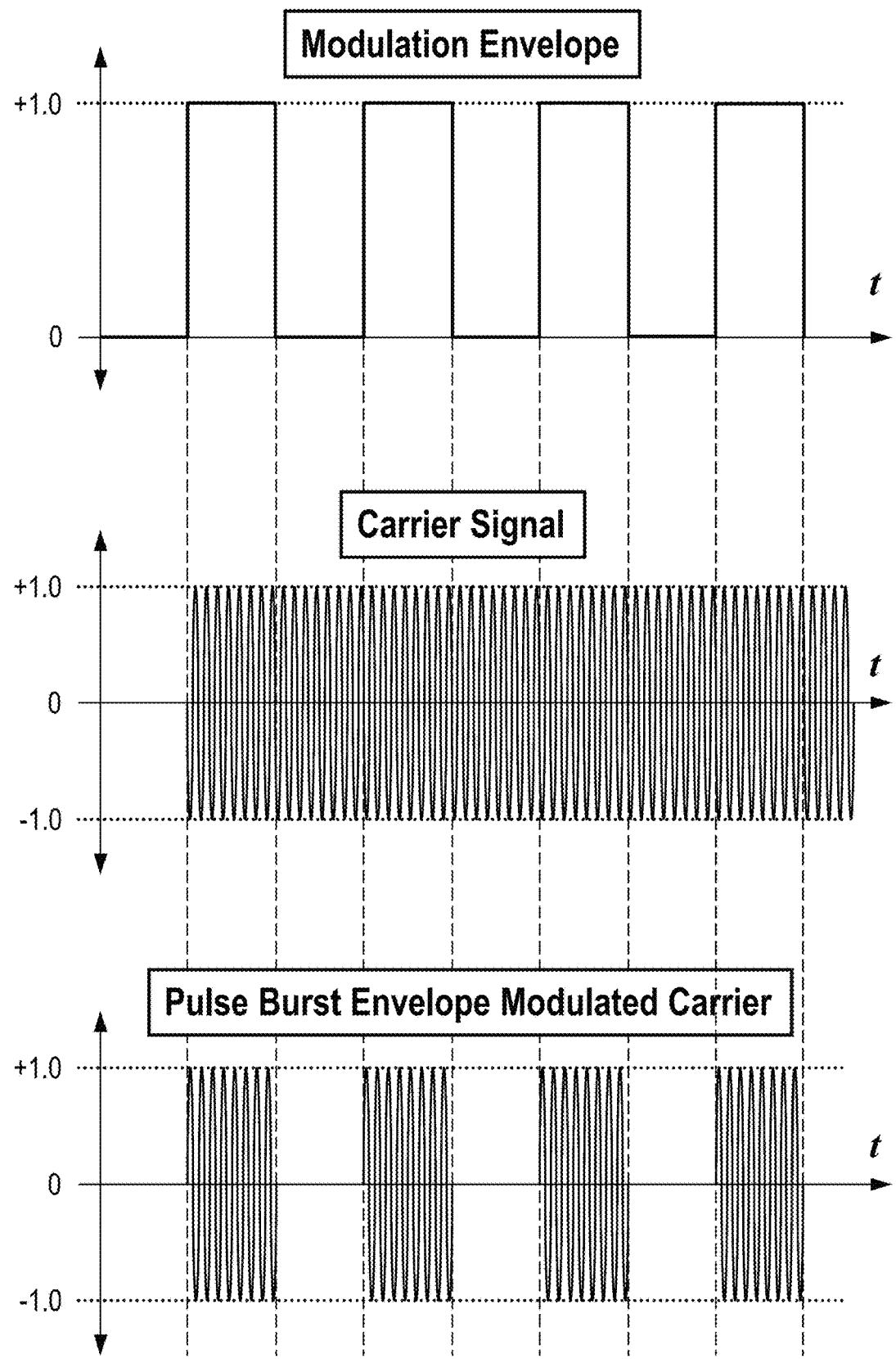
FIG. 2 includes three curves which illustrate transmitter envelope modulation techniques, using a pulse burst modulation envelope, as applied to direct detection LiDAR, according to other exemplary embodiments.

FIG. 2 includes three curves which illustrate transmitter envelope modulation techniques, using a pulse burst modulation envelope, as applied to direct detection LiDAR, according to other exemplary embodiments. Referring to FIG. 2, a modulation envelope signal, a sinusoidal carrier signal and an envelope-modulated carrier waveform are illustrated. In the pulse-burst envelope modulation illustrated in FIG. 2, a repetitive pulse waveform modulates the carrier. Laser modulators are capable of pulse modulation at very high repetition frequencies, e.g., several hundred megahertz, which facilitates coherent detection of the recovered modulation waveform with attendant signal processing benefits as will be described in detail herein.

It should be noted that, in accordance with exemplary embodiments, the position in time of the modulating pulses may be a variable, which allows for pulse position modulation (PPM) coding.

Figure 3:
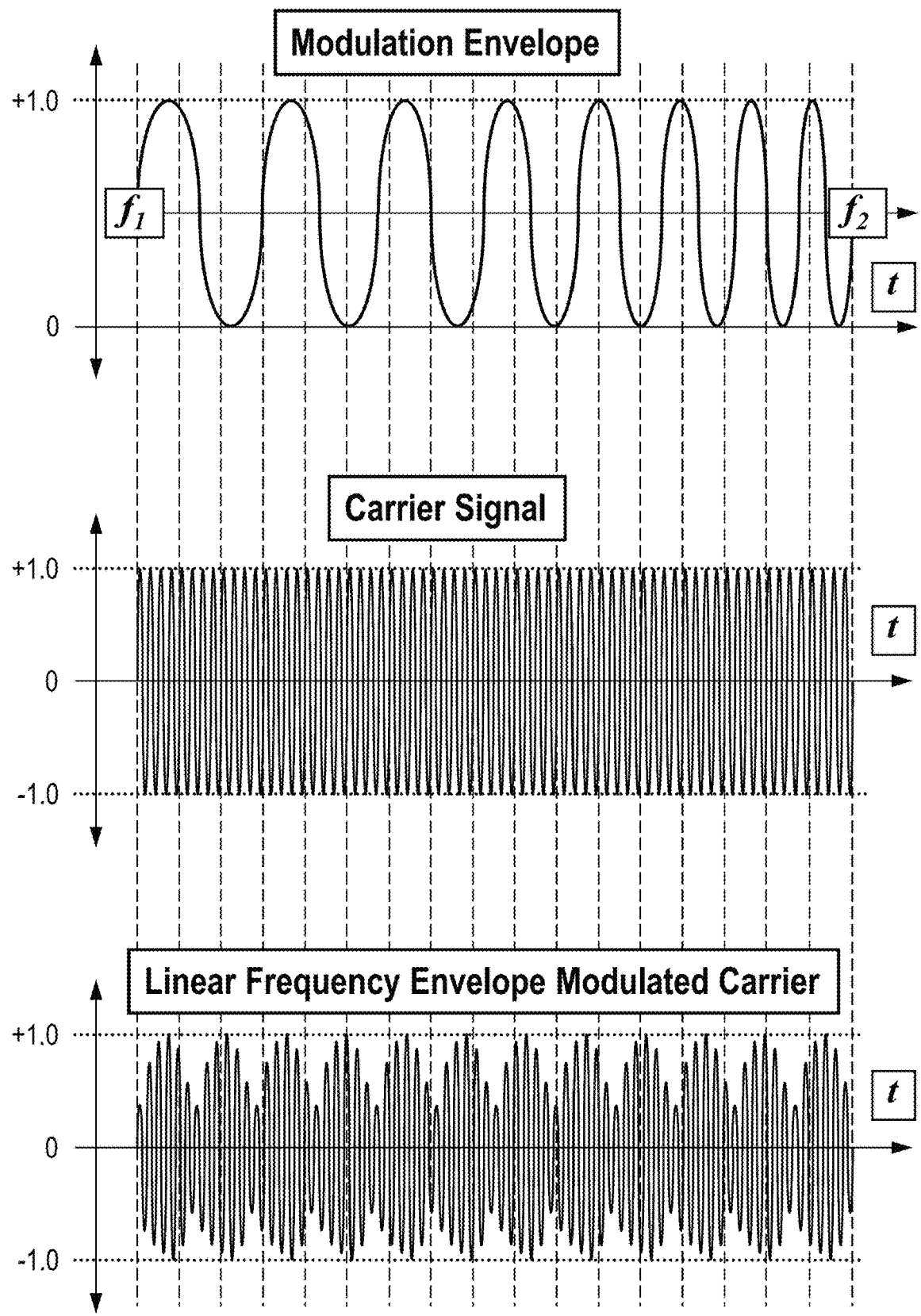
FIG. 3 includes three curves which illustrate transmitter envelope modulation techniques, using linear frequency envelope modulation, as applied to direct detection LiDAR, according to other exemplary embodiments.

FIG. 3 includes three curves which illustrate transmitter envelope modulation techniques, using linear frequency envelope modulation, as applied to direct detection LiDAR, according to other exemplary embodiments. Referring to FIG. 3, a modulation envelope signal having a linear variation in frequency, a sinusoidal carrier signal and an envelope-modulated carrier waveform are illustrated. FIG. 3 illustrates linear frequency envelope modulation, where, in this particular exemplary embodiment, the modulation waveform frequency is linearly changed from $f_1$ to $f_2$ ($\Delta F$) over a specific time interval ($\Delta T$). The linear frequency modulation envelope is advantageous for the implementation of FMCW LiDAR due to the ability to provide high-range resolution in accordance with the frequency deviation ($\Delta F$), lower detection bandwidth and the unique spectral resolution properties of the Fast Fourier Transform (FFT) computation technique.

One principle of transmitter envelope modulation is that upon transmission, the modulation envelope is subject to phase delay in accordance with the envelope frequency. The total transmission phase shift in the two-way range from LiDAR system to object is described by the following equation (2):

$$\Delta \phi = 2\pi \frac{2R}{\lambda_{mod}}; \quad (2)$$

$\Delta \phi$: transmission phase shift $R$: range to object $\lambda_{mod}$: envelop modulation wavelength In exemplary embodiments, upon envelope recovery in a photo-diode, or photodetector or light detector, as described below in detail, the amplitude and transmission phase of the modulation envelope are demodulated in the quadrature demodulator.

Figure 4:
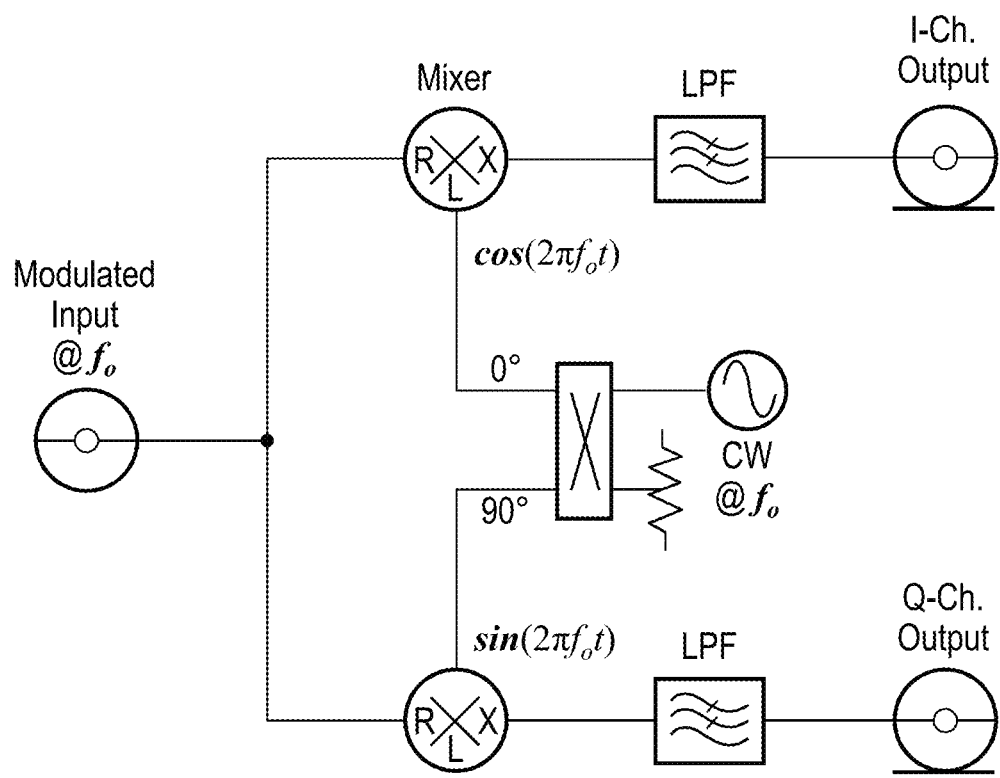
FIG. 4 includes a schematic functional block diagram of a quadrature demodulation system and technique, according to some exemplary embodiments.

FIG. 4 includes a schematic functional block diagram of a quadrature demodulation system and technique, according to some exemplary embodiments. Quadrature demodulation is an efficient detection technique which utilizes the advantages of coherent signals to provide the orthogonal, or vector signal components of a modulated signal. Quadrature demodulation is universal in the sense that it has the ability to recover amplitude modulation (AM), frequency modulation (FM) and phase modulation (PM) components of a modulated signal. Referring to FIG. 4, a modulated input signal to be demodulated, having a frequency, is received and applied to in-phase and quadrature-phase mixers. A quadrature demodulator according to the exemplary embodiments includes a coherent, continuous wave (CW) local oscillator (LO) signal at the modulated carrier input frequency $f_0$, a 0°/90° power divider, the in-phase and quadrature-phase mixers, and low-pass filters to eliminate the LO signal and other spurious signals from the demodulated output, which is provided at an I-channel output and a Q-channel output as shown. In order for the LO to be coherent with the received envelope modulated signal, according to exemplary embodiments, a single-frequency source is utilized for both envelope modulation and quadrature demodulator LO.

Figure 5:
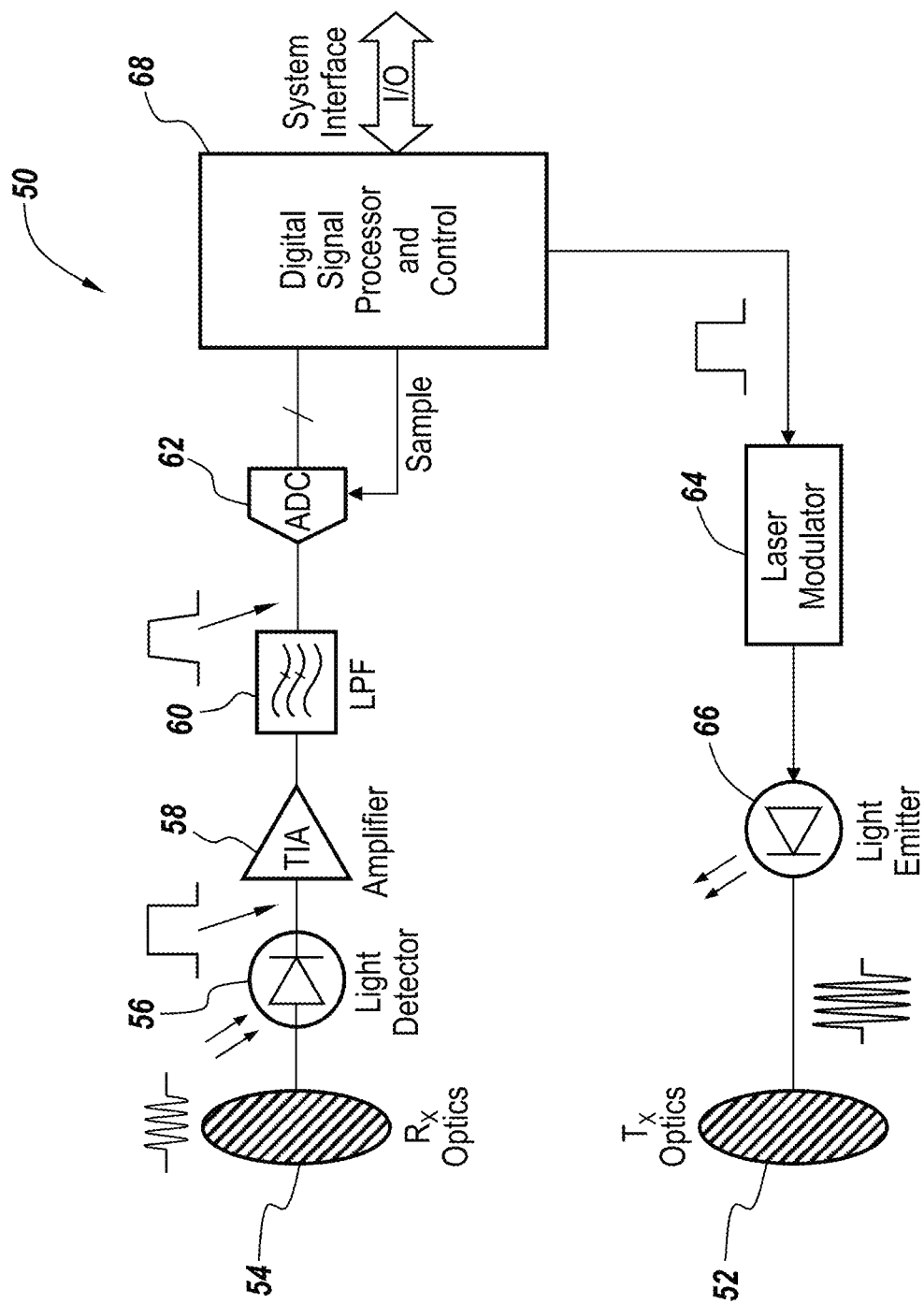
FIG. 5 includes a schematic functional block diagram of a conventional direct detection LiDAR system.

In contrast with the envelop-modulated/quadrature-demodulation direct-detection LiDAR approach of the exemplary embodiments, FIG. 5 includes a schematic functional block diagram of a conventional direct detection LiDAR system 50. Referring to FIG. 5, a typical operational configuration involves the transmission of a high-power laser transmit pulse of short duration, typically 2.0 to 20 nanoseconds, at transmit optics 52, via light emitter 66, modulated under the control of a digital signal processor and control (DSPC) 68 by laser modulator 64. A portion of the transmitted pulse is reflected from an object within the transmitter beam width and subsequently captured by the receive optics 54 and light detector 56 following the two-way time of flight to the object. The received signal is then amplified by the transimpedance amplifier (TIA) 58 and filtered by a low-pass filter (LPF) 60. The analog-to-digital converter (ADC) 62 samples range bins commensurate with the pulse width. Under control of DSPC 68, if a signal is determined to exceed a specific threshold level within a specific range bin, a target is declared. Other processing strategies may be employed to improve the signal-to-noise ratio, e.g., range bin sampling following multiple transmitter pulses and integration of the received signal energy from each transmitted pulse, also known as non-coherent detection; however, the basic operation is limited to high-power pulse transmission and receive signal detection and amplification.

In addition to the above described direct detection LiDAR system 50, a time-of-flight (TOF) system transmits multiple pulses in the form of a square-wave and utilizes a phase detector on receive to measure the two-way time of flight. The time-of-flight system must limit the square-wave modulation frequency in order to avoid phase ambiguity.

Figure 6A:
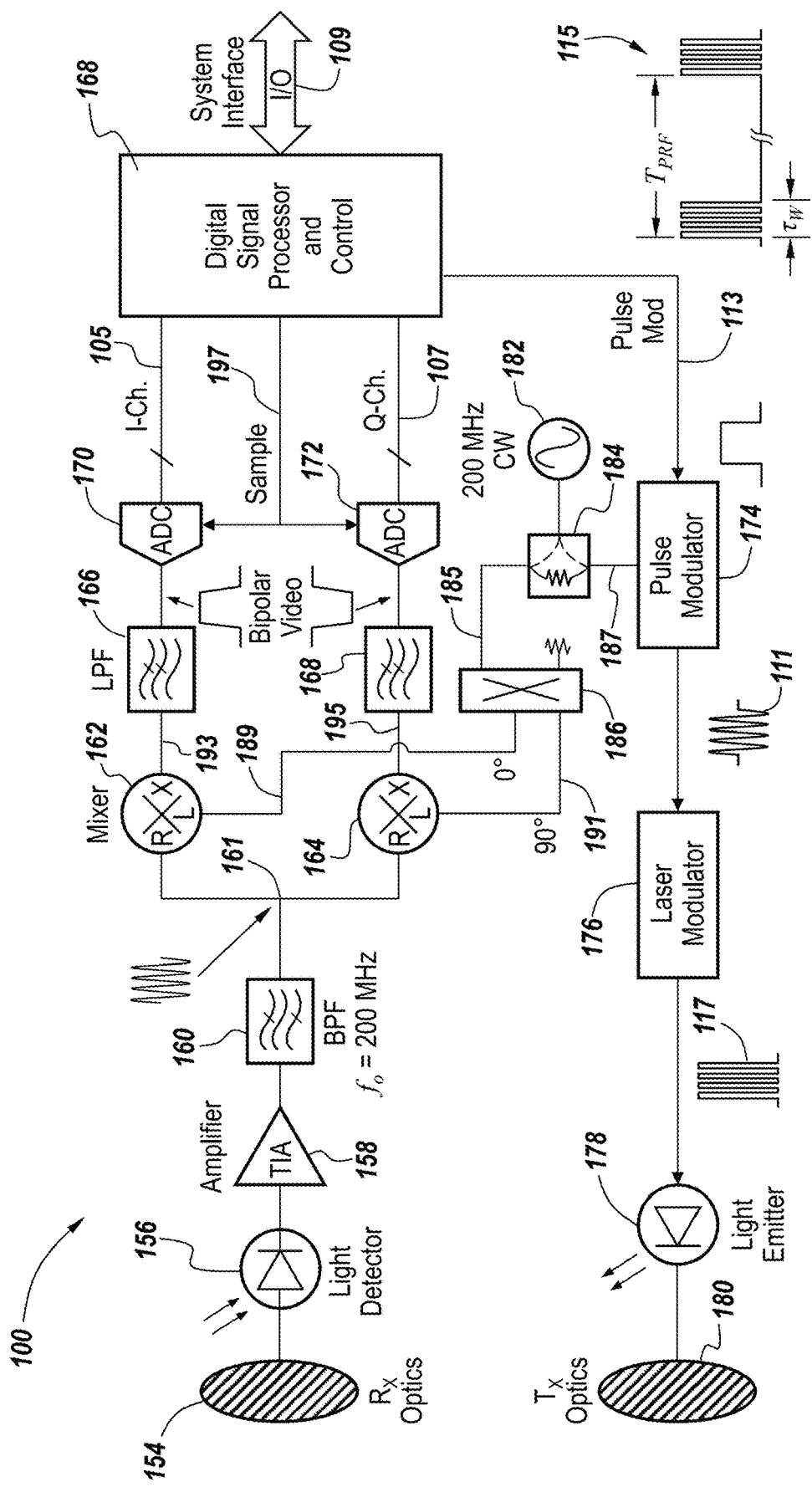
FIG. 6A includes a schematic functional block diagram which illustrates a LiDAR system using pulse-burst transmit envelope modulation illustrated in FIG. 2 and quadrature demodulation, according to some exemplary embodiments.
Figure 6B:
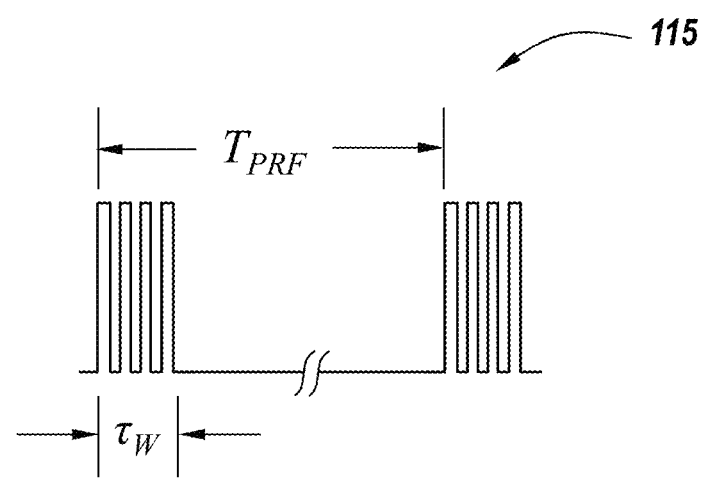
FIG. 6B is a schematic diagram illustrating detail of the pulse burst modulation signal used in the system of FIG. 6A, according to some exemplary embodiments.

FIG. 6A includes a schematic functional block diagram which illustrates a LiDAR system 100 using pulse-burst transmit envelope modulation illustrated in FIG. 2 and quadrature demodulation, according to some exemplary embodiments. In contrast with the conventional pulse modulation of the basic direct detection LiDAR system 50 illustrated in FIG. 5, in system 100 of FIG. 6A, a repetitive pulse burst is used instead of the single repetitive pulse. FIG. 6B is a schematic diagram illustrating detail of the pulse burst modulation signal 115 used in the system 100 of FIG. 6A, according to some exemplary embodiments. Also, in system 100 of FIG. 6A, the burst frequency, which in some particular exemplary embodiments is 200 MHz, produces the transmission of two sidebands, each offset from the operational laser wavelength (frequency) by the modulation frequency. Also, in system 100 of FIG. 6, the modulation frequency is coherent with the recovered envelope on receive, thereby providing an efficient means of modulated signal detection. Also, a band pass filter centered at the modulation burst frequency attenuates the broadband noise of the TIA, and also the 1/f noise associated with the photo-detector and TIA. Also, a quadrature demodulator is employed to recover pulse burst envelope and attendant two-way transmission phase shift of the modulation envelope.

Referring to FIGS. 6A and 6B, LiDAR system 100 according to exemplary embodiments includes receive optics 154 at which optical energy, including optical returns from one or more target objects, are received. The optical energy is received from receive optics 154 at a light detector 156, which converts the received optical energy to one or more electrical signals. The electrical signals are amplified by TIA 158 and filtered by BPF 160, having a center frequency at the burst modulation frequency $f_0$. In some particular exemplary embodiments, the center frequency of BPF 160, $f_0$=200 MHz, although other frequencies may be utilized. The resulting amplified and filtered signal is applied at node 161 to first inputs of I/Q mixers 162, 164.

The optical signal used to illuminate the one or more target objects is generated by a signal generator 182. The output signal of signal generator 182, which in exemplary embodiments is a continuous substantially sinusoidal signal, is applied to a power splitter 184, which splits the signal and provides the split signal at two outputs. The first output 185 is routed to splitting and phase shifting circuitry or 90-degree power splitter 186, which splits the signal, applies a phase shift to one of the resulting split signals, and generates a pair of output signals being offset in phase. In exemplary embodiments, a 90-degree phase shift is applied to one of the signals, such that splitting and phase shifting circuitry or 90-degree power splitter 186 generates a first "in-phase" local oscillator (LO) signal 189 and a second "quadrature-phase" or "quadrature" LO signal 191, which is shifted in phase by 90 degrees with respect to in-phase LO signal 189. The in-phase and quadrature-phase LO signals 189, 191 are applied to second inputs of I/Q mixers 162, 164, respectively. I/Q mixers 162, 164 mix the amplified and filtered input signal at node 161 with the in-phase and quadrature-phase LO signals 189, 191, respectively, to generate output signals 193, 195, respectively, which are low-pass filtered by low-pass filter (LPF) 166 and LPF 168, respectively. The resulting filtered analog signals are converted to digital signals by analog-to-digital converters (ADC) 170, 172, respectively, and sampled under the control of sample control signal 197, which is generated by digital signal processor and control (DSPC) 168. The resulting sampled digital I/Q (quadrature) signals, i.e., I-channel and Q-channel signals, 105, 107 are processed by DSPC 168 to determine range and/or velocity of the one or more target objects. Results of this detection processing performed by DSPC 168 can be forwarded as desired, such as, for example, to a user interface, via a system interface 109.

Continuing to refer to FIGS. 6A and 6B, the second output 187 of power splitter 184 is routed to a pulse modulator 174, which converts the continuous substantially sinusoidal signal 187 from power splitter 184 to a pulsed substantially sinusoidal signal 111. The timing of pulses in the pulsed sinusoidal signal 111 is controlled by pulse burst modulation signal 115 on output signal line 113 from DSPC 168. That is, pulse burst modulation signal 115 is used by pulse modulator 174 to modulate continuous substantially sinusoidal signal 187 to generate pulsed substantially sinusoidal signal 111. The resulting pulsed amplitude-modulated signal 111 from pulse modulator 174 is applied as a modulation signal to a laser modulator 176, which generates a control/modulation signal, which is applied to light emitter 178 to generate a pulsed amplitude-modulated optical signal, which is transmitted to transmit optics 180, by which the pulsed modulated optical signal is transmitted to the one or more target objects.

Thus, according to exemplary embodiments, the quadrature detection precedes analog-to-digital conversion. The quadrature detector recovers the pulse modulation envelope associated with the low-frequency pulse modulation. The data samples are subsequently processed via spectral resolution or other means of each range bin data set. The spectral resolution approach used reduces the detection bandwidth and effectively integrates the energy of the range bin sample set.

According to the exemplary embodiments, Doppler frequency detection of moving objects within the field of view of LiDAR system 100 is enabled by coherent detection of the change in phase which results from the change in range due to relative velocity between LiDAR system 100 and the target object. Doppler detection is significant because the detection bandwidth reduction associated with Doppler processing increases the signal-to-noise ratio in direct proportion to the bandwidth ratio. Therefore, according to the present disclosure, described below in detail, the synthetic Doppler technique of the disclosure is a means for synthetically inducing "motion" to stationary objects, thereby facilitating 2-D FFT processing.

According to some exemplary embodiments, in addition to Doppler processing, multiple frame range bin sampling may also be used to execute a coherent pulse integration approach which also increases the signal-to-noise ratio in direct proportion to the number of pulses integrated.

Figure 7:
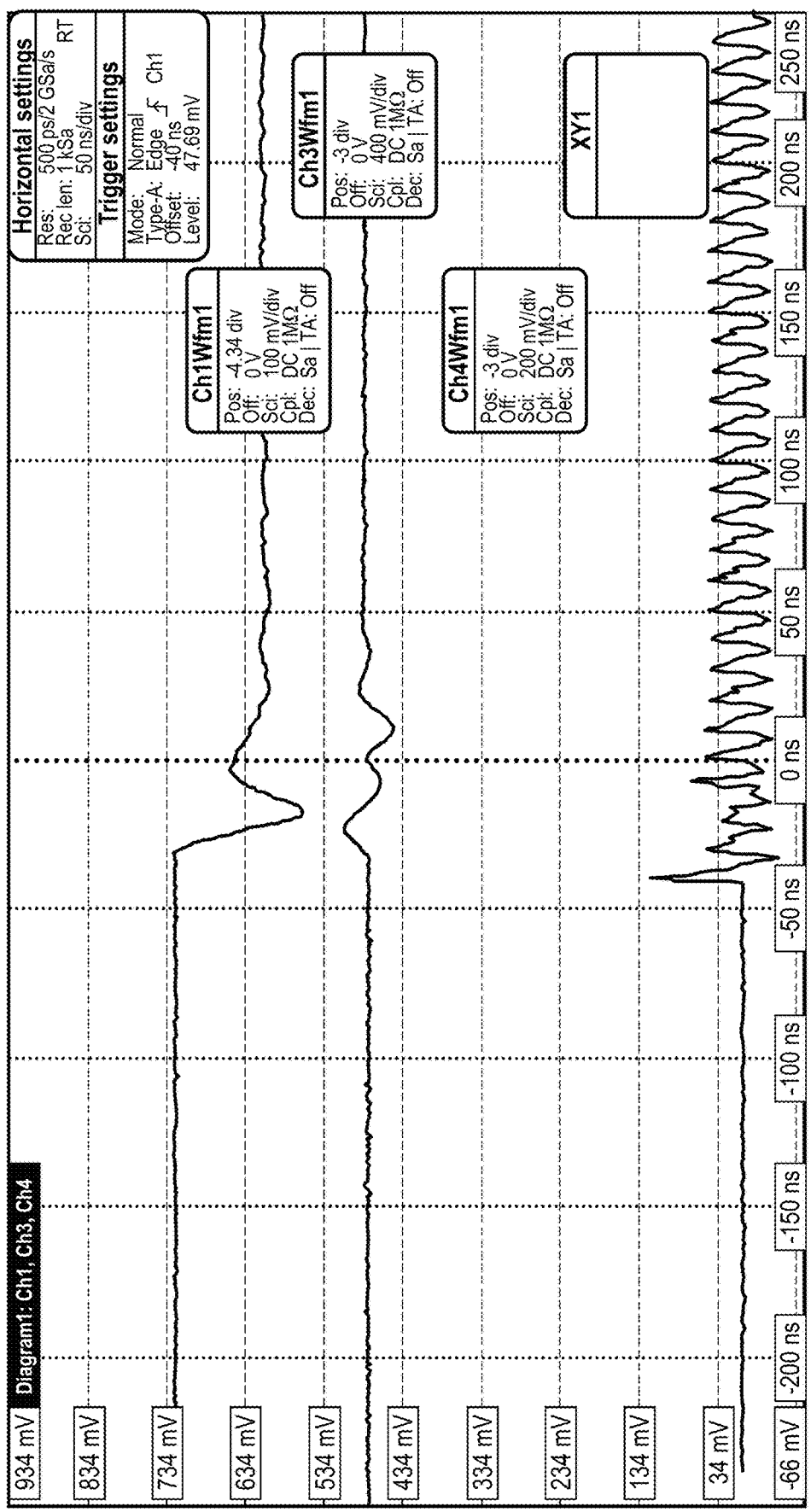
FIG. 7 is a graph which includes three curves illustrating experimental data associated with the pulse burst envelope modulation LiDAR system described herein in detail, according to exemplary embodiments.

FIG. 7 is a graph which includes three curves illustrating experimental data associated with the pulse burst envelope modulation LiDAR system 100 described herein in detail, according to exemplary embodiments. Referring to FIG. 7, the upper and middle curves are the I-channel and Q-channel video outputs, indicating detection of the modulation envelope following coherent detection. If the detection object exhibited motion, the I-channel and Q-channel signal amplitude would vary in accordance with the transmission phase change associated with the object motion. This phenomenon leads to the ability to detect Doppler frequency using the pulse burst envelope modulation and quadrature demodulation. The trace at the lower extreme of the graph of FIG. 7 is the photo diode signal at the output of TIA 158, which illustrates the 200 MHz envelope modulation signal prior to coherent detection. The time scale is 50 nanoseconds per division.

Detailed description of data acquisition and signal processing techniques that may be utilized in conjunction with pulse burst envelope modulation LiDAR system 100 with quadrature demodulation is now provided. The first step in the pulse burst envelope modulation LiDAR system signal processing is acquisition of a data set which represents the signal level of each range bin at the output of each channel of the quadrature demodulator from successive transmission pulses.

Figure 8:
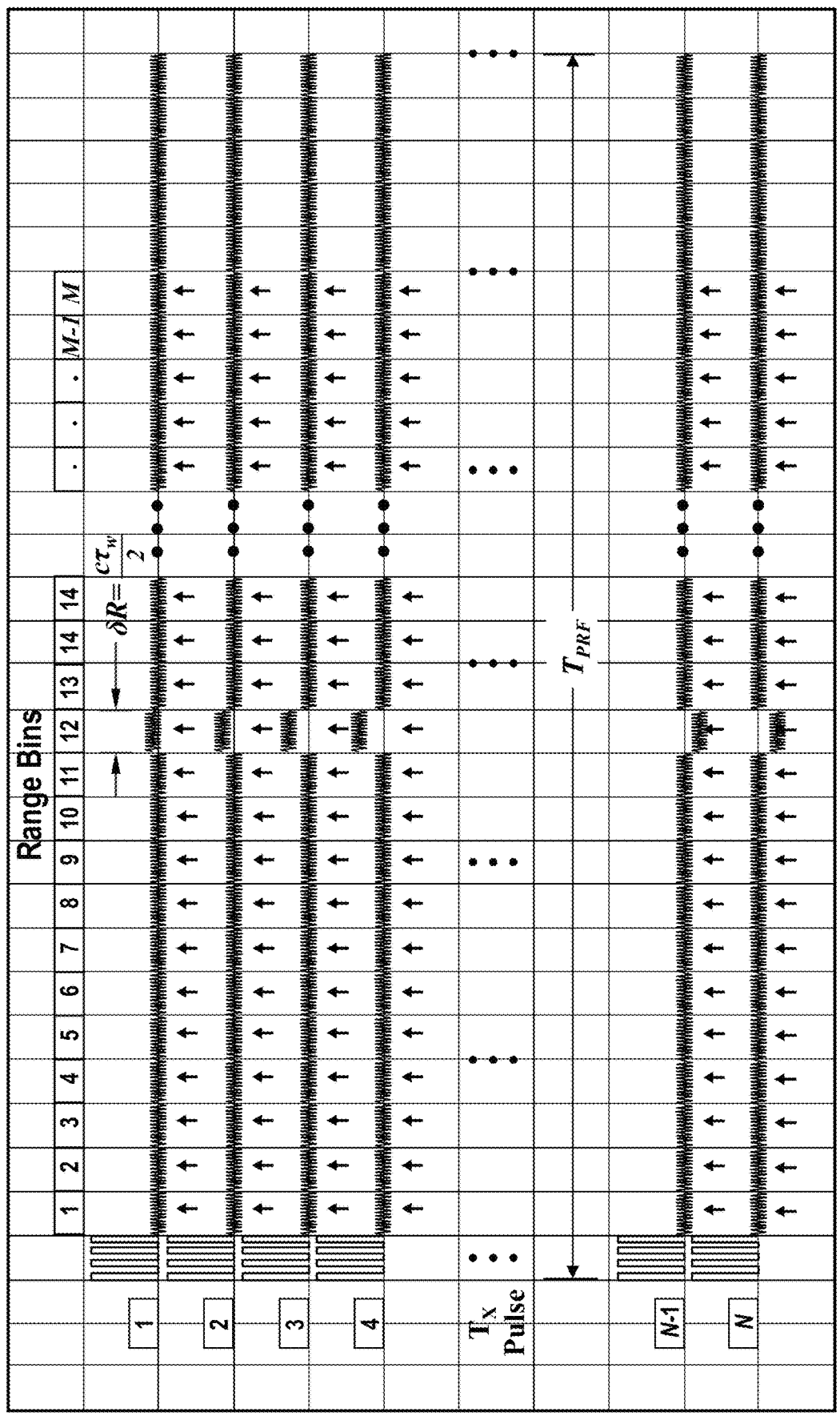
FIG. 8 includes a schematic diagram illustrating pulse burst data acquisition for the I-channel or the Q-channel, according to some exemplary embodiments.

FIG. 8 includes a schematic diagram illustrating pulse burst data acquisition for the I-channel or the Q-channel, according to some exemplary embodiments. FIG. 8 represents the filling of a data matrix (set) following successive transmission pulses. According to exemplary embodiments, a frame is defined as a single transmission pulse burst, followed by a receive interval during which the ADC 170, 172 acquires a sample from each channel of the quadrature demodulator output at each range bin. A range bin is defined in accordance with the pulse burst width which sets the range measurement resolution. The range resolution may be written as equation (3):

$$\delta R = \frac{c\tau_w}{2}; \tag{3}$$

$\delta R$: range resolution $\tau_w$: pulse burst width $c$: speed of light

Referring to FIG. 8, which may represent an I-channel or Q-channel signal, the arrows designate sample points of the ADCs 170, 172. A variable-amplitude return signal is noted in range bin 12. The variable amplitude is the result of the change in phase of a moving object within range bin 12. A stationary object produces a fixed amplitude signal level.

Upon completion of M range bin samples in each of N frames, an M×N data matrix is filled for each channel of the quadrature demodulator. It should be noted that the variable-amplitude range bin pulses result from moving objects that are coherently detected by the quadrature demodulator and enable Doppler frequency measurement via spectral resolution of the range bin samples.

There are two processing approaches available to enhance signal detection via increase to the signal-to-noise ratio: coherent pulse integration and spectral resolution of each column of the data matrix. Each column of the data matrix represents range bin samples taken at discrete time points following transmission of the pulse burst. The approach related to coherent pulse integration is captured within the following equation (4):

$$A_{PI} = \sum_{n=1}^{N} (I_n^2 + Q_n^2); \tag{4}$$

$I_n$: $n^{th}$ I-channel value of a range bin column $Q_n$: $n^{th}$ Q-channel value of a range bin column In the presence of zero-mean, Gaussian noise, ideal coherent pulse integration improves the signal-to-noise ratio by N, the number of pulses integrated.

Spectral resolution is executed in accordance with the discrete Fourier Transform and the following equation (5):

$$DFT_k = \frac{1}{N}\sum_{n=1}^{N} I_{ch\_n}\cos\left(2\pi\frac{kn}{N}\right) + j\frac{1}{N}\sum_{n=1}^{N} Q_{ch\_n}\sin\left(2\pi\frac{kn}{N}\right); \tag{5}$$

Figure 9:
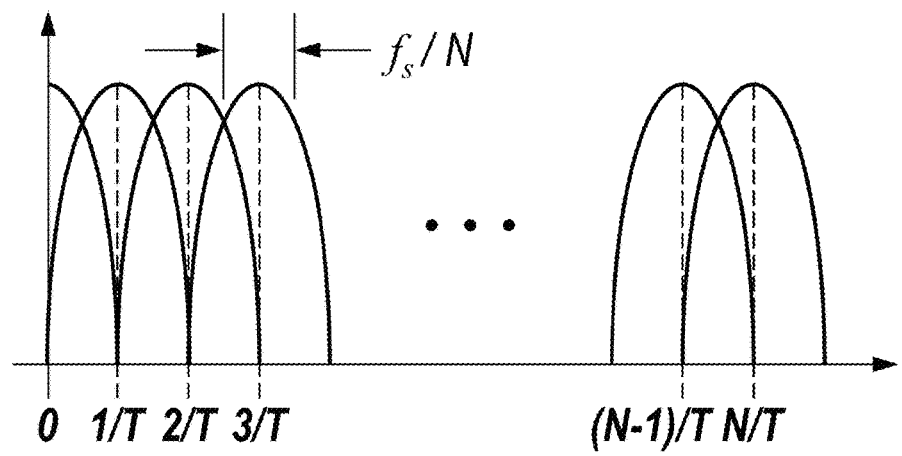
FIG. 9, which is a schematic diagram illustrating Fast Fourier Transform (FFT) implementation of a filter bank of N filters.

-continued $DFT_k$: $k^{th}$ element of the discrete Fourier Transform $I_n$ and $Q_n$: as previously defined The FFT is a computationally efficient technique for the calculation of the discrete Fourier Transform, which implements a set of identical filters, or filter bank, distributed uniformly over the frequency domain at intervals of 1/NT, where T is the time interval over which N samples of a waveform have been acquired. This is illustrated in FIG. 9, which is a schematic diagram illustrating FFT implementation of a filter bank of N filters. The FFT is particularly well suited to IF spectral resolution in FMCW radars because the narrow information bandwidth requires a filter bank which may be implemented numerically with a modest capability digital signal processor.

Figure 10:
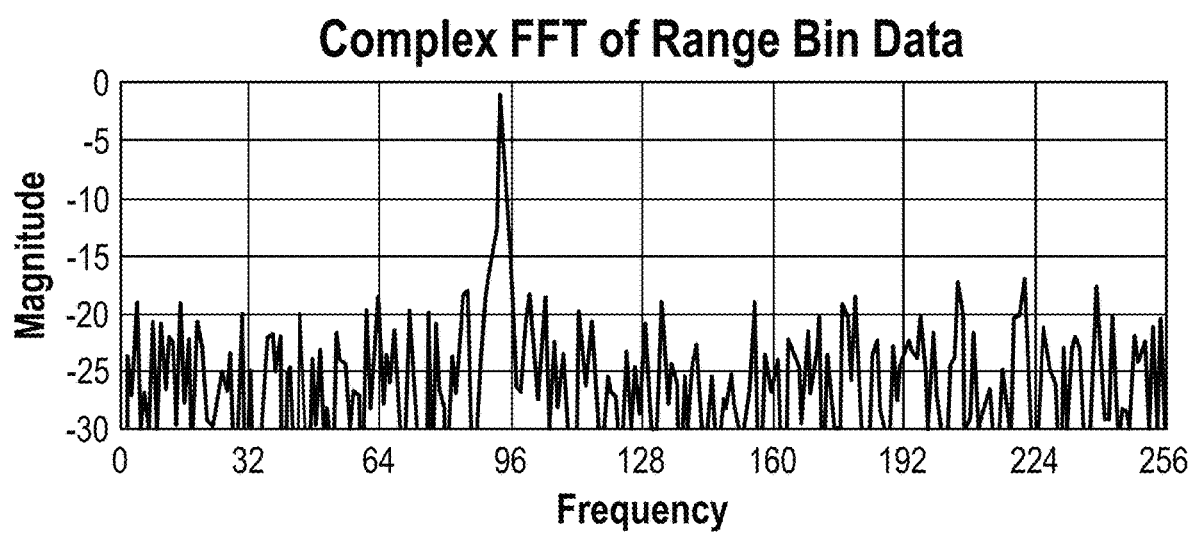
FIG. 10 includes a graph of complex FFT processing gain simulation results, according to exemplary embodiments.

It is useful to quantify the signal processing gain for the pulse burst LiDAR envelope modulation waveform. Simulation results are documented within the graphic of FIG. 10, which is a graph of complex FFT processing gain simulation results, according to exemplary embodiments. Referring to FIG. 10, the results illustrate a processing gain of approximately 25.5 dB as estimated from the graph. The pre-processing signal-to-noise ratio was set to 0 dB. The theoretical processing gain as calculated from PG=10·log (N=512)=27.1 dB. Note is made of the signal in bin k=93 at −1.5 dB; noise level at −27.0.

Figure 11:
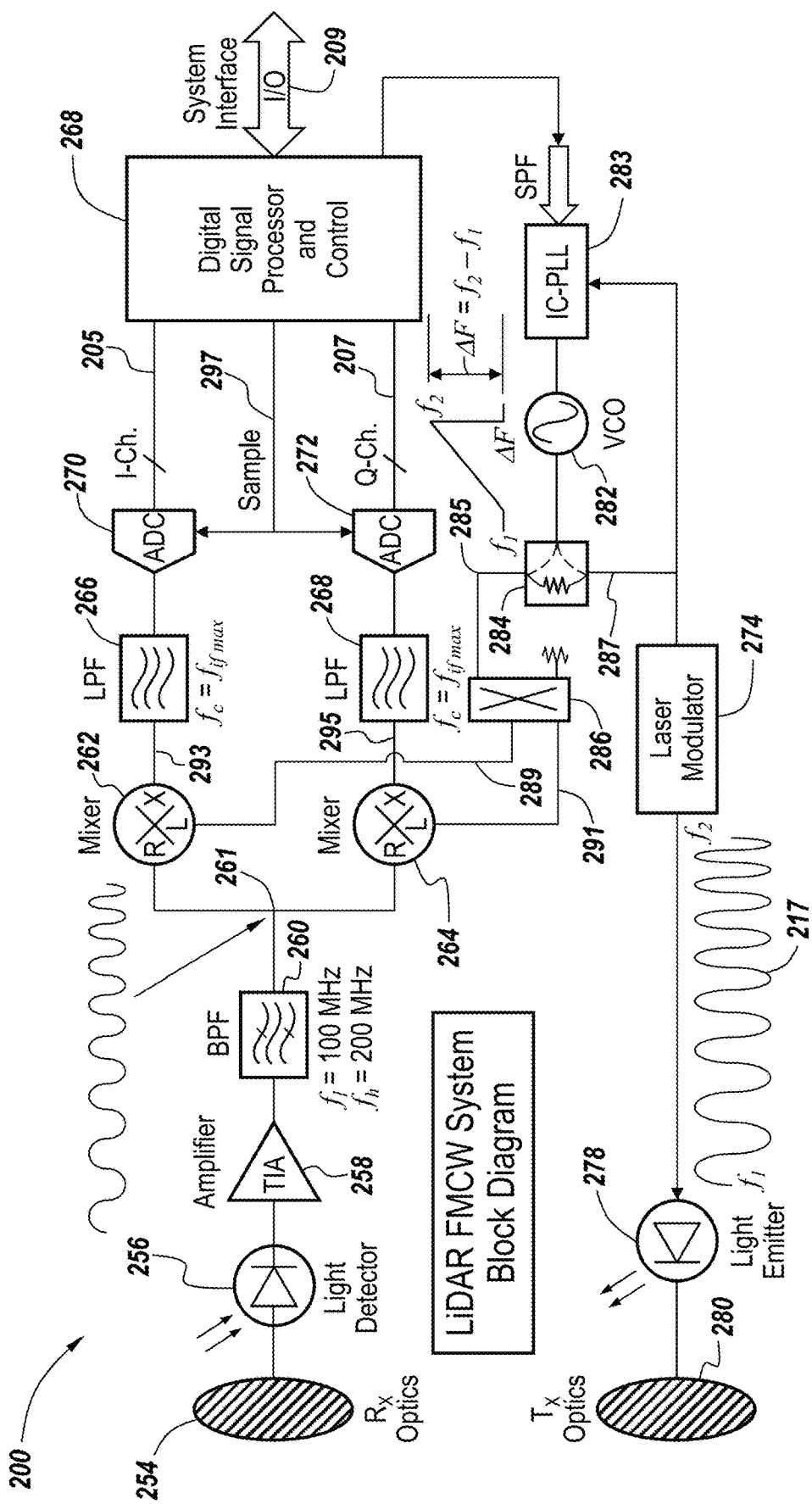
FIG. 11 includes a schematic functional block diagram which illustrates a LiDAR system using FMCW transmit envelope modulation illustrated in FIG. 3 and quadrature demodulation, according to some exemplary embodiments.

According to exemplary embodiments, the direct detection LiDAR described in detail herein can also use FMCW modulation, instead of pulse burst modulation, along with quadrature demodulation. FIG. 11 includes a schematic functional block diagram which illustrates a LiDAR system 200 using FMCW transmit envelope modulation illustrated in FIG. 3 and quadrature demodulation, according to some exemplary embodiments. FIG. 11 illustrates the system block diagram of the transmitter envelope modulation LiDAR system 200 using a linear deviation in modulation frequency from a first frequency $f_1$ to a second frequency $f_2$, such that the linear deviation in modulation frequency, ΔF, is given by $ΔF=f_2-f_1$, over a time interval of ΔT, as illustrated graphically in the block diagram of FIG. 11. It should be noted that all of the foregoing detailed description with respect to pulse burst modulation in LiDAR system 100 is applicable to FMCW modulation in LiDAR system 200, unless the context dictates otherwise.

Referring to FIG. 11, LiDAR system 200 according to exemplary embodiments includes receive optics 254 at which optical energy, including optical returns from one or more target objects, are received. The optical energy is received from receive optics 254 at a light detector 256, which converts the received optical energy to one or more electrical signals. The electrical signals are amplified by TIA 258 and filtered by BPF 260, having a low cutoff frequency $f_l$ and a high cutoff frequency $f_h$, which define the nominal endpoints of the FM frequencies in each linear frequency sweep, used to modulate the light carrier signal, according to the exemplary embodiments. In some particular exemplary embodiments, $f_1$=100 MHz and $f_2$=200 MHz, although other frequencies may be utilized. The resulting amplified and filtered signal is applied at node 261 to first inputs of I/Q mixers 262, 264.

The modulating FM signal is generated by a voltage-controlled oscillator (VCO) 282 under the control of a control signal from phase-locked loop (PLL) control circuit 283, which is in turn controlled by DSPC 268. As illustrated in FIG. 11, the frequency of the VCO 282 output is controlled to take on a linear ramp configuration from a first frequency $f_1$ to a second frequency $f_2$. The output signal of VCO 282 is applied to a power splitter 284, which splits the signal and provides the split signal at two outputs. The first output 285 is routed to splitting and phase shifting circuitry or 90-degree power splitter 286, which splits the signal, applies a phase shift to one of the resulting split signals, and generates a pair of output signals being offset in phase. In exemplary embodiments, a 90-degree phase shift is applied to one of the signals, such that splitting and phase shifting circuitry or 90-degree power splitter 286 generates a first "in-phase" local oscillator (LO) signal 289 and a second "quadrature-phase" or "quadrature" LO signal 291, which is shifted in phase by 90 degrees with respect to in-phase LO signal 289. The in-phase and quadrature-phase LO signals 289, 291 are applied to second inputs of I/Q mixers 262, 264, respectively. I/Q mixers 262, 264 mix the amplified and filtered input signal at node 261 with the in-phase and quadrature-phase LO signals 289, 291, respectively, to generate output signals 293, 295, respectively, which are low-pass filtered by low-pass filter (LPF) 266 and LPF 268, respectively, having a cutoff frequency at the maximum IF frequency of mixers 262, 264, $f_{if\_max}$. The resulting filtered analog signals are converted to digital signals by analog-to-digital converters (ADC) 270, 272, respectively, and sampled under the control of sample control signal 297, which is generated by DSPC 268. The resulting sampled digital I/Q (quadrature) signals, i.e., I-channel and Q-channel signals, 205, 207 are processed by DSPC 268 to determine range and/or velocity of the one or more target objects. Results of this detection processing performed by DSPC 268 can be forwarded as desired, such as, for example, to a user interface, via a system interface 209.

Continuing to refer to FIG. 11, the second output 287 of power splitter 284 is routed to a laser modulator 274, which modulates the optical output signal at light emitter 278 with the linear FM signal 217, which has a frequency which varies linearly from $f_1$ to $f_2$. The resulting frequency-modulated signal is applied to light emitter 278 to generate an envelope-modulated optical signal 219 (see FIG. 12C) in which the envelope is a frequency-modulated signal, which is transmitted to transmit optics 280, by which the envelope-frequency-modulated optical signal 219 is transmitted to the one or more target objects.

Figure 12A:
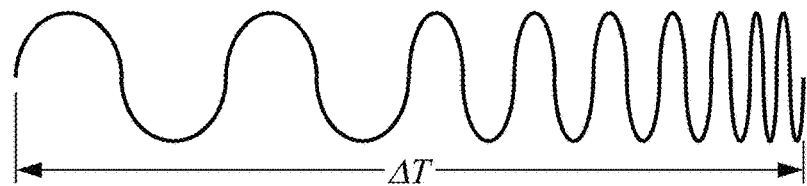
FIG. 12A is a schematic timing diagram of a frequency modulation signal, having a frequency-modulated substantially sinusoidal configuration, according to exemplary embodiments.
Figure 12B:
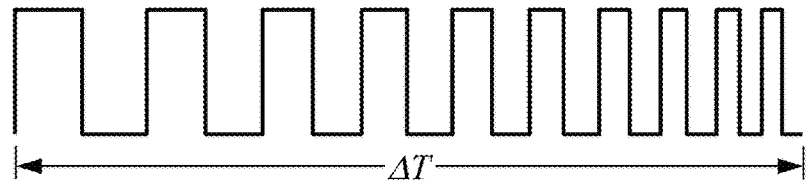
FIG. 12B is a schematic timing diagram of a frequency modulation signal, having a frequency-modulated substantially square wave configuration, according to exemplary embodiments.
Figure 12C:
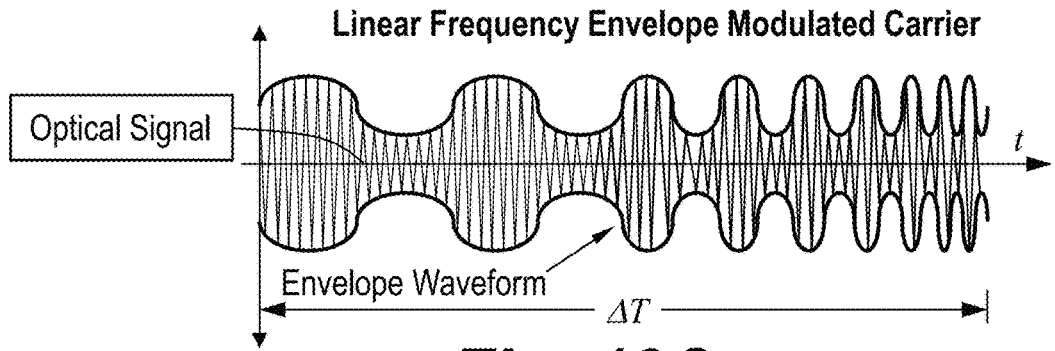
FIG. 12C is a schematic timing diagram of an envelope-modulated optical signal, generated using the substantially sinusoidal frequency modulation signal of FIG. 12A, according to exemplary embodiments.
Figure 12D:
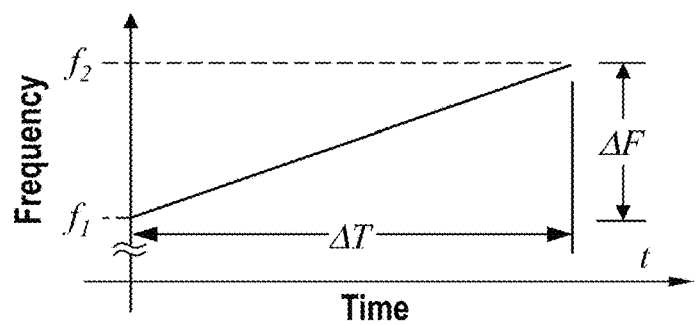
FIG. 12D is a schematic timing diagram of the frequency deviation versus time for the frequency modulation signals of FIGS. 12A and 12B, according to exemplary embodiments.

FIG. 12A is a schematic timing diagram of frequency modulation signal 217, having a frequency-modulated substantially sinusoidal configuration, according to exemplary embodiments. FIG. 12B is a schematic timing diagram of frequency modulation signal 217A, having a frequency-modulated substantially square wave configuration, according to exemplary embodiments. FIG. 12C is a schematic timing diagram of envelope-modulated optical signal 219, generated using substantially sinusoidal frequency modulation signal 217 of FIG. 12A, according to exemplary embodiments. FIG. 12D is a schematic timing diagram of the frequency deviation versus time for the frequency modulation signals 217 and 217A of FIGS. 12A and 12B, according to exemplary embodiments. Referring to FIGS. 11 and 12A-12D, the LiDAR antenna or transmit optics 280 transmit envelope-modulated optical signal 219 toward an object at range, R. The change in frequency of the envelope modulation waveform is linear over a finite duration of time, ΔT, and frequency deviation, ΔF. It should be noted that, according to the exemplary embodiments, other envelope frequency modulation waveforms may be utilized, e.g., FSK (frequency shift keying), stepped-FSK, PRFM (pseudo-random frequency modulation), etc.

Upon incidence with an object within the beam width of transmit antenna 280, the transmitted signal is scattered or reflected, in accordance with the geometric and other physical properties of the object. A fraction of the scattered signal is received by the LiDAR light detector where the FM-modulated envelope is recovered and subsequently amplified by the transimpedance amplifier 258.

The recovered/amplified FM modulation waveform envelop is further processed with band pass filter 260 centered at the arithmetic mean of the frequency limits $(f_2-f_1)/2$ and bandwidth commensurate with the envelope modulation frequency limits $(f_2-f_1)$. Band pass filter 260 rejects extraneous signals as well as broad band noise from TIA 258 and 1/f noise of detector 256 and TIA 258. The received signal propagates to the input of the quadrature demodulator where the difference frequency is detected and applied to ADCs 270, 272. The frequency difference results from the time delay difference between the two-way range time delay and the coherent local oscillator at the input to the quadrature demodulator.

Figure 13:
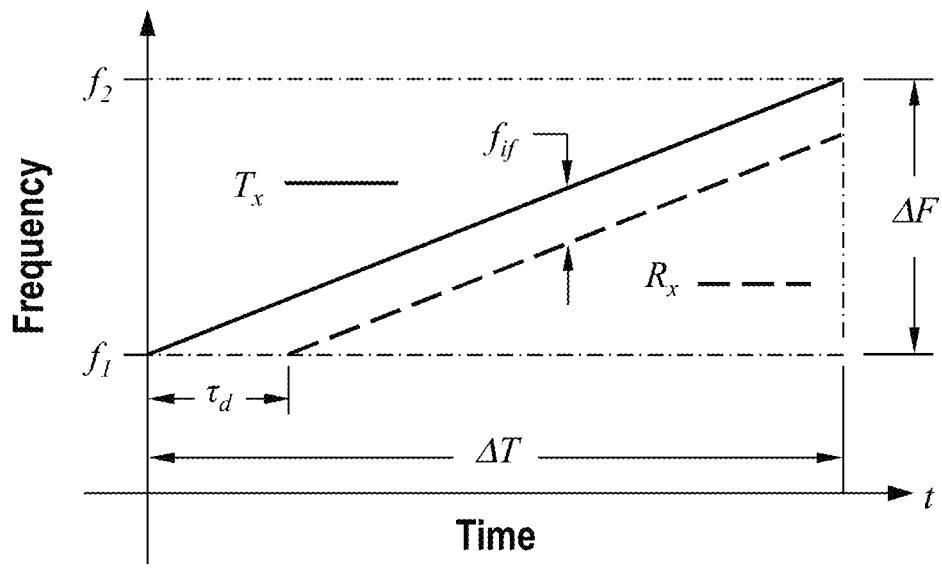
FIG. 13 includes a schematic illustration of a graph of frequency versus time to illustrate the intermediate frequency (IF) output frequency from a target object, with range-associated time delay $\tau_d$.

According to exemplary embodiments, coherent detection of the linear FM modulation envelope provides range information in accordance with the graph of FIG. 13, which includes a schematic illustration of a graph of frequency versus time to illustrate the intermediate frequency (IF) output frequency from a target object, with range-associated time delay, $\tau_d$. FIG. 13 illustrates the relationship between the transmit signal, the received (delayed) signal and the resulting difference frequency. Referring to FIG. 13, the signal frequency at the output of the quadrature demodulator may be written according to equation (6):

$$f_{if} = \tau_d \cdot \frac{\Delta F}{\Delta T} = \frac{2R}{c} \cdot \frac{\Delta F}{\Delta T}; \quad (6)$$

$\tau_d$: two-way time delay $R$: object range, $\Delta F$: ramp frequency deviation $\Delta T$: ramp deviation interval $c$: speed of light The ADCs 270, 272 acquire samples of the quadrature demodulator output during the linear frequency ramp interval, $\Delta T$; the sample sequence is then subjected to spectral analysis. The spectral analysis approach is generally executed in accordance with the Fast Fourier Transform (FFT), which implements a filter bank of discrete range bins. Each range bin is examined to determine if a signal is present at a specific threshold level.

Figure 14:
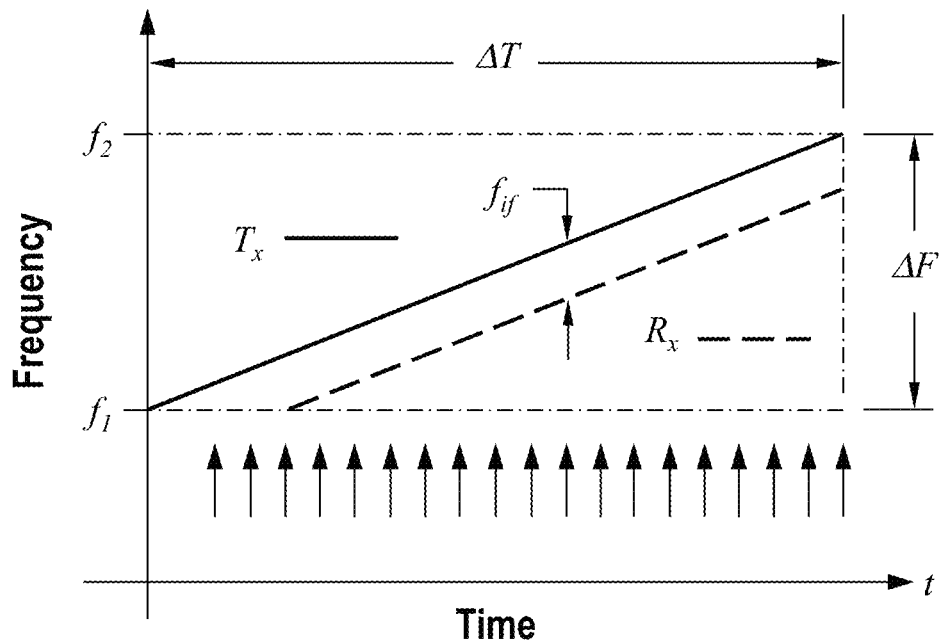
FIG. 14 includes a schematic timing diagram of ADC sampling of I-channel and Q-channel IF signals, according to exemplary embodiments.

FIG. 14 includes a schematic timing diagram of ADC sampling of I-channel and Q-channel IF signals, according to exemplary embodiments. Referring to FIG. 14, during the transmit interval, the I-channel IF signal and Q-channel IF signal are continually sampled by ADCs 270, 272, and the samples are stored within the DSPC 268 memory. In FIG. 14, the ADC samples are represented by the vertical arrows. The sampling rate, $f_s$, is the number of samples, N, divided by the frequency ramp time, $\Delta T$, and must be greater than highest IF frequency (for I/Q sampling) in order to comply with the Nyquist sampling rule. Therefore:

$$f_s \geq f_{IF\_max} = \frac{2R_{max}}{c} \cdot \frac{\Delta F}{\Delta T}; \quad (7)$$

Data acquisition and signal processing techniques that may be utilized in conjunction with the FMCW envelope modulation LiDAR system and quadrature demodulation, according to some exemplary embodiments, is now described in detail. In addition to the one-dimensional FFT processing described above, a two-dimensional FFT may be executed which further enhances the detection process and provides Doppler frequency detection. Two-dimensional FFT is also described in detail herein, where a processing gain of 24.1 dB is calculated for the 256 point range FFT and 21.1 dB for the 128 point Doppler FFT.

Figure 15:
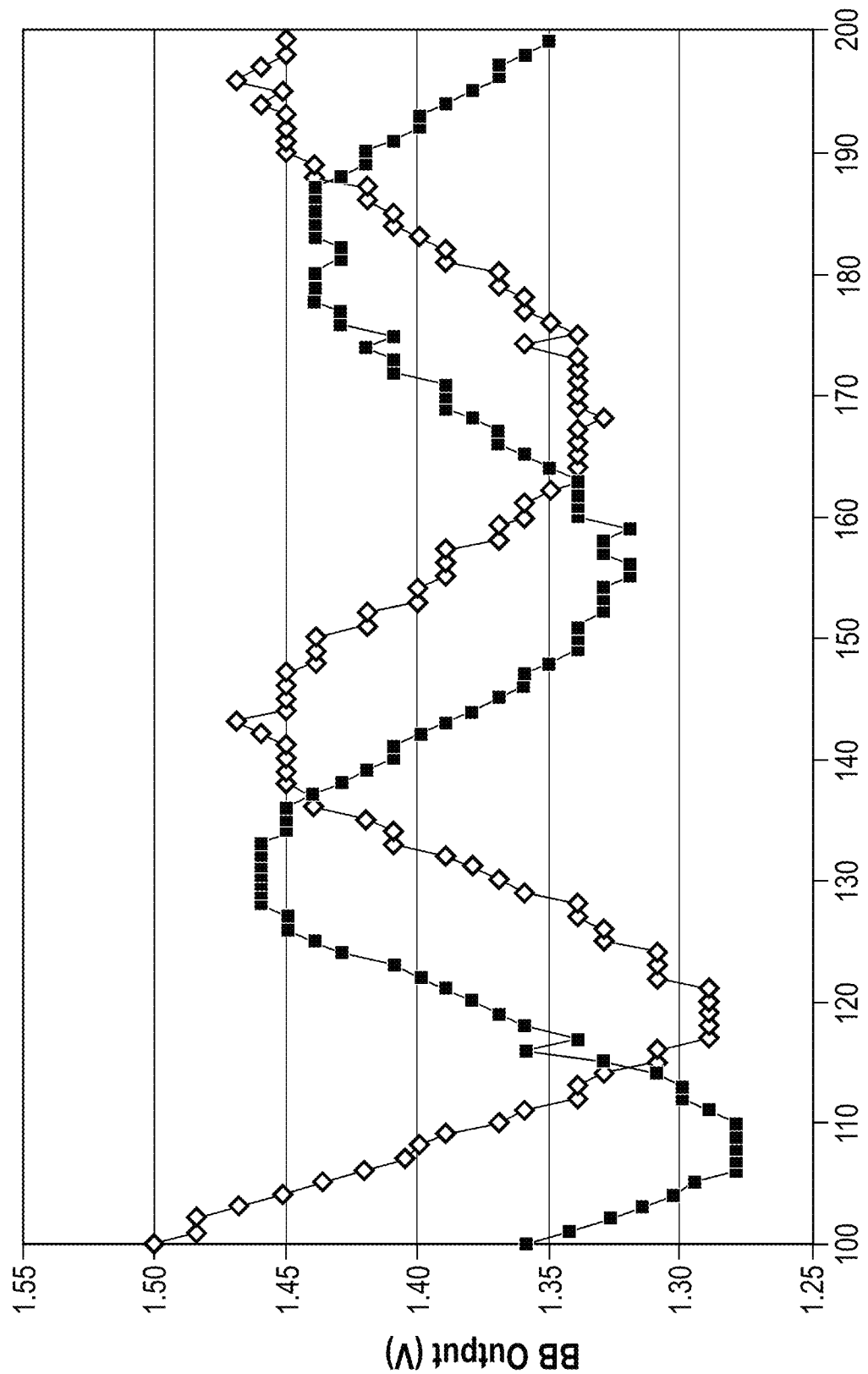
FIG. 15 includes a graph having two curves which illustrate experimental data of the FMCW envelope modulation LiDAR system according to exemplary embodiments.

FIG. 15 includes a graph having two curves which illustrate experimental data of the FMCW envelope modulation LiDAR system 200 according to exemplary embodiments. Referring to FIG. 15, the curve marked by "diamonds" or 45-degree-rotated squares is the I-channel signal, and the curve marked by upright squares is the Q-channel signal. The experiment illustrated by FIG. 15 was executed in static mode, i.e., the frequency was manually changed from 100 MHz to 200 MHz in 1.0 MHz increments, while the I-channel and Q-channel amplitude was recorded at each frequency step. The graphs of FIG. 15 illustrate quadrature signals, as expected, and an illustrative exemplary object range of approximately 3.0 meters. The range was calculated by noting the frequency change required for a full cycle ($2\pi$) of either I-channel or Q-channel and execution within the following equation (8):

$$\Delta\phi = 2\pi \cdot \frac{2R}{c} \cdot (f_2 - f_1) = 2\pi \quad (8)$$

solving for $$R = \frac{c}{2(f_2 - f_1)} = 3.0 \text{ meter}$$

In addition to a single object within the transmit optics beam width, additional objects engender additional IF frequencies directly proportional to the individual object range. A useful technique for the detection of multiple objects uses spectral resolution of the aggregate sampled data. The FFT is a computationally efficient procedure for the calculation of the Discrete Fourier Transform (DFT), which implements a set of identical filters, or a filter bank, distributed uniformly over the frequency domain at intervals of 1/NT, where T is the time interval over which N samples of a waveform have been acquired (also $\Delta T$ in this case). The FFT is particularly well suited to IF spectral resolution in FMCW radars because the narrow information bandwidth requires a filter bank which may be implemented numerically with a modest capability digital signal processor. As noted above, FIG. 9 is a schematic diagram which illustrates the filter bank attributes of the FFT, according to exemplary embodiments. The impact of the filter bank is quite significant because the signal energy from each detected object is concentrated within a single filter of the filter bank to the extent of the range resolution; and of greater significance is the reduction in the noise detection bandwidth which improves the signal-to-noise ratio. The initial noise detection bandwidth is the low-pass filter 266, 268 which follows the I-channel and Q-channel mixers with cut-off frequency established by the IF signal frequency at the maximum range as previously defined.

The processing gain of the N-point FFT is given by:

$$PG_{dB} = 10 \cdot \log\left(\frac{f_{IF\_max}}{f_s/N}\right) = 10 \cdot \log\left(\frac{f_s}{f_s/N}\right) = 10 \cdot \log(N); \qquad (9)$$

Upon acquisition of I-channel and Q-channel data, the signal processing procedure, e.g., FFT, is executed, and each filter is tested for signal level and compared to a previously established threshold. The threshold test is utilized to determine the presence or absence of an object and may initiate additional techniques of object discrimination.

Figure 16:
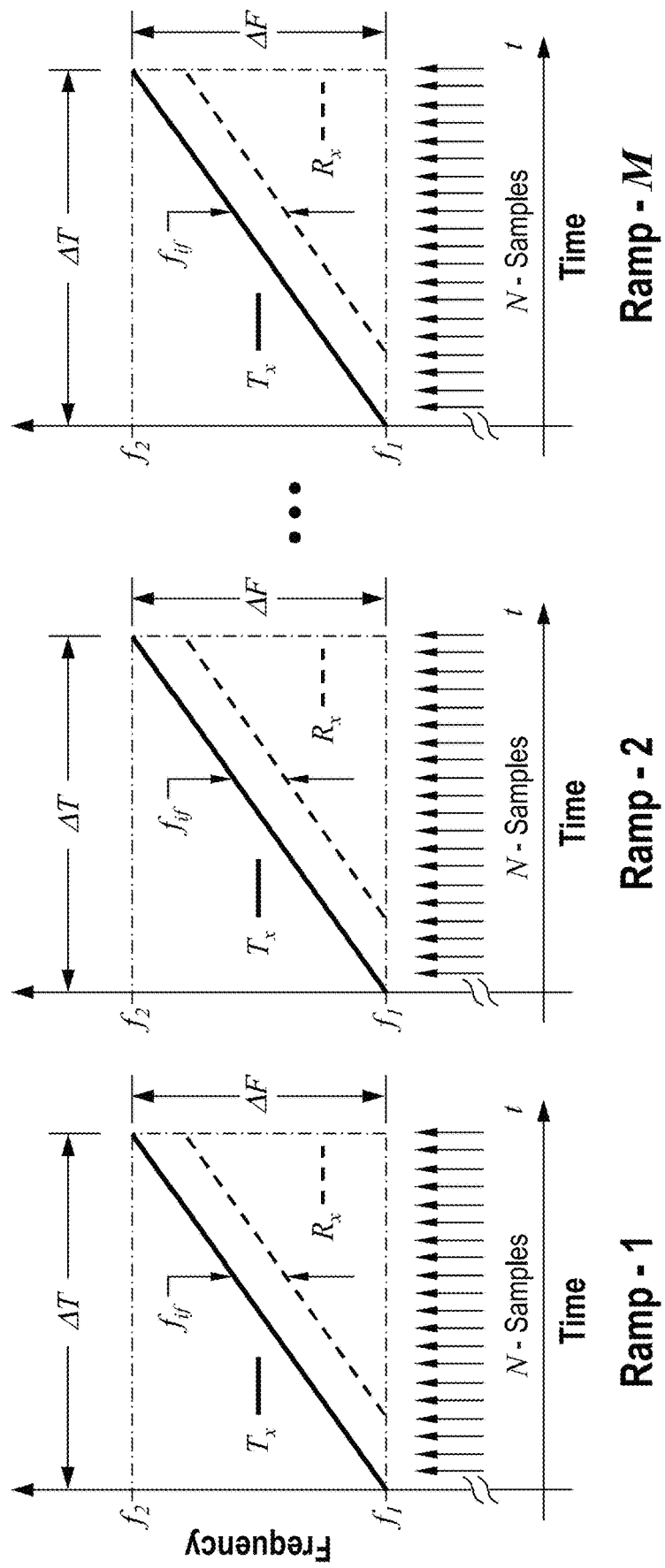
FIG. 16 includes schematic timing diagrams of multiple-frequency-ramp data acquisition for two-dimensional FFT processing, according to exemplary embodiments.

In addition to the FFT processing of a singular frequency ramp data, referred to as one-dimensional FFT, according to the exemplary embodiments, additional signal processing gain is achieved via the two-dimensional FFT procedure, where sampled data is acquired from multiple frequency ramps in order to extract object relative velocity as related to Doppler frequency and to further reduce the noise detection bandwidth and thereby provide additional processing gain. The two-dimensional FFT uses sampled data from multiple frequency ramps as illustrated in FIG. 16, which includes schematic timing diagrams of multiple-frequency-ramp data acquisition for two-dimensional FFT processing, according to exemplary embodiments.

Figure 17:
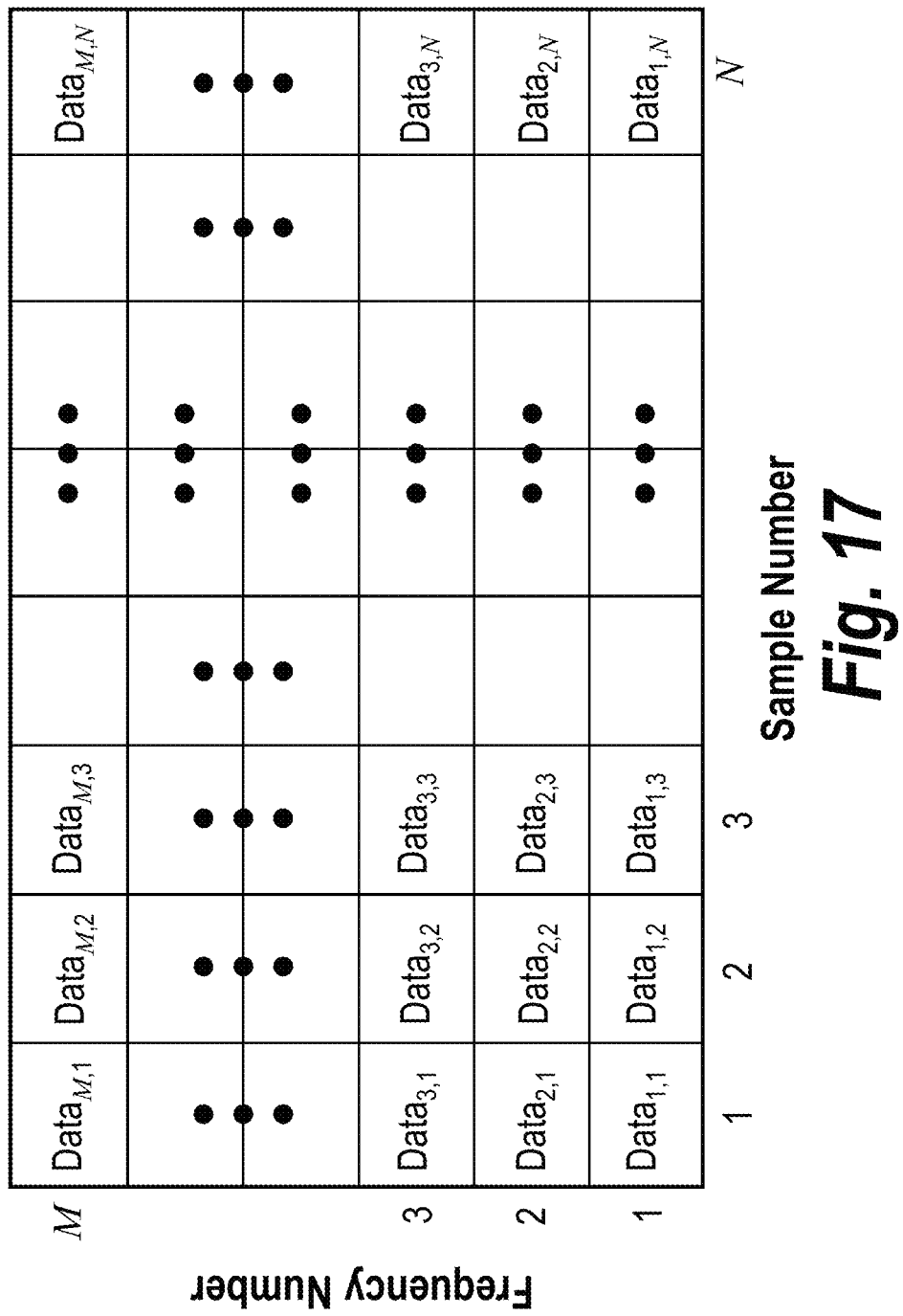
FIG. 17 includes a schematic illustration of an M×N data matrix for the two-dimensional FFT approach, which is populated by samples from each frequency ramp, according to exemplary embodiments.

The two-dimensional FFT process procedure is further illustrated in FIG. 17, which includes a schematic illustration of an M×N data matrix for the two-dimensional FFT approach, which is populated by samples from each frequency ramp, according to exemplary embodiments. Referring to FIG. 17, the range FFT may be executed on rows of the data matrix, while the Doppler FFT may be executed on columns of the data matrix. Additional processing is used to associate or identify specific objects with the appropriate Doppler frequency (velocity).

Continuing to refer to FIG. 17, according to the two-dimensional FMCW signal processing for FMCW LiDAR system 200, the data matrix is filled in a similar manner to the pulse burst LiDAR data matrix described above in detail. However, in the case of the FMCW LiDAR system 200, the rows of the data matrix are populated with samples acquired during the linear frequency ramp. The columns of the data matrix are populated from samples at discrete frequencies of the linear ramp at a fixed time following the initiation of the linear frequency ramp. The data matrix is generated from N samples from each of M frequency ramps over a frequency differential of $\Delta F = f_2 - f_1$, where $f_2 = 200$ MHz and $f_1 = 100$ MHz, in this particular exemplary embodiment. The N samples are obtained over the time interval $\Delta T$ at a sample frequency or sample rate $f_{sR}$ samples per second (SPS).

Continuing to refer to FIG. 17, in the data matrix for FMCW LiDAR system 200, the row data represents receive signal samples from each channel of the quadrature demodulator during the frequency ramp time interval; subsequent FFT processing is referred to as the range-FFT. The column data represents received signal samples from each channel of the quadrature demodulator for the corresponding discrete time point of each frequency ramp, and is referred to as the Doppler-FFT. Two-dimensional FMCW signal processing realizes substantial signal processing gain advantages. Unlike the range-Doppler processing of pulse burst envelope modulation LiDAR 100 described above in detail, in the FMCW LiDAR system 200, the range samples require a less restrictive sampling rate, i.e., the pulse burst envelope modulation LiDAR 100 requires a minimum of one sample at each range bin, which translates to a minimum sampling rate of $1/\tau_w$; while the FMCW LiDAR system 200 requires a minimum range sampling rate in accordance with the IF frequency at the maximum operational range. This is significant because high-speed ADCs have higher cost. Stated mathematically:

$$f_s \geq f_{IF} = \frac{2R_{max}}{c} \cdot \frac{\Delta F}{\Delta T}; \qquad (10)$$

$f_s$: sampling rate $R_{max}$: maximum operational range $c$: speed of light $\Delta F$: ramp frequency deviation $\Delta T$: time of frequency ramp FIG. 18 includes a table which lists exemplary parametric data values for an exemplary illustrative operational configuration of FMCW LiDAR system 200, according to exemplary embodiments. The parametric data of FIG. 18 are presented herein as a typical road vehicle application example to serve as the basis for performance calculations. It should be emphasized that parametric data, particularly velocity, range, range resolution, data cycle time and object detection geometry, are application-specific parameters, and, therefore, large variations from the exemplary values in FIG. 18 are to be expected for other operational scenarios.

Referring to FIGS. 17 and 18, in order to achieve the maximum processing gain afforded by the two-dimensional FFT calculation, the object of detection must remain within a single range resolution cell for the duration of the data acquisition time, $T_{acq}$. For the FMCW modulation waveform, the range resolution cell is determined in accordance with the formula:

$$\delta R = \frac{c}{2 \cdot \Delta F} = \frac{3.0 \cdot 10^8}{2 \cdot 128 \cdot 10^6} = 1.17; \qquad (11)$$

$\delta R$: range resolution cell (meter)

$c$: speed of light (meter/second)

$\Delta F$: frequency deviation (Hz)

At the maximum closing velocity, the object range cell dwell time may be written:

$$T_{dw} = \frac{\delta R}{v_{max}} = 0.0167; \qquad (12)$$

$T_{dw}$: range cell time (second)

$v_{max}$: 70 (meter/second)

The data acquisition time is the time required to fill the data matrix and may be written:

$$T_{acq} = M \cdot \Delta T = 0.0168;$$

$T_{acq}$: data acquisition time (second)

$M$: number of frequency ramps $\Delta T$: frequency ramp time (second) $\qquad (13)$ A comparison of the range cell object dwell time and data acquisition time indicates compliance with the condition for optimum processing gain.

The minimum number of range samples affects the range signal processing gain and is limited by the IF frequency at maximum operational range in accordance with the equation:

$$f_{if\_max} = \frac{2R_{max}}{c} \cdot \frac{\Delta F}{\Delta T} = 1.0 \cdot 10^6; \qquad (14)$$

$f_{if\_max_{max}}$: IF frequency at maximum range (Hz)

$R_{max}$: maximum operational range (meter)

Therefore, the minimum number of samples may be found via the following equation (15):

$$N_{min} = f_{if\_max} \cdot \Delta T = 128 \qquad (15)$$

It is noted that for additional processing gain, the sample rate may be increased. In that case, ADCs 270, 272 would be capable of the higher sampling rate without compromising performance. For the illustrative exemplary embodiments, the number of samples has been increased to provide greater processing gain, particularly for the condition in which the object straddles an adjacent range bin. The number of samples and the range sampling rate for the illustrative example may now be written:

$N = 256$ samples per frequency ramp $$f_{sR} = 2.0 \cdot 10^6 \text{ samples per second} \qquad (16)$$

Continuing with the parametric definitions and numerical analysis, the maximum Doppler frequency may be calculated from a knowledge of the nominal envelope modulation wavelength/frequency and the maximum velocity:

$$f_{D\_max} = \frac{2 \cdot v_{max}}{\lambda_m} = 2 \cdot v_{max} \frac{f_m}{c} = 466; \qquad (17)$$

$f_{D\_max}$: maximum Doppler Frequency (Hz)

$\lambda_m$: modulation wavelength (meter)

$f_m$: modulation frequency (Hz)

In some exemplary embodiments, the modulation frequency is generally limited by the laser modulator, and is typically less than 2 GHz for low cost modulators; although significantly higher frequency laser modulators have been reported.

It is beneficial to calculate the noise detection bandwidth for both range and Doppler parameters, as indicated below in equations (18). The range and Doppler bandwidths are significant in the detection process because the noise level is determined by their values.

$$B_{wR} = \frac{f_{sR}}{N} = 7812.5; \qquad (18)$$

$B_{wR}$: FFT range bandwidth (Hz)

$f_{sR}$: range sample rate (samples/second)

$N$: number of range samples;

$$B_{wD} = \frac{f_{sD}}{M} = \frac{1}{M \cdot \Delta T} = 61;$$

$f_{sD}$: Doppler sample rate (samples/second)

$M$: number of Doppler samples

It is noted that the ratio of the range sample rate to the Doppler sample rate provides the Doppler processing gain estimate, and is in addition to the range signal processing gain.

The processing gain for the range and Doppler FFT may be estimated using the following equations (19):

$$PG_{R\_dB} = 10 \cdot \log(N) = 24.1 \text{ dB}$$

$$PG_{D\_dB} = 10 \cdot \log(M) = 21.1 \text{ dB} \qquad (19)$$

Significant elements of the exemplary embodiments include the change in transmission phase shift of the envelope modulation waveform over the two-way range to the object, and coherent detection of the envelop modulation waveform within the quadrature demodulator. The local oscillator for the quadrature demodulator is also the source of the envelope modulation signal.

A fundamental feature of transmitter envelope modulation according to the exemplary embodiments is that upon transmission, the modulation envelope is subject to phase delay in accordance with the envelope modulation frequency. Upon recovery of the modulation envelope in the photo detector diode, the amplitude and transmission phase of the modulation envelope are detected within the quadrature demodulator.

According to the exemplary embodiments, the total transmission phase shift in the two-way range from LiDAR to object is described by the following equation (20):

$$\Delta \phi = 2\pi \frac{2R}{\lambda}; \qquad (20)$$

$\Delta \phi$: transmission phase shift $R$: range to object $\lambda$: envelope modulation wavelength According to the exemplary embodiments, the mathematical development of Doppler frequency follows:

$$R = 2(R_o + v \cdot t) \qquad (21)$$

$R_o$ fixed range to object $v \cdot t$ is the change in range, i.e. the velocity-time product upon substitution $$\Delta \phi = 2\pi \frac{2R_o}{\lambda_{mod}} + 2\pi \frac{2v \cdot t}{\lambda_{mod}}$$

Doppler frequency is defined: $f_{Doppler} = \frac{1}{2\pi} \frac{d\Delta \phi}{dt}$ executing the differential: $f_{Doppler} = \frac{2 \cdot v}{\lambda_{mod}}$ Throughout the present Detailed Description, embodiments have been described in which the envelope modulation waveform varies linearly with a positive frequency/ramp slope, that is, with the frequency of the envelope modulation increasing with time in a linear ramp function, such as that illustrated in FIG. 12D. It will be understood that the present disclosure is also applicable to linear ramp envelope modulation waveforms which have a negative slope as well, that is, an envelope modulation in which the frequency of the envelope decreases over time instead of increases.

Figure 20:
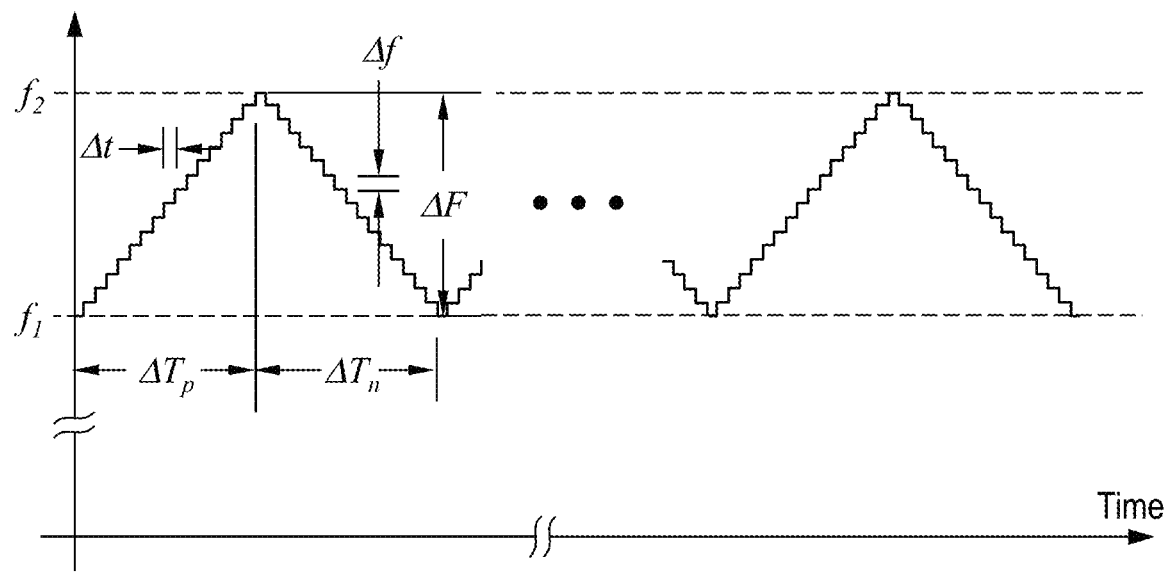
FIG. 20 is a schematic timing diagram of the frequency deviation versus time for a step frequency ramp envelope modulation waveform, according to exemplary embodiments.
Figure 21:
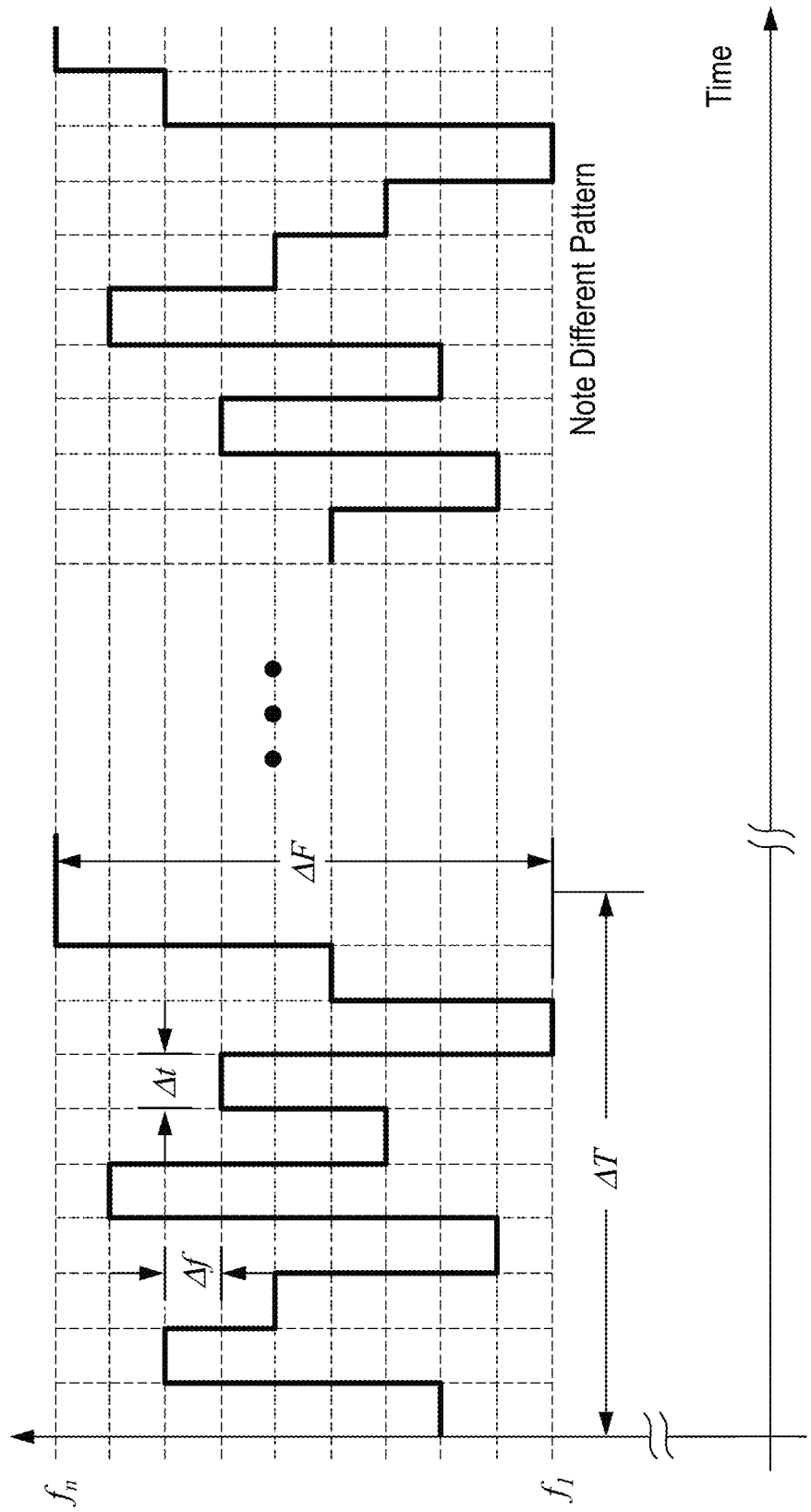
FIG. 21 is a schematic timing diagram of the frequency deviation versus time for a pseudo-random step frequency envelope modulation waveform, according to exemplary embodiments.

Furthermore, in addition to the linear ramp FMCW waveforms described in detail herein, the present disclosure is also applicable to other alternate envelope modulation waveforms, which offer some flexibility and in some cases, unique operational advantages. Such alternate envelope modulation waveforms can include, positive/negative linear frequency ramp envelope modulation waveforms, step-frequency ramp envelope modulation waveforms, and pseudo-random envelope frequency modulation (FM) waveforms. Examples of these waveforms are illustrated in FIGS. 19, 20 and 21, respectively.

Figure 19:
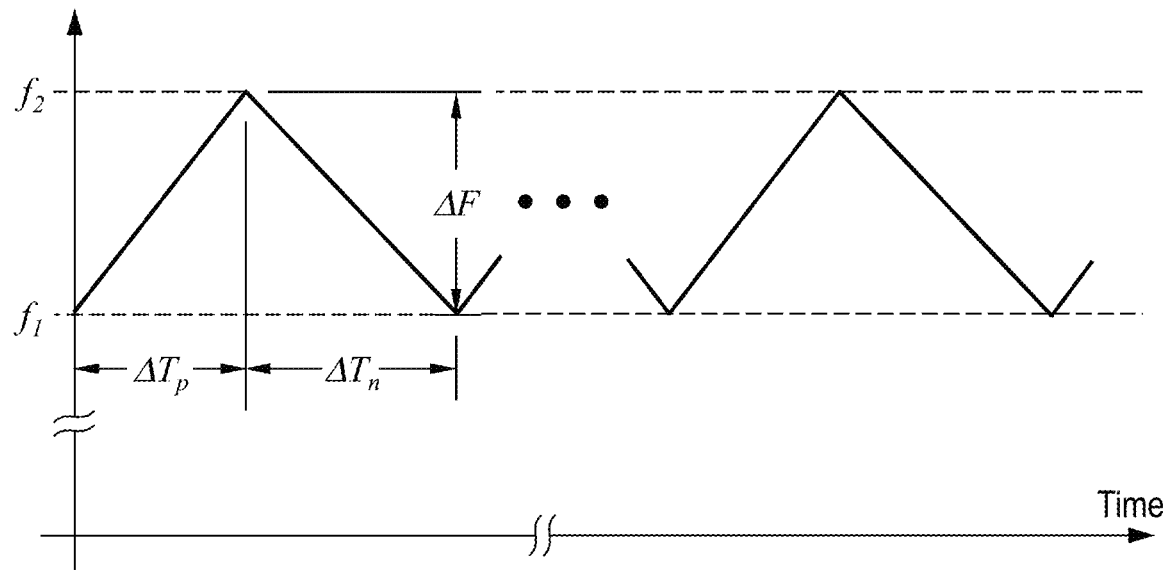
FIG. 19 is a schematic timing diagram of the frequency deviation versus time for a linear frequency ramp envelope modulation waveform having a combination of positive and negative frequency/time ramp envelope modulation slope, according to exemplary embodiments.

FIG. 19 is a schematic timing diagram of the frequency deviation versus time for a linear frequency ramp envelope modulation waveform having a combination of positive and negative frequency/time ramp envelope modulation slope, according to exemplary embodiments. Referring to FIG. 19, positive and negative frequency ramps are used together with equal or unequal time duration. When the positive and negative ramps are deployed collectively, Doppler frequency measurement can be implemented in accordance with the following. With reference to the equation for the IF frequency at the I-Ch and Q-Ch outputs 205, 207 of LiDAR system 200 illustrated in the block diagram of FIG. 11:

$$f_{if} = \frac{2R_o}{c} \cdot \frac{\Delta F}{\Delta T} \quad (22)$$

$$f_{Doppler} = \frac{2 \cdot v}{\lambda_{mod}} \quad (23)$$

Upon substitution for the variable range, the IF equation may be written:

$$f_{if} = \frac{2 \cdot R_o}{c} \cdot \frac{\Delta F}{\Delta T} + \frac{2 \cdot v}{\lambda_{mod}} = \frac{2 \cdot R_o}{c} \cdot \frac{\Delta F}{\Delta T} \pm f_{Doppler} \quad (24)$$

Therefore, the IF frequency includes two components: a component at the start of the ramp due to the initial range ($R_o$); and a component due to the change in range due to relative velocity, (v·t). The positive or negative slope of the ramp imparts a positive or negative offset to the IF frequency, which, upon spectral resolution of the acquired data set during each frequency ramp, provides the Doppler frequency. The Doppler frequency has a positive/negative (±) effect dependent on increasing (−) or decreasing (+) range due to velocity.

FIG. 20 is a schematic timing diagram of the frequency deviation versus time for a step frequency ramp envelope modulation waveform, according to exemplary embodiments. A difference between the linear frequency ramp and the step frequency ramp is the time dwell at discrete frequency points.

According to the exemplary embodiments, parametric operational considerations for the step frequency ramp are made. For example, in some exemplary embodiments, the frequency step (Δf) does not exceed the value which engenders a two-way phase shift of greater than 2π at the maximum range of operation. The condition may be mathematically illustrated by the following equations (25)

$$\Delta \phi = 2\pi \frac{2 \cdot R_{max}}{c} \cdot \Delta f \le 2\pi \text{ or} \quad (25)$$

$$\Delta f \le \frac{c}{2 \cdot R_{max}};$$

$\Delta f$: maximum frequency step (Hz)

$c$ speed of light (meter/second)

$R_{max}$: maximum operational range (meter), e.g., if $R_{max} = 150$ meter, $\Delta f \le 1.0 \cdot 10^6$ Hz Also, besides the maximum frequency step increment, the frequency dwells at a fixed value for a time increment greater than the two-way time of flight to the target at the maximum range of operation. Expressed mathematically in equations (26):

$$\Delta t \ge \frac{2 \cdot R_{max}}{c}, \quad (26)$$

e.g., if $R_{max} = 150$ meter, $\Delta t \ge 1.0 \cdot 10^{-6}$

FIG. 21 is a schematic timing diagram of the frequency deviation versus time for a pseudo-random step frequency envelope modulation waveform, according to exemplary embodiments. The pseudo-random step frequency envelop modulation waveform is similar in some respects to the step frequency waveform illustrated in FIG. 20 and has similar restrictions with qualifications. The pseudo-random step frequency envelop modulation waveform of FIG. 21 may be used, for example, to mitigate interference from multiple LiDAR sensors or systems operating in a common environment.

Referring to FIG. 21, the frequency is pseudo-randomly stepped over the time interval in a manner which allocates a single frequency of the composite linear ramp to a known time position. Additional processing is performed to assemble the acquired data points in a manner which reconstructs the linear frequency ramp. The pseudo-random pattern may be fixed, or the pattern may be altered in each time interval. It is noted that the same restrictions on the magnitude of the frequency and time increments are used for the pseudo-random frequency step waveform. The pseudo-random frequency step waveform is particularly useful within an environment in which multiple LiDAR systems are operational and interference is to be mitigated.

According to the exemplary embodiments described herein in detail, transmitter envelope modulation and receiver quadrature demodulation techniques are applied to direct detection LiDAR systems. The technique of transmit envelope modulation in conjunction with receive quadrature demodulation as applied to direct detection LiDAR systems is demonstrated to provide signal processing gain as determined by the increase in the signal-to-noise ratio at the system detection stage. Significant operational factors in connection with the exemplary embodiments include the change in transmission phase shift of the envelope modulation waveform over the two-way range to the object, and coherent detection of the envelope modulation waveform within the quadrature demodulator. In addition, in exemplary embodiments, the envelope modulation waveform is derived from the quadrature demodulation local oscillator, thereby establishing the coherent signal used for detection.

The achievement of signal processing gain in direct detection LiDAR systems according to the present disclosure far exceeds the modest increase in hardware complexity. The availability of integrated circuit phase-locked loop and quadrature demodulation functions provides ease of implementation with minimum impact to system volume, operating power and cost. Also, the LiDAR architecture described in detail herein provides systems with lower transmit power, longer measurement range, reduced power consumption and better performance in multiple-system deployment conditions.

According to exemplary embodiments, a synthetic Doppler technique is employed in a scanning LiDAR detection system to achieve additional signal processing gain. The scanning LiDAR implementation can be of the type described in copending U.S. patent application Ser. No. 15/410,158, filed on Jan. 19, 2017, incorporated herein by reference in its entirety. In that copending application, a scanning LiDAR system is described in detail in connection with FIGS. 14 through 20, which are included herein as FIGS. 22 through 28, respectively. FIGS. 22 through 28 herein and the following detailed description thereof are excerpted and substantially copied from that copending application, with appropriate clerical changes made for clarity and avoidance of inclusion of irrelevant material and excessive redundancy. It should be noted that that scanning and synchronization techniques described in that copending application are described in connection with a step-FM pulse burst transmitted optical signal. It will be understood that the detailed description is applicable to the waveforms and embodiments that are described herein in detail.

In some exemplary embodiments, the LiDAR system can include a microelectromechanical system (MEMS) scanning mirror for enhancing processing of optical signals. MEMS scanning mirrors are one of the technologies for implementation of laser beam scanning. MEMS mirrors are manufactured using semiconductor technology which facilitates high volume manufacturing, repeatable performance and low cost. Additional attributes of the MEMS scanning mirror technology are high tolerance to vibration and operational environment, accurate/rapid scanning, electronic control of scanning mirror position and small volume.

Figure 22:
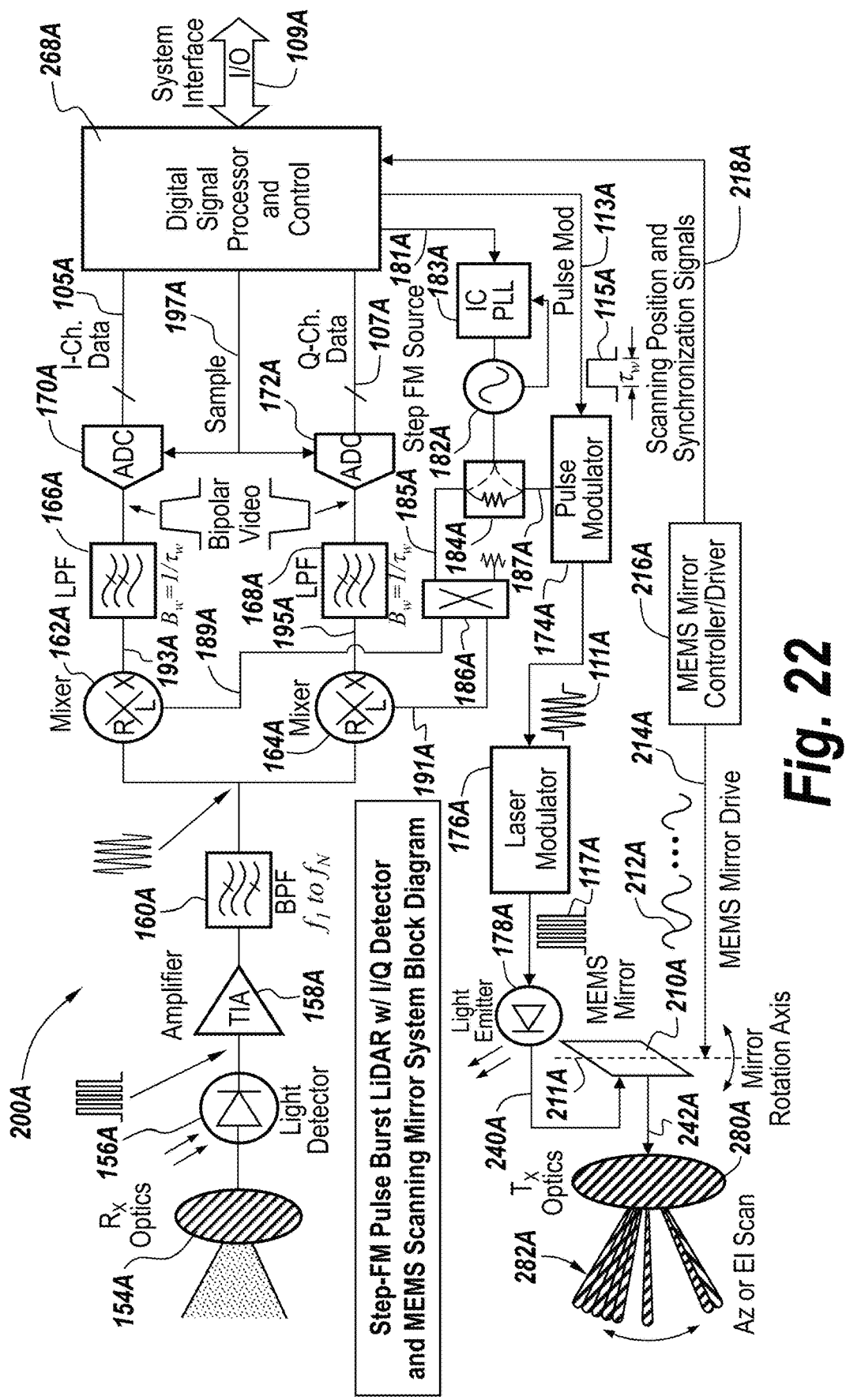
FIG. 22 includes a schematic functional block diagram which illustrates a LiDAR system using step-frequency-modulation (FM) pulse-burst transmit envelope modulation and quadrature demodulation and a MEMS scanning mirror, according to some exemplary embodiments.

FIG. 22 includes a schematic functional block diagram which illustrates a LiDAR system 200A using step-frequency-modulation (FM) pulse-burst transmit envelope modulation and quadrature demodulation and a MEMS scanning mirror, according to some exemplary embodiments. Referring to FIG. 22, LiDAR system 200A according to exemplary embodiments includes receive optics 154A at which optical energy, including optical returns from one or more target objects, are received. The optical energy is received from receive optics 154A at a light detector 156A, which converts the received optical energy to one or more electrical signals, such as, for example, the illustrated square wave signal. The electrical signals are amplified by TIA 158A and filtered by BPF 160A, having a center frequency at the burst modulation frequency $f_1$ to $f_n$. The resulting amplified and filtered signal, illustrated in FIG. 22 as a substantially sinusoidal signal, is applied at node 161A to first inputs of I/Q mixers 162A, 164A.

The modulating step-FM signal is generated by a step-FM source, which includes a voltage-controlled oscillator (VCO) 182A under the control of a control signal from phase-locked loop (PLL) control circuit 183A, which is in turn controlled by DSPC 168A via a control signal on line 181A. The output signal of VCO 182A is applied to a power splitter 184A, which splits the signal and provides the split signal at two outputs. The first output 185A is routed to splitting and phase shifting circuitry or 90-degree power splitter 186A, which splits the signal, applies a phase shift to one of the resulting split signals, and generates a pair of output signals being offset in phase. In exemplary embodiments, a 90-degree phase shift is applied to one of the signals, such that splitting and phase shifting circuitry or 90-degree power splitter 186A generates a first "in-phase" local oscillator (LO) signal 189A and a second "quadrature-phase" or "quadrature" LO signal 191A, which is shifted in phase by 90 degrees with respect to in-phase LO signal 189A. The in-phase and quadrature-phase LO signals 189A, 191A are applied to second "L" inputs of I/Q mixers 162A, 164A, respectively. I/Q mixers 162A, 164A mix the amplified and filtered input signal at node 161A applied at first "R" inputs of I/Q mixers 162A, 164A with the in-phase and quadrature-phase LO signals 189A, 191A, respectively, to generate output signals 193A, 195A, respectively, which are low-pass filtered by low-pass filter (LPF) 166A and LPF 168A, respectively. The resulting filtered analog signals are converted to digital signals by analog-to-digital converters (ADC) 170A, 172A, respectively, and sampled under the control of sample control signal 197A, which is generated by DSPC 168A. The resulting sampled digital I/Q (quadrature) signals, i.e., I-channel and Q-channel signals, 105A, 107A are processed by DSPC 168A to determine range and/or velocity of the one or more target objects. Results of this detection processing performed by DSPC 168A can be forwarded as desired, such as, for example, to a user interface, via a system interface 109A.

Continuing to refer to FIG. 22, the second output 187A of power splitter 184A is routed to a pulse modulator 174A, which converts the substantially sinusoidal signal 187A from power splitter 184A to a pulsed substantially sinusoidal signal 111A. The timing of pulses in the pulsed sinusoidal signal 111A is controlled by step-FM pulse-burst modulation signal 115A on output signal line 113A from DSPC 168A. That is, step-FM pulse-burst modulation signal 115A is used by pulse modulator 174A to modulate substantially sinusoidal signal 187A to generate pulsed substantially sinusoidal signal 111A. The resulting pulsed modulated signal 111A from pulse modulator 174A is applied as a modulation signal to a laser modulator 176A, which generates a control/modulation signal 117A, which is applied to light emitter 178A to generate a step-FM pulse-burst modulated optical signal, which is transmitted to transmit optics 180A, by which the step-FM pulse-burst modulated optical signal is transmitted to the one or more target objects.

Figure 23:
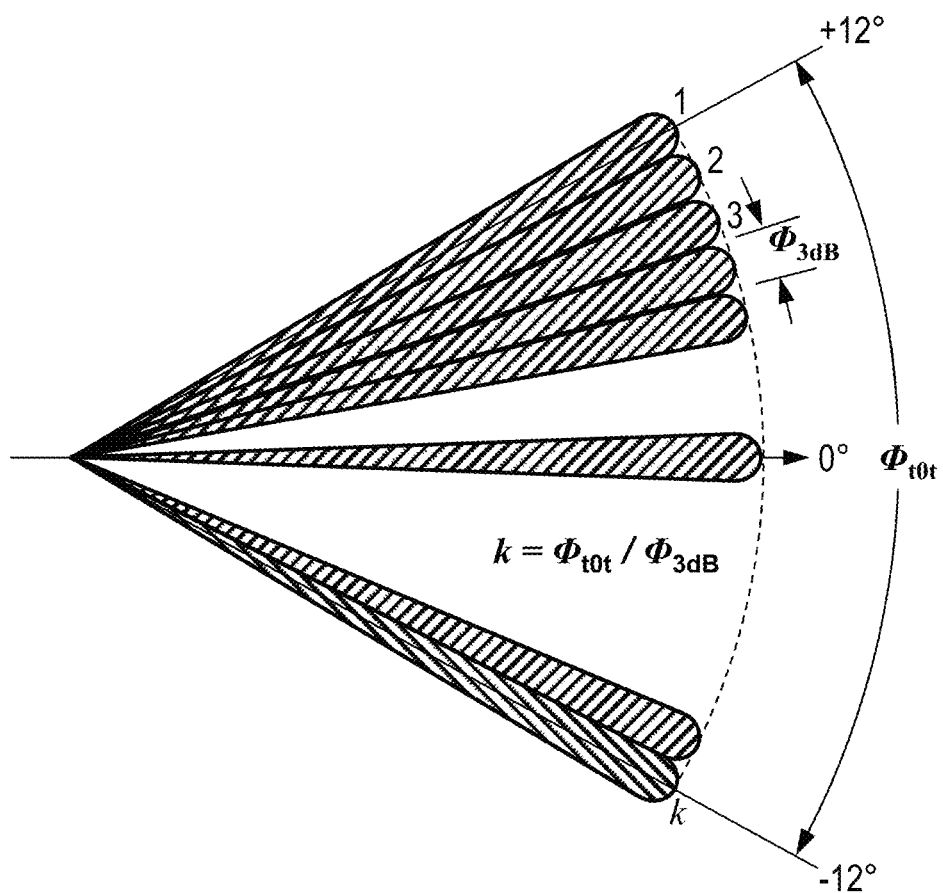
FIG. 23 includes a detailed schematic diagram illustrating MEMS scanning mirror transmit beam pattern as employed in the LiDAR system of FIG. 22, according to some exemplary embodiments.

FIG. 23 includes a detailed schematic diagram illustrating MEMS scanning mirror transmit beam pattern as employed in the LiDAR system 200A of FIG. 22, according to some exemplary embodiments. FIG. 23 schematically illustrates the transmit beam pattern 282A of MEMS scanning mirror 210A, as processed via the transmit optics, according to exemplary embodiments. Referring to FIGS. 22 and 23, in system 200A, a MEMS mirror controller/driver 216A provides a mirror drive signal 212A to MEMS mirror 210A on line 214A, which causes MEMS mirror 210A to rotate about an axis 211A, which can be oriented to provide azimuthal or elevational rotation of MEMS mirror 210A. As illustrated, signal mirror drive signal 212A can be substantially sinusoidal. MEMS scanning mirror 210A tilts to allow high-speed, controlled beam steering in LiDAR range and image applications, as well as a number of other optical systems. The narrow beam width, as represented in FIG. 23, and rapid azimuthal or elevational scanning of MEMS scanning mirror 210A are applicable to high bearing-angle resolution scanning requirements. The step-FM pulse-burst envelope modulation waveform of the present disclosure is well suited to provide complementary high range-resolution and is compatible with the scan rate of MEMS mirror 210A.

The timing of pulses in the pulsed sinusoidal signal 111A is controlled by step-FM pulse-burst modulation signal 115A on output signal line 113A from DSPC 268A. That is, step-FM pulse-burst modulation signal 115A is used by pulse modulator 174A to modulate substantially sinusoidal signal 187A to generate pulsed substantially sinusoidal signal 111A. The resulting pulsed modulated signal 111A from pulse modulator 174A is applied as a modulation signal to a laser modulator 176A, which generates a control/modulation signal 117A, which is applied to light emitter 178A to generate a step-FM pulse-burst modulated optical signal. In system 200A, the step-FM pulse-burst modulated optical signal is transmitted to MEMS mirror 210 along optical path 240, where it is reflected by MEMS mirror 210 along optical path 242A to transmit optics 280A, by which the step-FM pulse-burst modulated optical signal is transmitted to the one or more target objects in the transmit beam pattern 282A of MEMS scanning mirror 210A.

Figure 24:
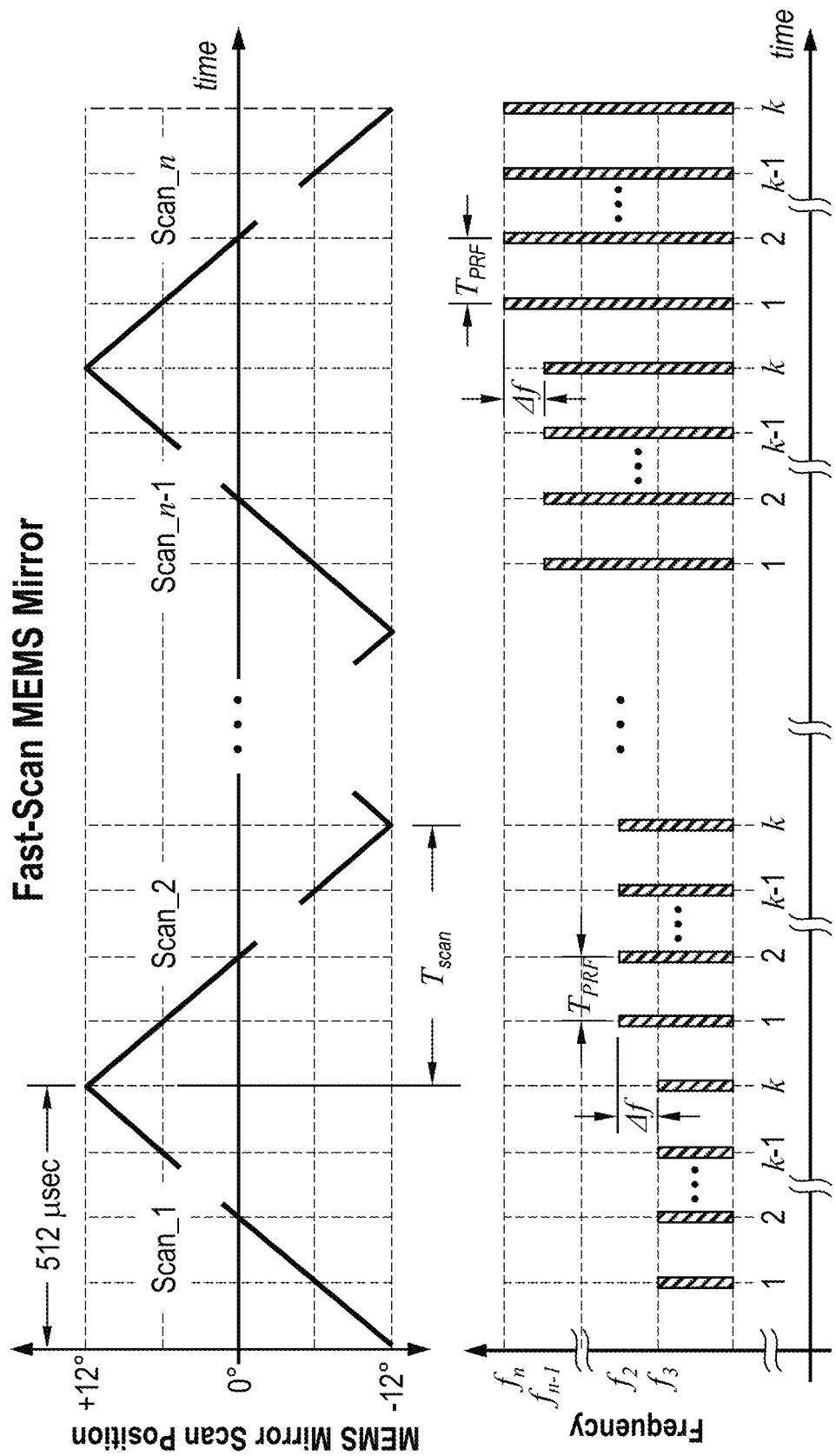
FIG. 24 includes schematic time diagrams illustrating the data acquisition process of the LiDAR system of FIGS. 22 and 23, utilizing a MEMS scanning mirror, with a single pulse burst frequency at each scanning mirror position, according to some exemplary embodiments.

FIG. 24 includes schematic time diagrams illustrating the data acquisition process of LiDAR system 200A utilizing MEMS scanning mirror 210A, with a single pulse burst frequency at each scanning mirror position, according to exemplary embodiments. The top diagram in FIG. 24 illustrates the scan angle, i.e., angular position, of MEMS mirror 210A over time during data acquisition, and the bottom diagram illustrates the step-FM pulse-burst frequency over time during data acquisition. Referring to FIGS. 22 through 24, according to exemplary embodiments, a single, fixed-frequency, pulse-burst cluster is employed at each scan increment for the duration of each scan. The frequency of the fixed-frequency pulse-burst cluster increases by the step frequency, Δf, upon successive scans. Therefore, n scans are used to complete the data acquisition process, where n is the number of frequency steps. FIG. 23 illustrates the synchronization of the pulse burst frequency and the MEMS scanning mirror 210A angular position as scanning mirror 210A beam is scanned. According to exemplary embodiments, data is acquired for each beam position, i.e., scan increment, at each discrete frequency step. It will be noted that, in general, the MEMS mirror position is non-linear with time. However, in exemplary embodiments, via the process of synchronization of the MEMS mirror position with the pulse burst waveform, the effect engenders a linear or synchronized pulse burst relationship with the mirror position.

Figure 25:
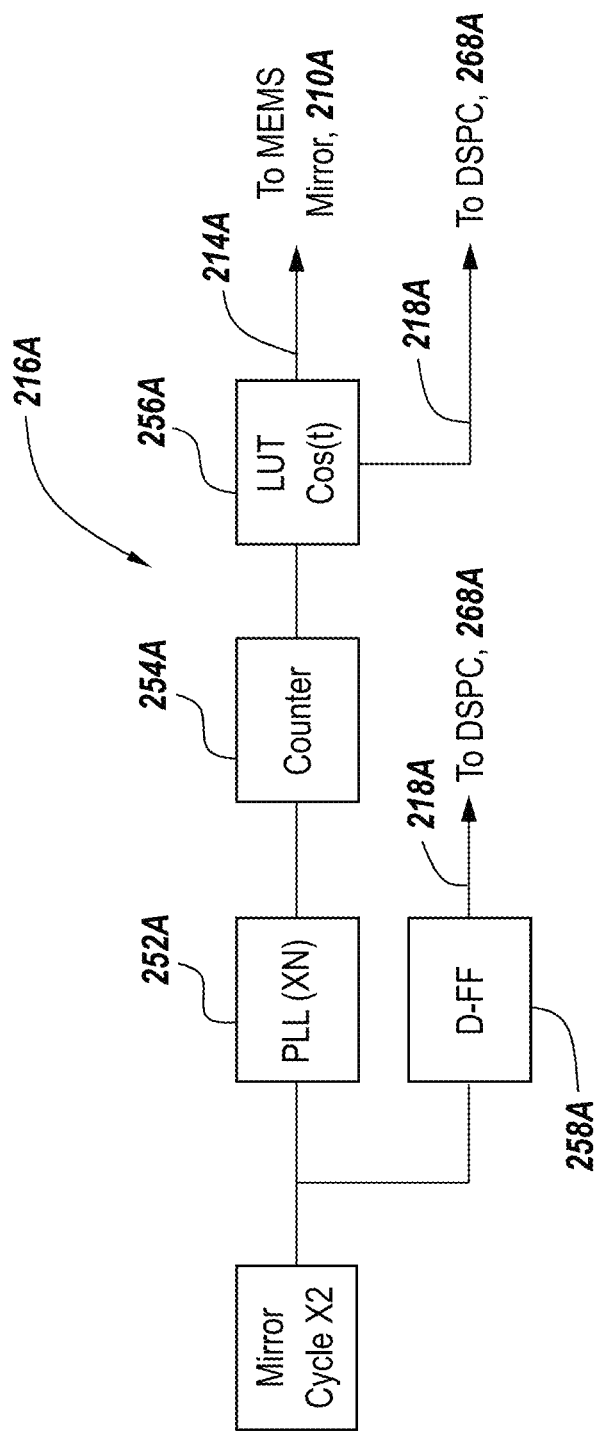
FIG. 25 includes a schematic detailed functional block diagram of a MEMS mirror controller/driver illustrated in FIG. 22, according to some exemplary embodiments.
Figure 26:
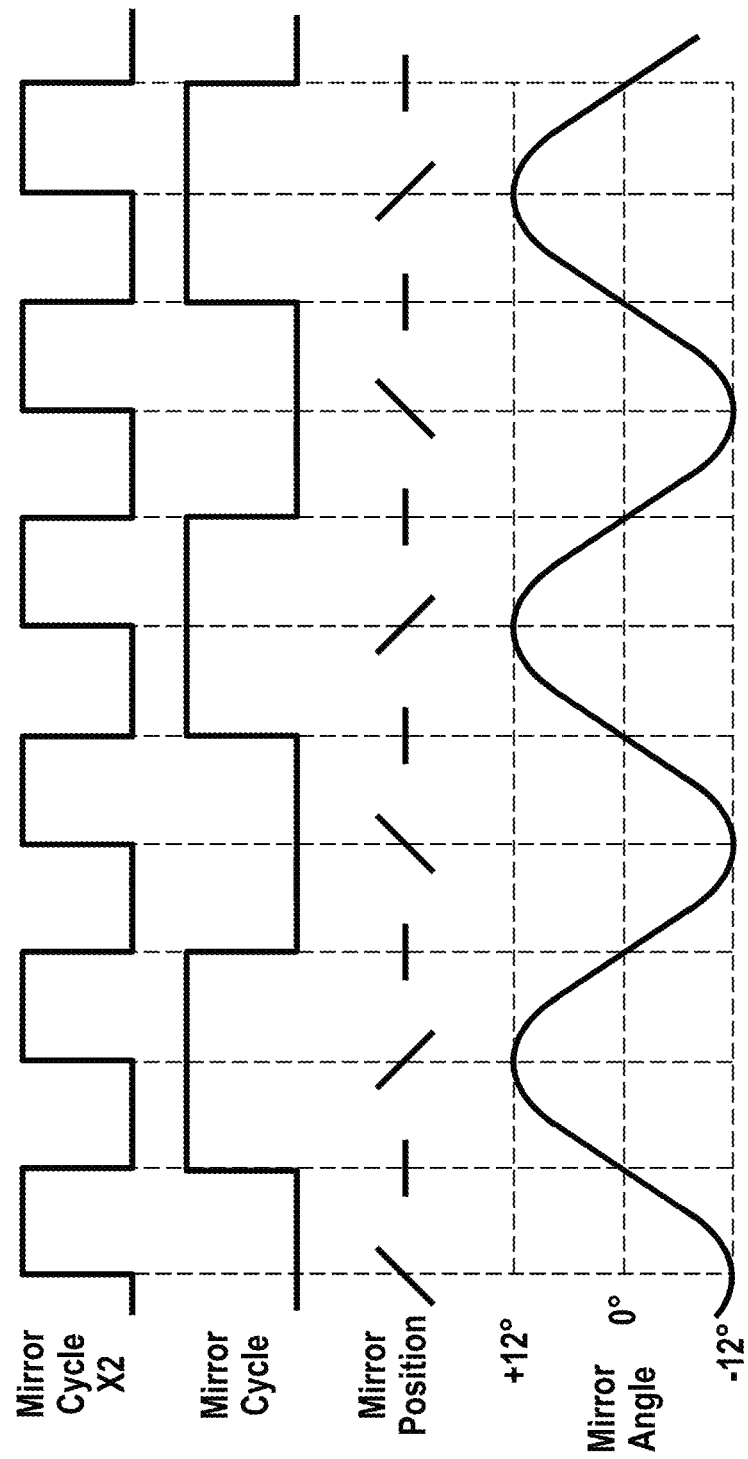
FIG. 26 includes a schematic time diagram illustrating synchronization of step-FM modulation pulses with scanning mirror position provided by MEMS the mirror controller/driver of FIGS. 22 and 25, according to some exemplary embodiments.
Figure 27A:
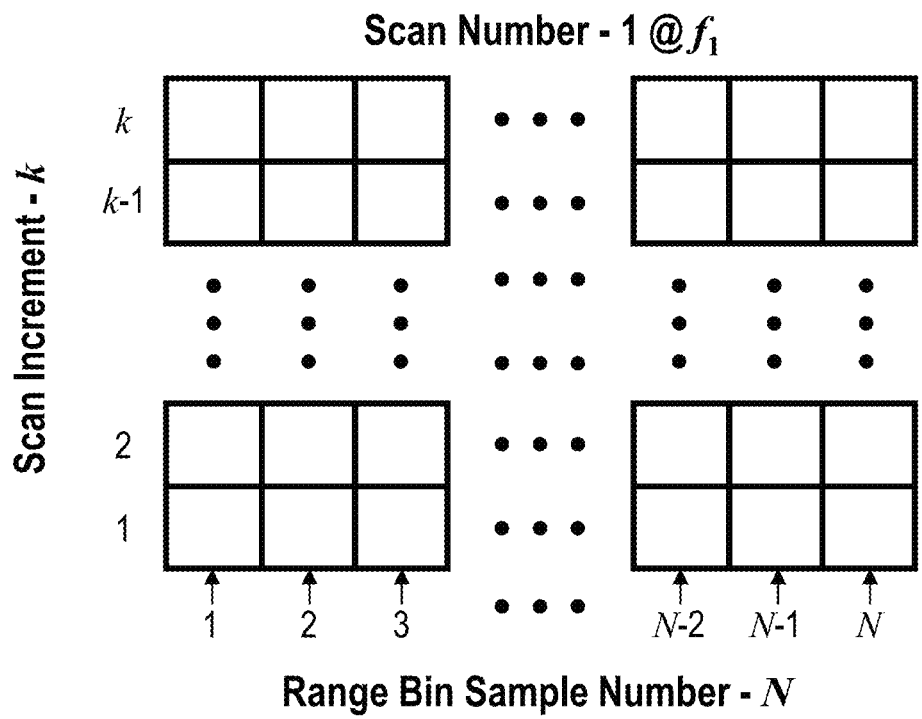
FIGS. 27A through 27D include a series of four illustrative data matrices for the scanning mirror data acquisition, according to some exemplary embodiments.
Figure 27B:
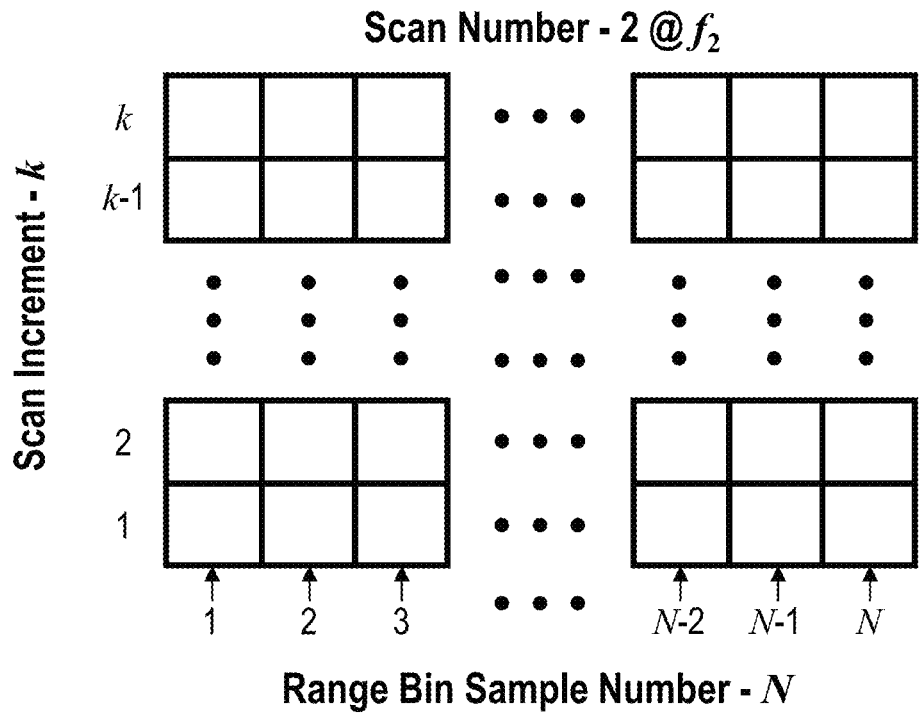
Figure 27C:
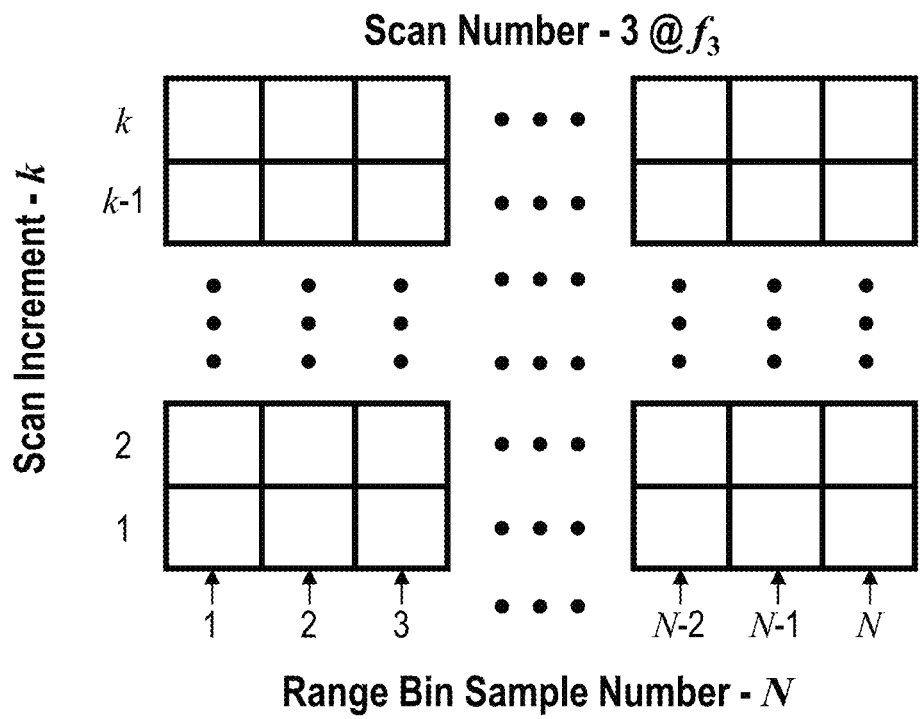
Figure 27D:
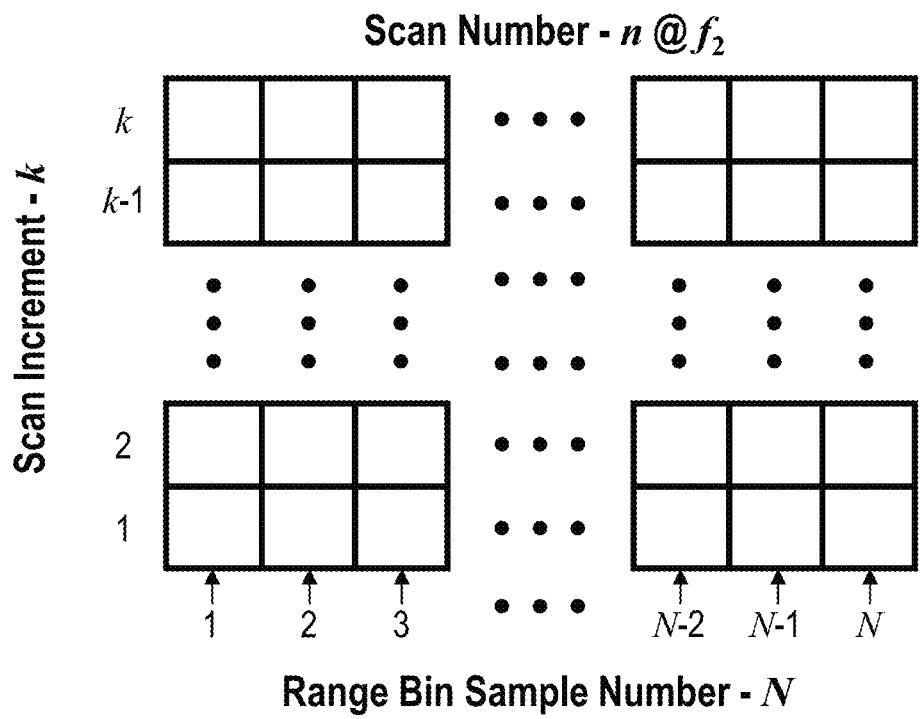

Continuing to refer to FIGS. 22 through 24, MEMS mirror controller/driver 216A provides synchronization of the pulses of step-FM pulse-burst modulation signal 115A, and, as a result, the optical illumination pulses of the step-FM pulse-burst modulated optical signal, with the angular position of MEMS scanning mirror 210A. FIG. 25 includes a schematic detailed functional block diagram of MEMS mirror controller/driver 216A, according to some exemplary embodiments. FIG. 26 includes a schematic time diagram illustrating synchronization of the step-FM modulation pulses with scanning mirror position provided by MEMS mirror controller/driver 216A, according to some exemplary embodiments.

Referring to FIGS. 22 through 26, digital signals Mirror Cycle X2 and Mirror Cycle are provided in MEMS mirror controller/driver 216A. Mirror Cycle X2 turns high when the scan starts, which is when MEMS mirror 210A is at its maximum angle, which is illustrated as being ±12 degrees, by way of exemplary illustration only. It switches low again when MEMS mirror 210A is at its neutral or zero-degree position. Mirror Cycle can be used to determine whether mirror 210A moving to the left or right (in the case of azimuthal scanning) or up or down (in the case of elevational scanning). The rising and falling edges of the Mirror Cycle signal coincide with the zero crossings of MEMS mirror 210A.

As noted above, to acquire data accurately at repeatable scanning mirror locations, synchronization between the scanning mirror position and the pulse burst transmission time is implemented, according to some exemplary embodiments. One technique for synchronization is to divide the time between the start and stop position scan signals into many smaller, equal-time increments which approximate the angular position of scanning mirror 210A. The division may be accomplished with a phase-locked loop (PLL) 252A configured as a frequency multiplier. The output of the PLL frequency multiplier 252A is applied to a counter 254A, which acts as a frequency divider. That is, counter 254A output value represents the time of the scan from which the angular position of mirror 210A may be calculated using a cosine function or determined from a look-up table (LUT), as illustrated by 256A. The mirror direction is determined using a D-flip-flop 258A and the synchronized transmission pulse burst is thus generated. Thus, PLL 252A generates a clock from the Mirror Cycle X2 signal. For each scan, which can be either forward or reverse, a single pulse is generated in the Mirror Cycle X2 signal. PLL 252A is configured to divide this single pulse into, for example, 1024 shorter pulses, uniformly spaced in time. These pulses are routed to counter 254A, the current value of which corresponds to the time of the scan. The angular position of scanning mirror 210A can be calculated using the cosine function or determined from a look-up table (LUT), as illustrated by 256A. When combined with the single D flip-flop 258A to monitor the direction of mirror motion, the synchronized train of pulses 215A is generated by DSPC 268A. To that end, the output of D-flip-flop is applied on lines 218A to DSPC 268A, and the output of LUT/cosine function 256A, indicative of mirror position, is also applied on lines 218A to DSPC 268A. The mirror drive signal 212A, also output from LUT/cosine function 256A, is applied on lines 214A to MEMS scanning mirror 210A to control its rotation.

A potential anomaly exists with respect to samples acquired during the negative slope of the scan cycle. For example, in order to reconstruct the samples from the related scan increment, the FFT sample rate can be adjusted. For example, in some particular exemplary embodiments, the FFT sample rate can be adjusted to twice the scan time.

FIGS. 27A through 27D include a series of four illustrative data matrices for the scanning mirror data acquisition, according to some exemplary embodiments. FIG. 28 includes a table of parametric data in a typical automotive operational scenario of LiDAR system 100A using a MEMS scanning mirror for data acquisition, according to some particular exemplary embodiments. Referring to FIGS. 27A-27D and 28, the data acquisition process for the MEMS scanning mirror includes filling or populating n data matrices of dimension k×N; where n is the number of scans (also the number of frequency steps), k is the number of scan increments, and N is the number of range bin samples.

According to the present disclosure, laser transmitter step-FM pulse-burst envelope modulation and receiver quadrature demodulation techniques pursuant to direct detection LiDAR systems have been described in detail. Data acquisition techniques and signal processing gain have also been described in detail. According to the present disclosure, the technique of transmit envelope modulation in conjunction with receive quadrature demodulation as applied to direct detection LiDAR systems has been demonstrated to provide signal processing gain as determined by the increase in the signal-to-noise ratio at the system detection stage. Significant operational factors include the change in transmission phase shift of the envelope modulation waveform over the two-way range to the object, and coherent detection of the envelope modulation waveform within the quadrature demodulator. In addition, the envelope modulation waveform is derived from the quadrature demodulation local oscillator, thereby establishing the coherent signal required for detection.

The step-FM pulse burst envelope modulation waveform of the present disclosure has been demonstrated to be compatible with MEMS fast scanning mirror.

The achievement of signal processing gain in direct detection LiDAR systems far exceeds the modest increase in hardware complexity. The availability of integrated circuit phase-locked loop and quadrature demodulation functions assures ease of implementation with minimum impact to system volume, operating power and cost. Notably, the LiDAR architecture described herein in detail facilitates systems with lower transmit power, longer measurement range, reduced power consumption and potentially better performance in multiple system deployment conditions. Also, according to exemplary embodiments, due to the increase in signal-to-noise ratio, range measurement error or variance is reduced.

In some other exemplary embodiments, repetition of the data acquisition process to fill additional data matrices can provide simultaneous high resolution range and Doppler measurement.

According to exemplary embodiments, a synthetic Doppler technique is employed for increasing processing gain in radar and LiDAR measurement systems using linear FM ramp, i.e., FMCW, and pulse transmission modulation waveforms, as described above in detail. Frequency ramp deviation $\Delta F$ and time duration $\Delta T$ are determined for the linear FMCW modulation waveform. Pulse width and pulse repetition frequency are determined for the pulse modulation waveform. According to the disclosure, synthetic Doppler is numerically applied to each waveform for the purpose of increasing the effective processing gain. Two-dimensional FFT and conventional pulse Doppler processing techniques are utilized using a numeric incremental increase in phase, which is indexed to the frequency ramp or pulse repetition frequency in the case of single-beam systems, or antenna scan in the case of multiple beam systems. The synthetic Doppler technique of the present disclosure is particularly effective in the detection of stationary objects, which typically are not suitable for two-dimensional FFT processing.

LiDAR systems, for example, automotive LiDAR systems, have challenging and competing operational objectives. Accurate, high-resolution range measurement requires wide transmission bandwidth, which competes with the cost of wide dynamic range, high-sampling-rate analog-to-digital converters (ADCs). High-resolution azimuth and elevation beam scanning requires narrow beam width and beam position dwell time, which compromise data acquisition and system response time. Range and position measurement accuracy require high signal-to-noise ratio (SNR), which is limited by transmit power and available signal processing gain techniques. The previously described transmit envelope modulation techniques, coupled with quadrature demodulation, have demonstrated improvement of the direct detection LiDAR architecture to address the automotive deployment challenges. However, enhancement of SNR at the signal detection stage offered by two-dimensional (2-D) processing has not been achieved due to limitations of Doppler resolution and detection, even at high relative velocity. To facilitate 2-D signal process and thereby improve detection SNR, the technique described herein employs numeric incremental phase increase to the demodulated signal. In addition, because the technique implements a known "synthetic" Doppler frequency, spectrum resolution analysis requires determination of a single element of the signal spectrum and thereby reduces computation time.

As used herein, the term "synthetic Doppler" refers to incremental phase addition to a signal in a manner analogous to Doppler offset frequency resulting from the change in signal transmission phase engendered by relative-velocity-induced range change. This synthetic Doppler is not utilized to measure relative velocity; however, the technique described herein provides signal processing options similar to those afforded by a true Doppler frequency, e.g., 2-D FFT in the case of FMCW waveforms and pulse Doppler processing in the case of pulsed waveforms, and is applicable to operational scenarios in which true Doppler is restrictive due to stationary or small relative motion, or operational frequencies that restrict Doppler frequency magnitude.

According to exemplary embodiments, the synthetic Doppler of the disclosure can be implemented using a variety of techniques. For example, in a first implementation, a phase modulator can be inserted directly in the local oscillator (LO) path to the quadrature demodulator. In a second implementation, a direct digital synthesizer (DDS), which is utilized for both transmit and receive signals, may be phase modulated during the receive interval, i.e., following the transmit pulse. Alternatively, a second DDS for the LO may be added to implement phase modulation upon successive frequency ramps, while operating from the same clock. In a third implementation, an incremental indexed phase shift may be numerically added to the I-channel and Q-channel signal components following acquisition by the ADC or within the complex FFT (CFFT) signal components for the FMCW waveform.

The synthetic Doppler techniques of the present disclosure, described herein in detail, include FMCW and/or pulsed LiDAR data acquisition and two-dimensional (2-D) fast Fourier transform (FFT) processing. The techniques facilitate 2-D processing for operational scenarios in which Doppler frequency resolution is limited, or to enhance detection of stationary objects via signal processing gain as measure by the increase in signal-to-noise ratio (SNR). It is noted that the technique of the disclosure enables increased signal processing gain without attendant increase to ADC sampling rate. An estimate of signal processing gain for single-dimension processing is 10·log (N). An estimate of signal processing gain for two-dimensional processing is 10·log (n×N).

Figure 29:
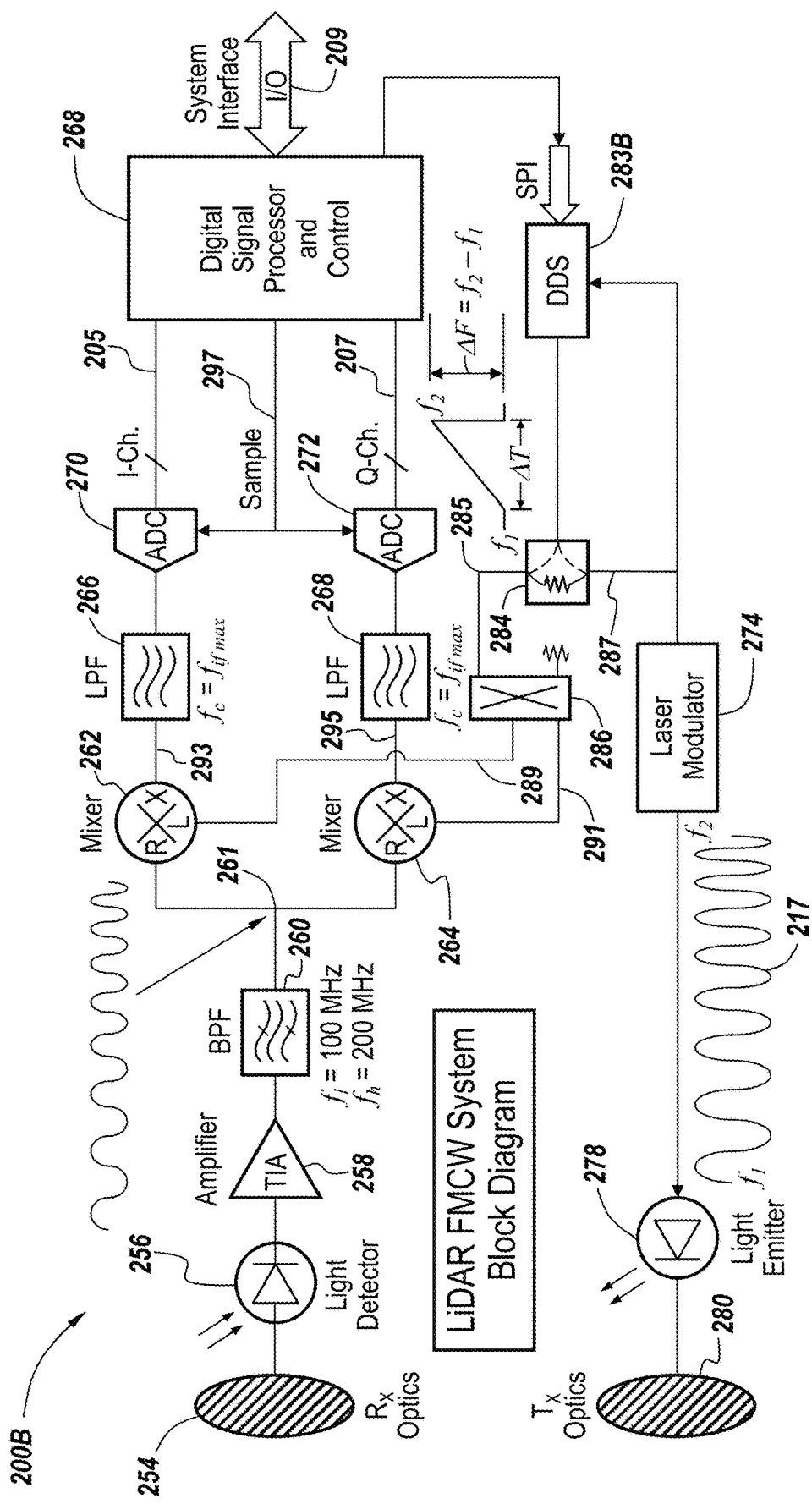
FIG. 29 includes a schematic functional block diagram which illustrates a LiDAR system using FMCW transmit envelope modulation illustrated in FIG. 3 and quadrature demodulation, with variations from the system illustrated in FIG. 11, according to some exemplary embodiments.

FIG. 29 includes a schematic functional block diagram which illustrates a LiDAR system 200B using FMCW transmit envelope modulation illustrated in FIG. 3 and quadrature demodulation, with variations from the system illustrated in FIG. 11, according to some exemplary embodiments. The block diagram of FIG. 29 differs from the block diagram of FIG. 11 in that FIG. 29 illustrates direct digital frequency synthesizer (DDS) 238B described above used to generate the envelope modulation signal. The remaining elements of FIG. 29 are the same as those of FIG. 11 and are identified by like reference numerals. It should also be noted that, although not illustrated in FIG. 29, the LiDAR system 200B of FIG. 29 can include the scanning capability illustrated in and described in detail herein in connection with FIG. 22. As described above in detail, FMCW sensor operation provides a mapping of IF frequency to range in accordance with equation (6) above. According to the approach, a linear frequency ramp modulation envelope signal is applied, and the modulated signal is transmitted. The return signal from a target object at range R is mixed with the transmitted signal. The mixing process generates an IF frequency proportional to the object range R. N samples of the IF signal are acquired from the I-channel and Q-channel by the ADCs 270, 272. Spectral analysis of the IF signal via complex Fourier transform generates the range.

Figure 30B:
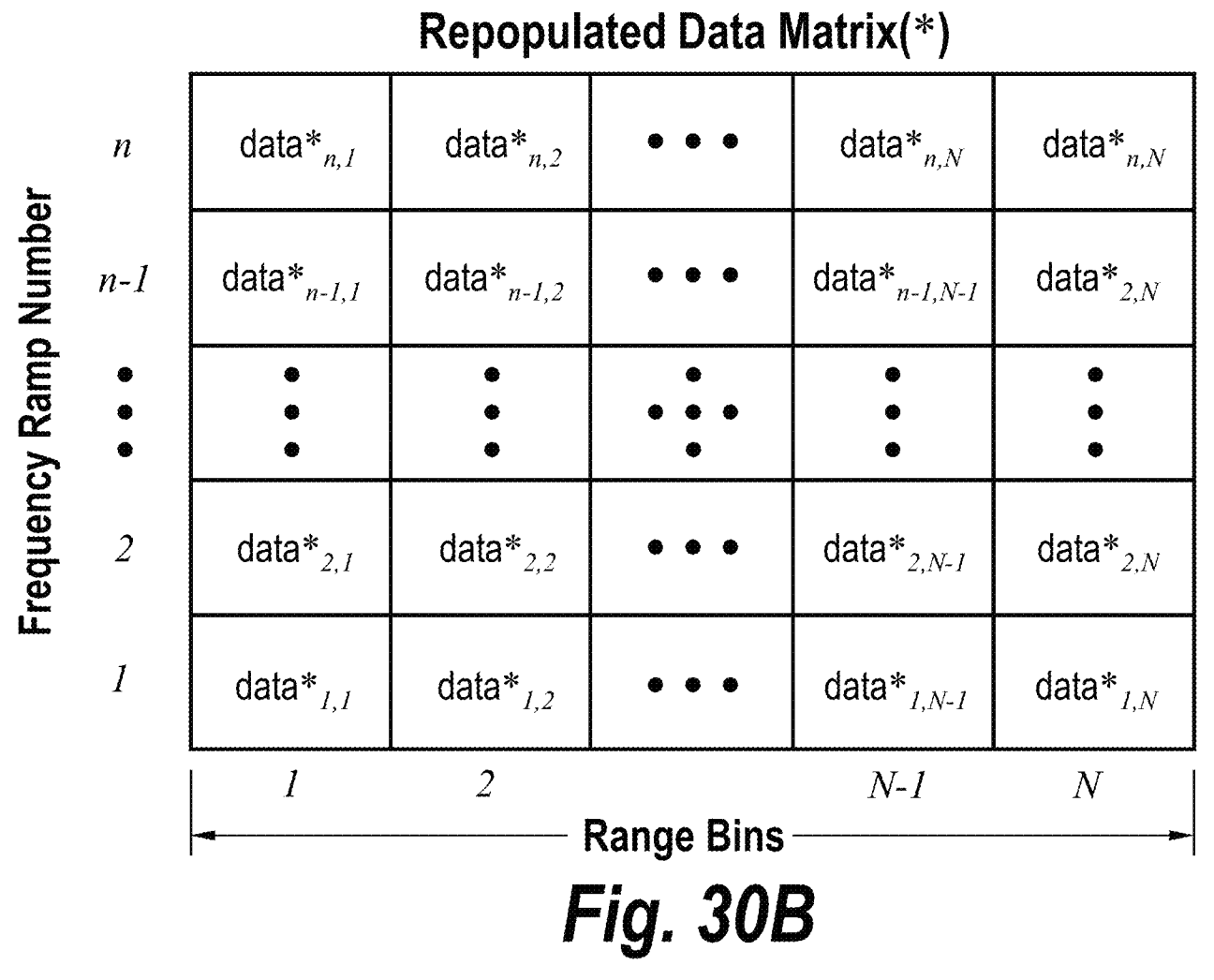
Figure 30C:
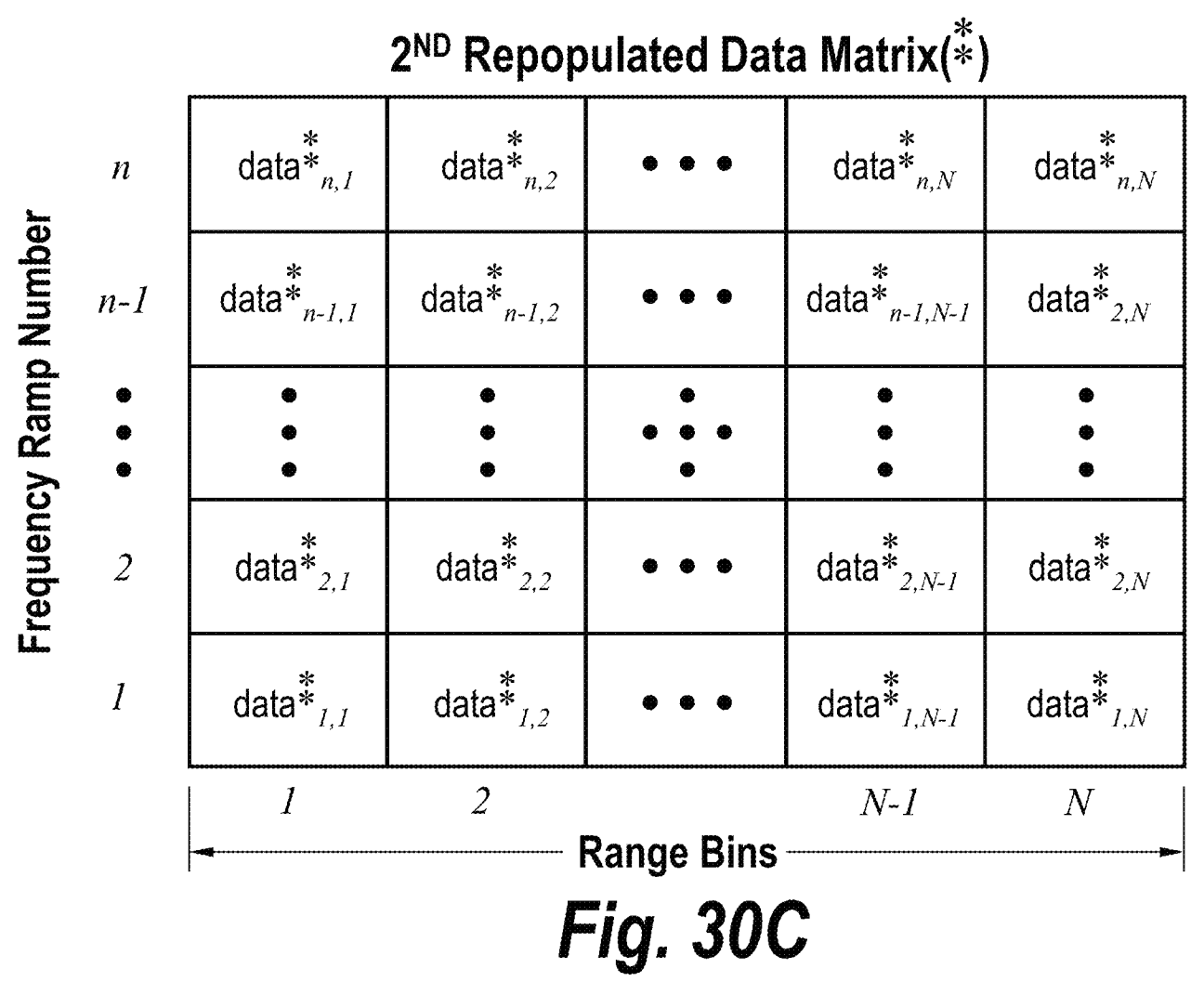

FIGS. 30A through 30C include data matrices illustrating FMCW data acquisition for 2-D FFT processing for a single scan angle position, according to some exemplary embodiments. Specifically, FIG. 30A includes an original FMCW data matrix; FIG. 30B includes a repopulated data matrix; and FIG. 30C includes a second repopulated data matrix. Referring to FIGS. 14, 29 and 30A-30C, n frequency ramps are generated, and N complex (I-channel and Q-channel) data points are acquired at each frequency ramp in the I-channel and Q-channel over time, $\Delta T$. After n ramps, a single scan angle (n×N) data matrix as illustrated in FIG. 30A, is constructed. That is, in the original data matrix illustrated in FIG. 30A, the acquired I-channel and Q-channel data samples are used to populate the n×N matrix of complex values. Each matrix location has the structured complex form: $(I\text{-}Ch_{i,k}+j \cdot Q\text{-}Ch_{i,k})$, where $i \in 1, \ldots, n$, and $k \in 1, \ldots, N$. A length-N complex FFT (range FFT) is executed on each row of the original data matrix of FIG. 30A. The complex FFT elements from each row are subsequently used to repopulate the original matrix of FIG. 30A to create the repopulated data matrix of FIG. 30B. Each row of the repopulated data matrix of FIG. 30B represents the resolved IF spectrum of the respective frequency ramp. Each row element of the repopulated matrix of FIG. 30B represents adjacent range bins in accordance with the frequency-to-range mapping equation above, i.e., equation (6). Each column of the repopulated matrix of FIG. 30B represents range bin data from successive frequency ramps. It is noted that the column data in the repopulated matrix of FIG. 30B is constant for stationary target objects within that range bin.

Each column of the repopulated data matrix of FIG. 30B is augmented with a numerically incremented, i.e., indexed, phase term value or phase shift of value $(i \cdot \Delta \phi)$ added to each element, where $i \in 1, \ldots, n$. This action implements a synthetic Doppler frequency to the column range bin data. The numerically incremented phase elements are used to repopulate the repopulated data matrix of FIG. 30B to generate the second repopulated data matrix of FIG. 30C. A length-n complex FFT is executed on the column data of the second repopulated data matrix of FIG. 30C, and the resulting spectrum is resolved at the unique synthetically induced Doppler frequency. It is noted that the phase angle associated with each element of the first repopulated data matrix of FIG. 30B is defined by the equation (27):

$$\phi_{n,N} = \arctan\left(\frac{Q_{n,N}}{I_{n,N}}\right). \quad (27)$$

It should be noted that each column of the second repopulated data matrix of FIG. 30C represents a discrete range bin in accordance with the CFFT index. Spectral analysis is executed on each column of the data matrix. Since the artificial "Doppler" frequency is known, spectral search may be limited to the known artificial "Doppler" frequency.

Figure 33:
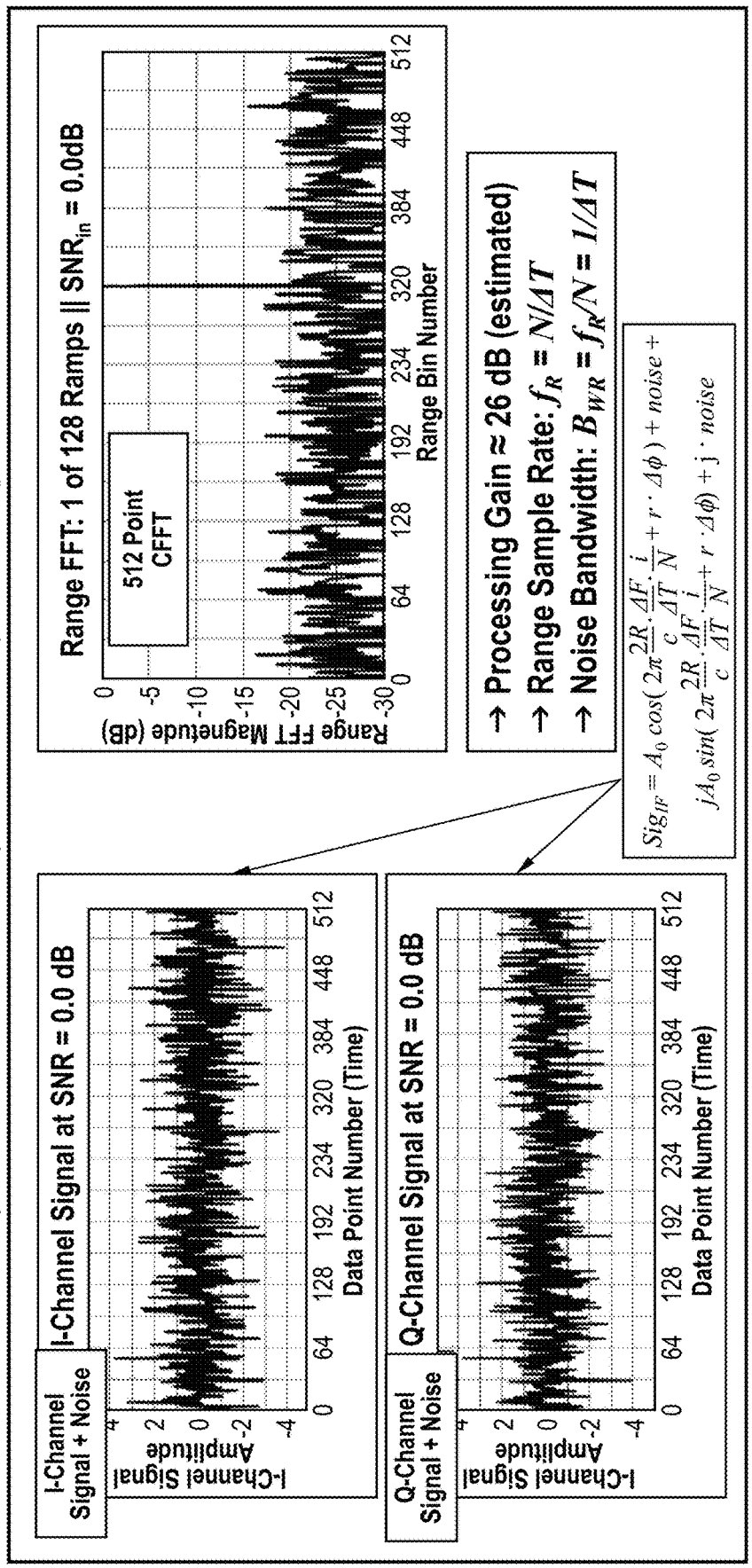
FIG. 33 includes results of synthetic Doppler range FFT calculation, for a single scan angle.
Figure 34:
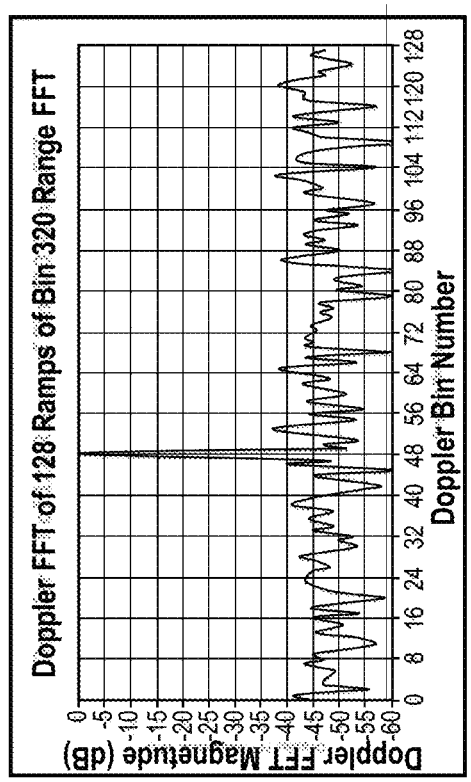
FIG. 34 includes results of synthetic Doppler FFT, for a single scan angle.
Figure 35:
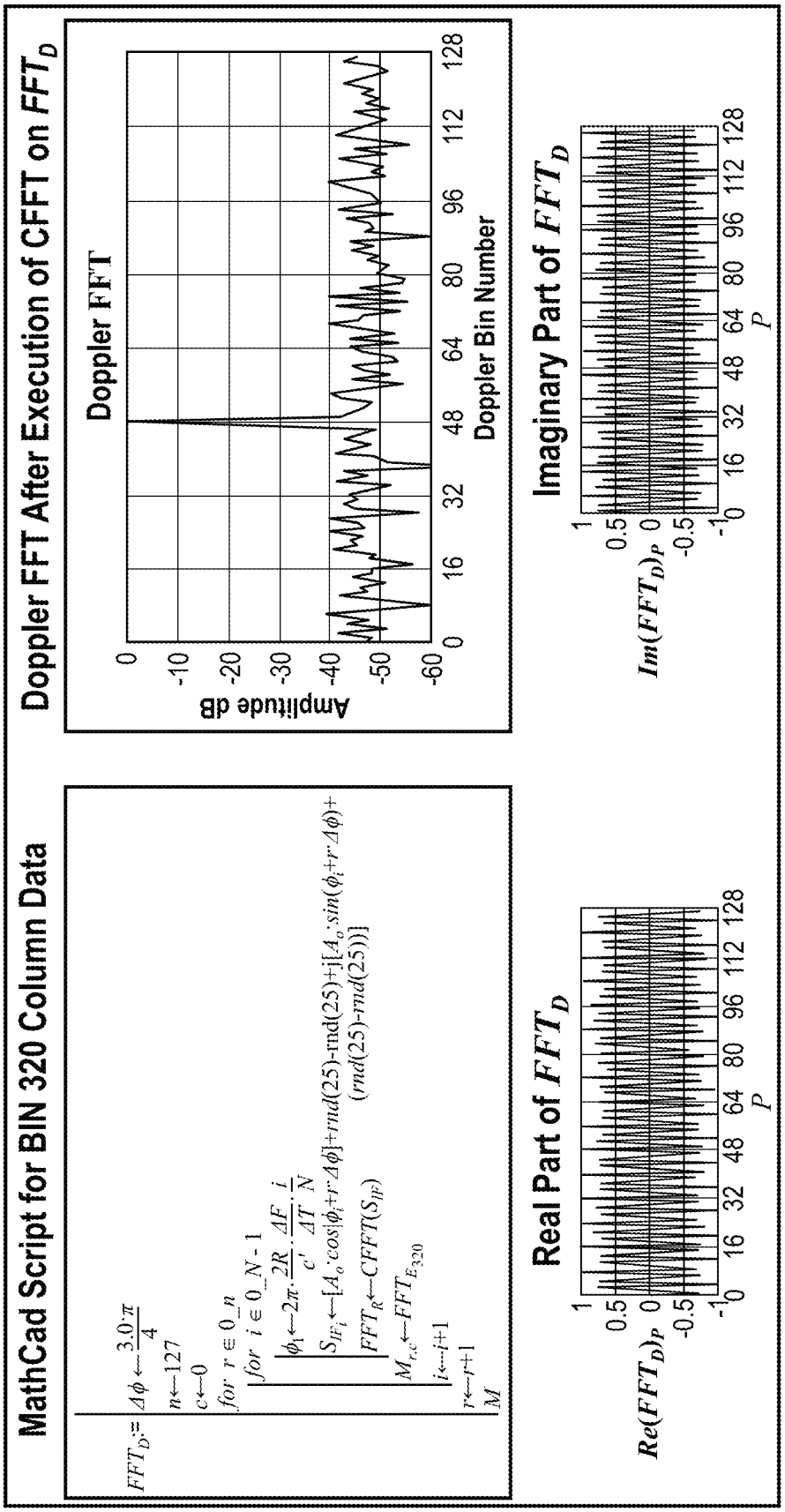
FIG. 35 includes supplementary data for simulation results for the Doppler FFT after execution of the CFFT.

FIGS. 31 through 35 include diagrams illustrating the FMCW synthetic Doppler technique of the disclosure, according to exemplary embodiments, and results of simulation of the technique. Specifically, FIG. 31 includes a schematic logical flow diagram of a synthetic Doppler simulation using the FMCW envelope modulation waveform, according to exemplary embodiments. FIG. 32 includes a table of FMCW synthetic Doppler parameters utilized for the simulation, for a single beam angle. FIG. 33 includes results of synthetic Doppler range FFT calculation, for a single scan angle. FIG. 34 includes results of synthetic Doppler FFT, for a single scan angle. FIG. 35 includes supplementary data for simulation results for the Doppler FFT after execution of the CFFT. FIG. 36 includes additional supplementary data for the simulation results. Specifically, FIG. 36 illustrates a MathCad® program script for the range CFFT and a MathCad® program script for the Doppler CFFT. As shown in FIG. 36, the range CFFT was performed on a single row of data from an FMCW LiDAR with parameters: R=75 meters, $\Delta F$=100 MHz, $\Delta T$=10 μsec, amplitude $A_0$=1.0, noise=1.0. Similarly, the Doppler CFFT populates a single column of data at range bin 320 from an FMCW LiDAR with parameters: R=75 meters, $\Delta F$=100 MHz, $\Delta T$=10 μsec, amplitude $A_0$=1.0, noise=1.0. In the case of the Doppler CFFT, each data point is incremented with a differential phase shift of $r \times \Delta \phi$. The scripts illustrated in FIG. 35 are annotated to clarify the definitions of parameters and variables.

Figure 31:
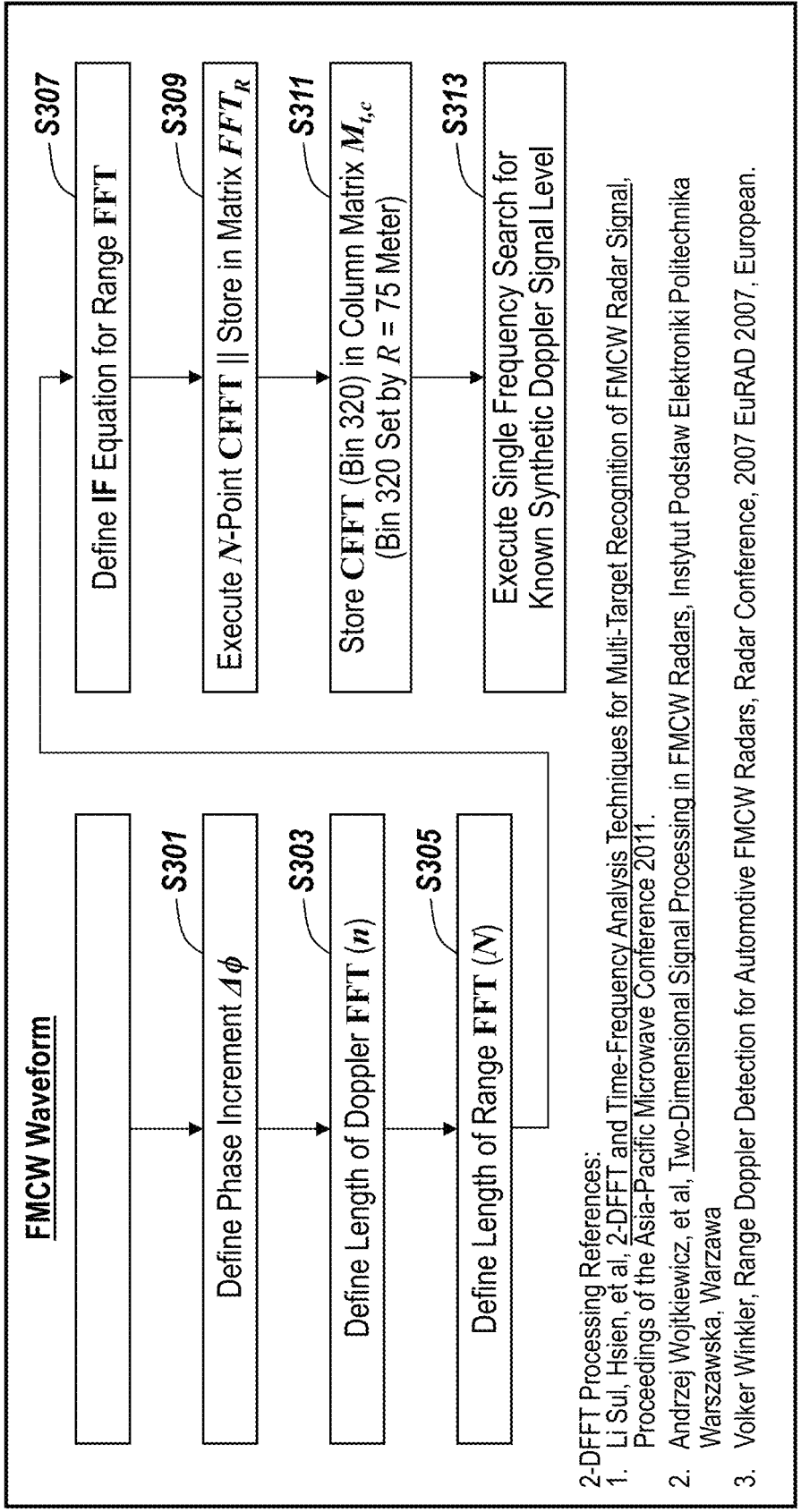
FIG. 31 includes a schematic logical flow diagram of a synthetic Doppler simulation using the FMCW envelope modulation waveform, according to exemplary embodiments.

Referring in particular to FIG. 31, in step S301 of the 2-D FFT of the FMCW waveform, the phase increment $\Delta \phi$ is defined. Next, in step S303, the length of the Doppler FFT, n, is defined. Next, in step S305, the length of the range FFT, N, is defined. Next, in step S307, the IF equation for range FFT is defined. Next, in step S309, the N-point CFFT is executed, and the results $FFT_R$ are stored in a matrix. Next, in step S311, results of CFFT (bin 320) are stored in column matrix $M_{r,c}$ (bin 320 set by R=75 meters). Next, in step S313, a single-frequency search is executed for the known synthetic Doppler signal level. It is noted that a single-frequency spectral search may be expedited using efficient numerical processing techniques such as the Goertzel algorithm.

According to the exemplary embodiments, processing gain is realized in accordance with 10×Log (n×N). Data acquisition time is defined as $T_{acq}$=n×$\Delta T$. An N-point CFFT is executed for each frequency ramp. Single-frequency spectral analysis is executed for synthetic "Doppler" since the "Doppler" frequency is known. Additional processing gain of 10×Log (n) is realized at the cost of computation of the n-point CFFT and the spectral search execution time.

Figure 37:
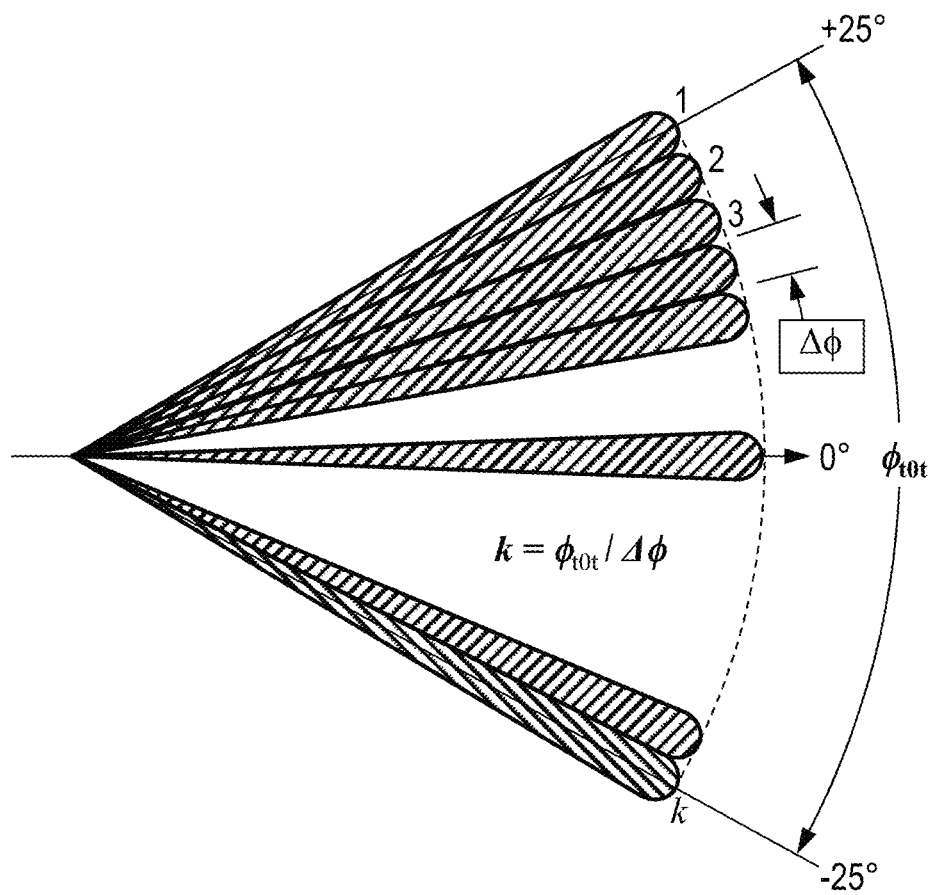
FIG. 37 includes a detailed schematic diagram illustrating a transmit beam pattern as employed in the LiDAR system of the disclosure, according to some exemplary embodiments.

With regard to antenna beam scanning, FIG. 37 includes a detailed schematic diagram illustrating a transmit beam pattern as employed in the LiDAR system of the disclosure, according to some exemplary embodiments. In some exemplary embodiments, the transmit beam pattern illustrated in FIG. 37 is generated through the use of a MEMS scanning mirror, as described herein in detail. FIG. 37 is similar to FIG. 23, with certain differences as detailed below. Referring to FIG. 37, the figure illustrates k beam positions covering a total scan extent of −25° to +250. The time required for a single scan is $T_{scan}$, which can be, for example, approximately 500 μsec. A single scan is used to acquire data for one-dimensional signal processing with a single frequency ramp $\Delta F$ at each of k beam positions. Multiple scans are used to acquire data for 2-D signal processing. FIG. 38 includes a table listing parameters associated with data for k=50 beam angle positions. As shown, the FMCW data acquisition time $T_{acq}$ is calculated as $$T_{acq} = n \times T_{scan} = 0.064 \text{ second.}$$

The foregoing detailed description is related to the synthetic Doppler technique of the exemplary embodiments using the FMCW envelope modulation waveform. As described above, the synthetic Doppler technique of the disclosure can also be carried out using the pulsed envelope modulation waveform. As described below in detail, the implementation of the synthetic Doppler technique using the pulse envelope modulation waveform is more direct and requires only a single complex FFT following data acquisition.

Figure 39:
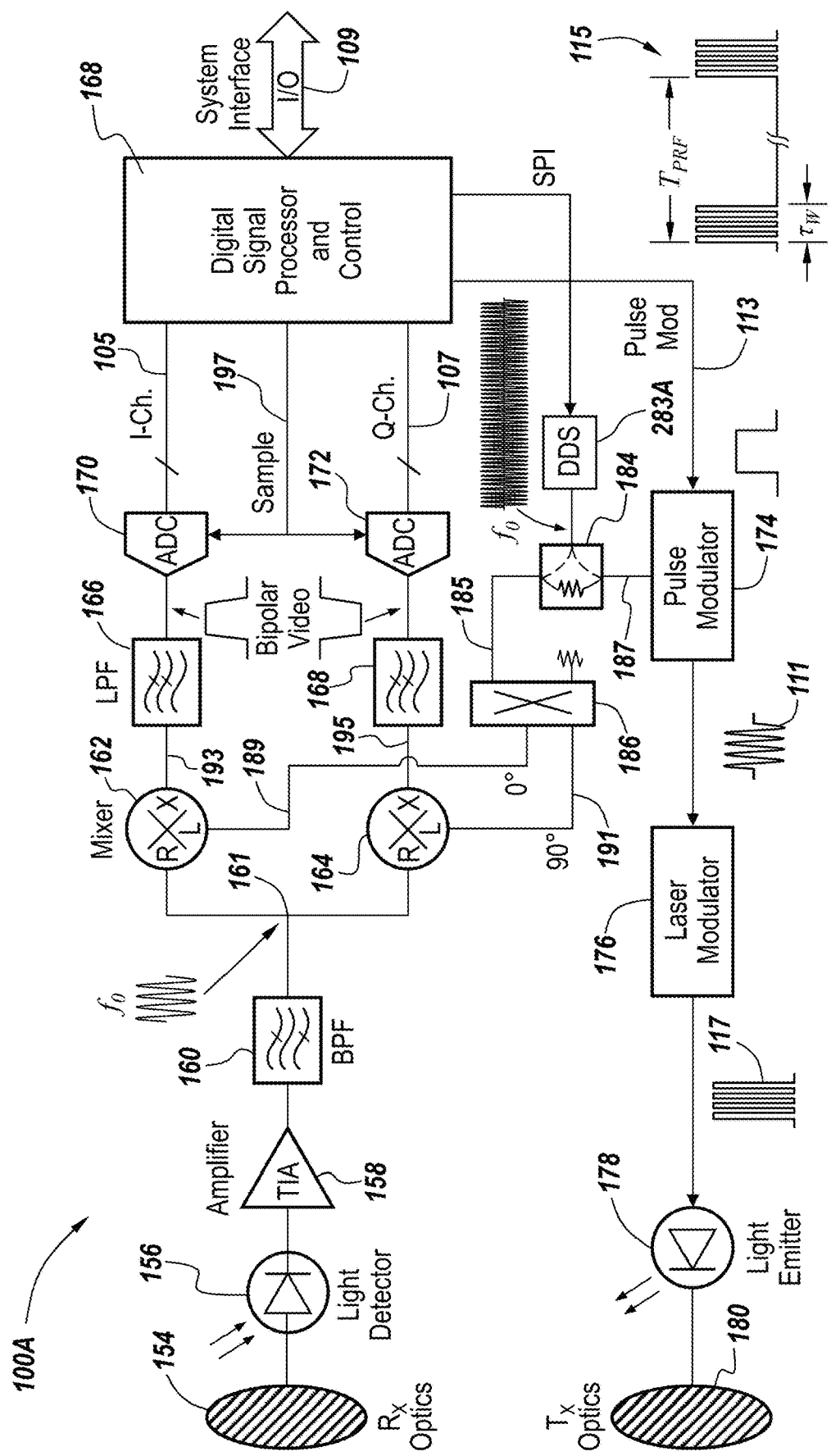
FIG. 39 includes a schematic functional block diagram which illustrates a LiDAR system using pulsed transmit envelope modulation illustrated in FIG. 2 and quadrature demodulation, with variations from the system illustrated in FIG. 6A, according to some exemplary embodiments.
Figure 40A:
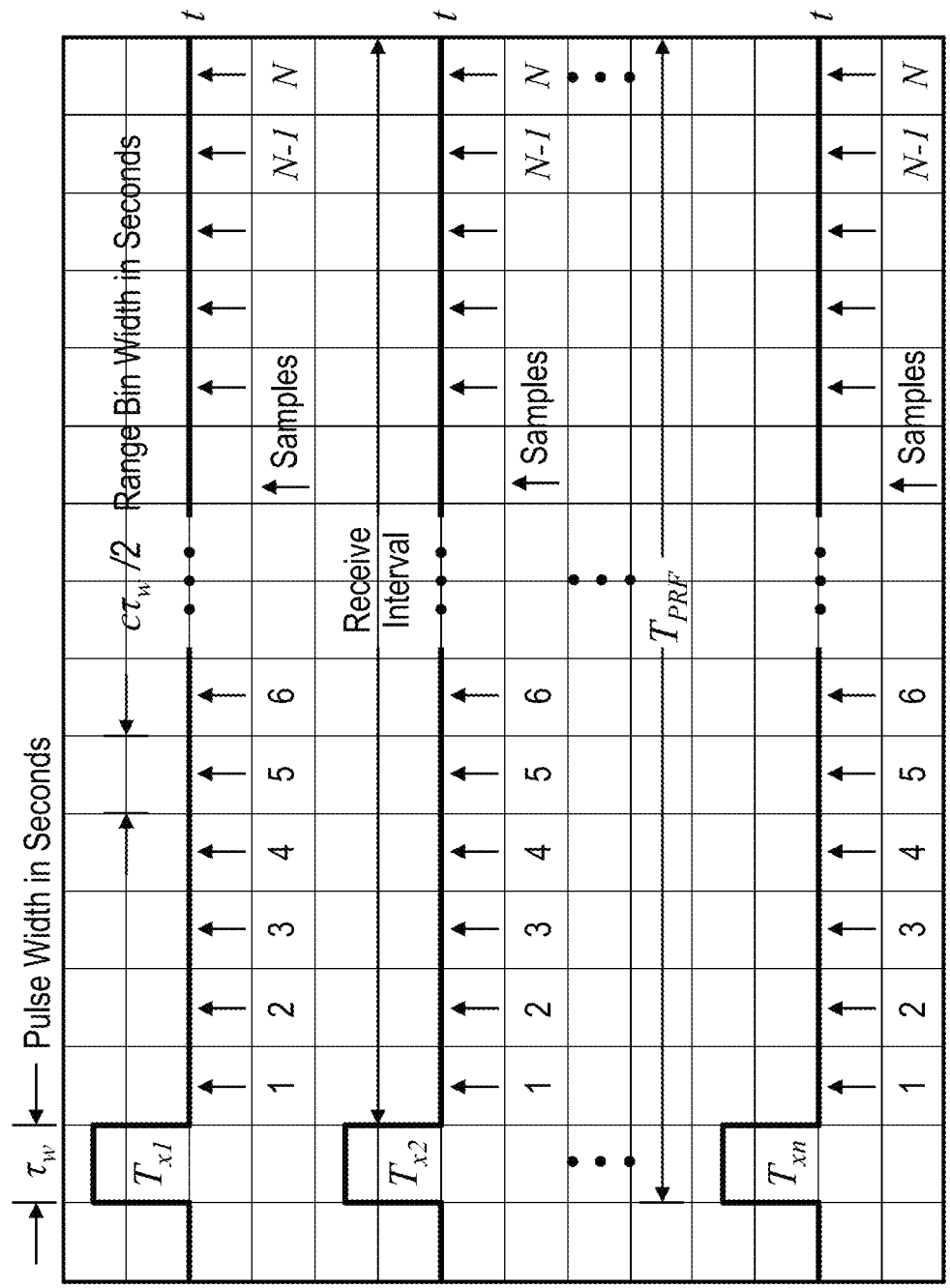
FIG. 40A is a timing diagram illustrating time of data acquisition in pulsed LiDAR processing, according to some exemplary embodiments.

FIG. 39 includes a schematic functional block diagram which illustrates a LiDAR system 100A using pulsed transmit envelope modulation illustrated in FIG. 2 and quadrature demodulation, with variations from the system illustrated in FIG. 6A, according to some exemplary embodiments. The block diagram of FIG. 39 differs from the block diagram of FIG. 6A in that FIG. 39 illustrates direct digital synthesizer (DDS) 238A described above. The remaining elements of FIG. 39 are the same as those of FIG. 6A and are identified by like reference numerals. It should also be noted that, although not illustrated in FIG. 39, the LiDAR system 100A of FIG. 39 can include the scanning capability illustrated in and described in detail herein in connection with FIG. 22. As described above in detail, pulsed sensor operation provides range measurement via the time delay associated with the two-way range to the target object following a transmit pulse, in accordance with $\tau_d = 2R/c$. In exemplary embodiments, FIG. 40A is a timing diagram illustrating time of data acquisition in pulsed LiDAR processing, according to some exemplary embodiments. Referring to FIG. 40A, a pulse is transmitted at the beginning of each frame from which data is to be acquired. N data samples, indicated by arrows, from successive range bins are acquired from each receive channel (I-Ch and Q-Ch) during the receive interval following the transmit pulse. The data samples from n frames form and n×N matrix from which additional processing is executed.

Figure 40B:
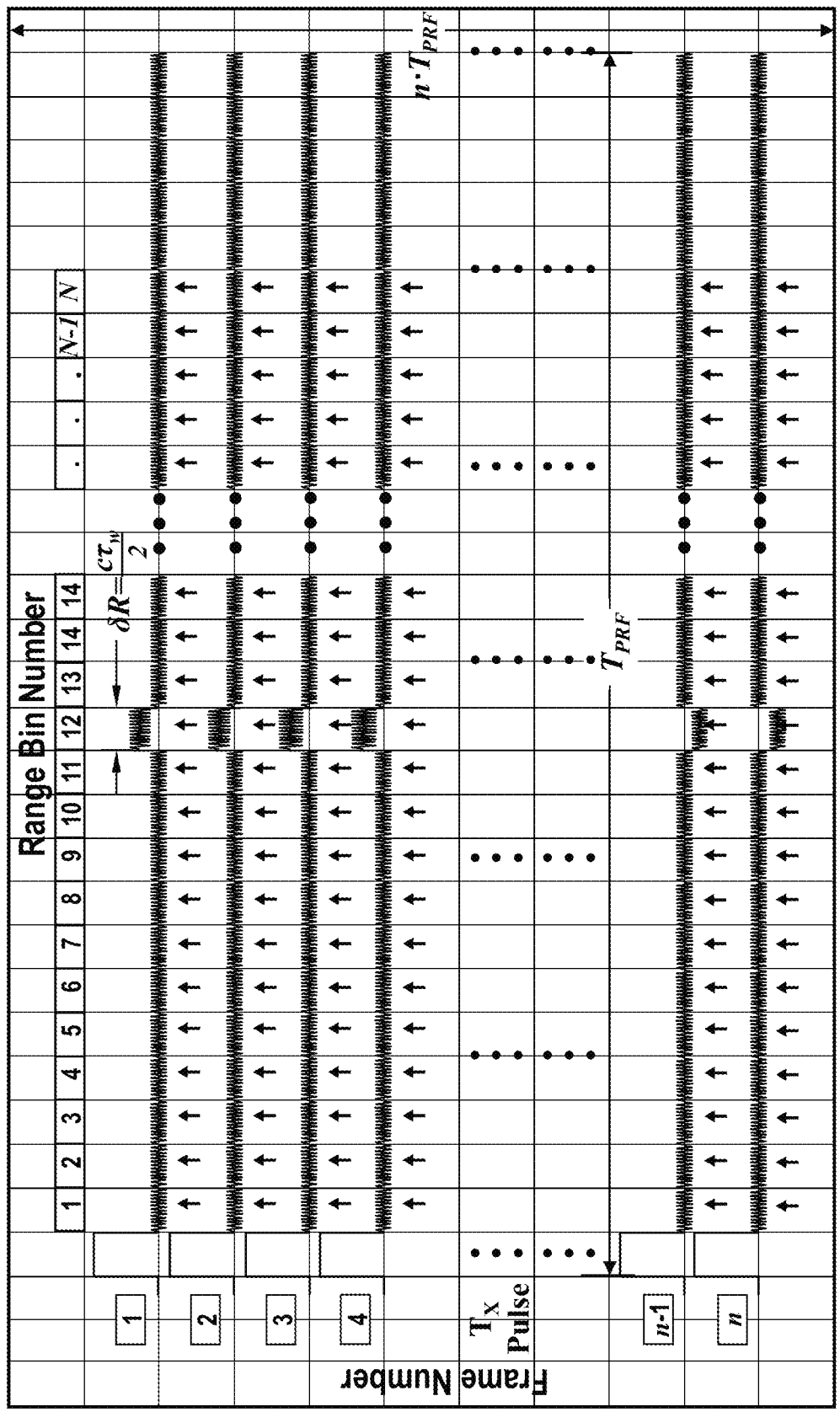
FIG. 40B includes a schematic diagram illustrating pulsed data acquisition for a single scan angle position, according to some exemplary embodiments.

FIG. 40B includes a schematic diagram illustrating pulsed data acquisition for a single scan angle position, according to some exemplary embodiments. FIG. 40B represents I-channel and Q-channel receiver output. The arrows in FIG. 40B represent range bin sample data points, similar to FIG. 8. FIG. 40C includes an original data matrix generated during pulsed data acquisition, according to some exemplary embodiments. FIG. 40D includes a repopulated data matrix generated during pulsed data acquisition, according to some exemplary embodiments. Referring to FIGS. 39 and 40A-40D, complex data points from the I-channel and Q-channel data samples are acquired at each range bin over time interval $T_{prf}$. After n frames at a single scan angle, these data samples are used to populate an n×N original data matrix of complex values, as illustrated in FIG. 40C. Each matrix location has the structured complex form: (I-Ch$_{i,k}$+j·Q-Ch$_{i,k}$), where i∈1, ..., n, and k∈1, ..., N. It is noted that the column data represents the complex signal from each successive range bin. This is different from the FMCW case described above, where a range FFT was performed to structure the columns as range bins.

Each column of the original data matrix of FIG. 40C is augmented with a numerically incremented, i.e., indexed, phase term or phase shift of value (i·Δϕ) added to each element, where i∈1, ..., n. This action implements a synthetic Doppler frequency to the column range bin data. The numerically incremented phase elements are used to repopulated the original data matrix of FIG. 40C to generate the repopulated data matrix of FIG. 40D. A length-n complex FFT is executed on the column data of the repopulated matrix of FIG. 40D, where each column represents a discrete range bin, and the resulting spectrum is resolved at the unique synthetically induced Doppler frequency. Spectral analysis in accordance with the known synthetic Doppler frequency is executed for each range bin to assess object presence or absence. It is noted that the two-dimensional signal processing for the pulsed processing does not require a second FFT. The original data matrix of FIG. 40C is acquired and populated by range bin, and, therefore, does not require a frequency-to-range transformation or FFT process. The pulsed envelope modulation waveform requires only a single CFFT at each range bin, i.e., column. It is noted that, in the exemplary illustration of FIGS. 40A through 40D, an object is identified in range bin 12.

Figure 41:
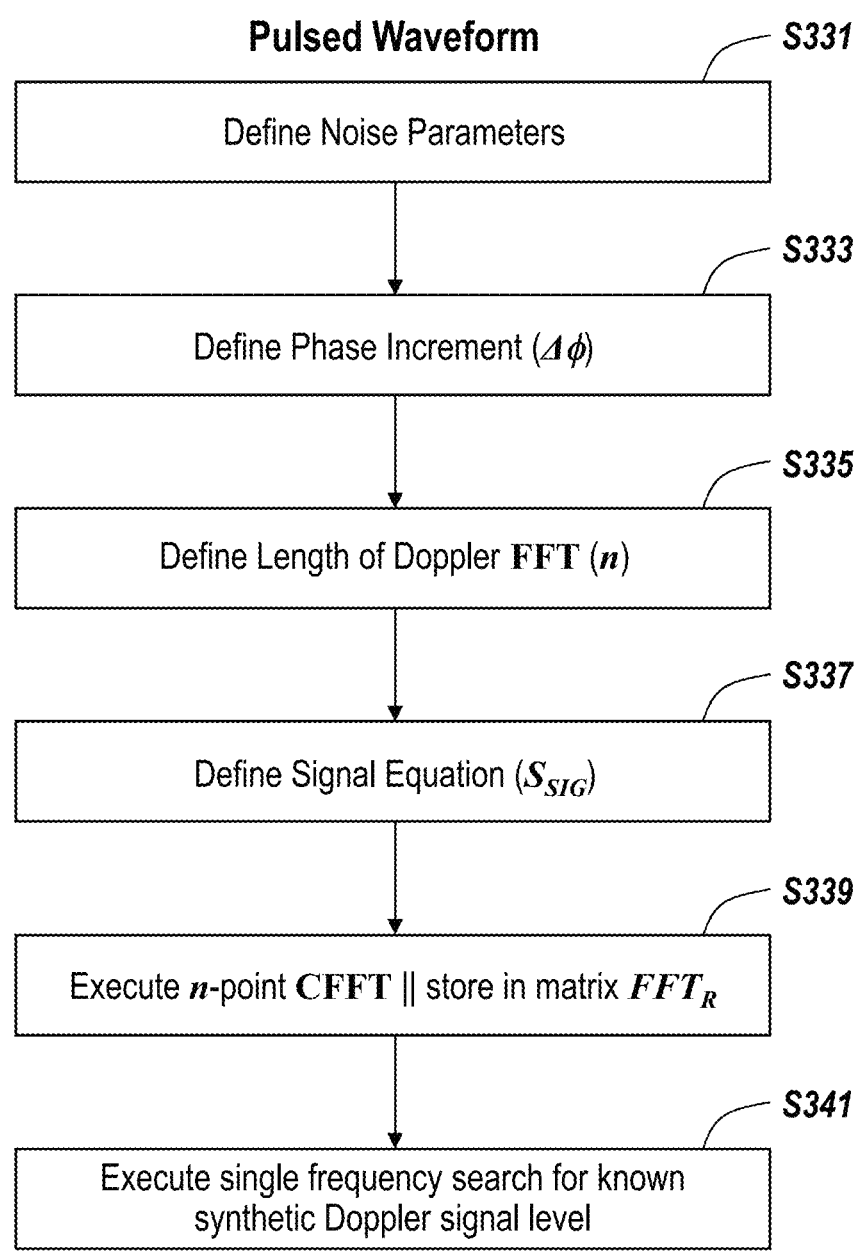
FIG. 41 includes a schematic logical flow diagram of a synthetic Doppler simulation using the pulsed envelope modulation waveform, according to exemplary embodiments.

FIGS. 41 through 46 include diagrams illustrating the synthetic Doppler technique of the disclosure, according to exemplary embodiments, and results of simulation of the technique, using the pulsed envelope modulation waveform. Specifically, FIG. 41 includes a schematic logical flow diagram of a synthetic Doppler simulation using the pulsed envelope modulation waveform, according to exemplary embodiments. Referring to FIG. 41, in step S331, noise parameters are defined. Next, in step S333, the phase increment Δϕ is defined. Next, in step S335, the length of the Doppler FFT, n, is defined. Next, in step S337, the signal equation $S_{SIG}$ is defined. Next, in step S339, the n-point CFFT is executed, and the results $FFT_R$ are stored in a matrix. Next, in step S341, a single-frequency search is executed for the known synthetic Doppler signal level. It is noted that a single-frequency spectral search may be expedited using efficient numerical processing techniques such as the Goertzel algorithm.

Figure 43:
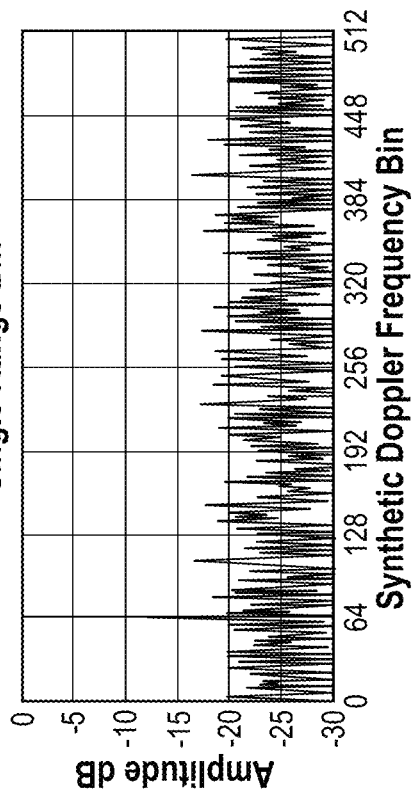
FIG. 43 includes a MathCad® program script for noise generation and a MathCad® program script for signal and CFFT for pulsed synthetic Doppler simulation, as well as simulation results for CFFT of n data samples from a single range bin, according to exemplary embodiments.

FIG. 42 includes a table of pulsed synthetic Doppler parameters utilized for the simulation, for a single beam angle. FIG. 43 includes a MathCad® program script for noise generation and a MathCad® program script for signal and CFFT for pulsed synthetic Doppler simulation, as well as simulation results for CFFT of n data samples from a single range bin, according to exemplary embodiments. FIG. 43 also includes simulation results for $SNR_{IN}$, $SNR_{OUT}$ and processing gain $PG_{DB}$. According to the exemplary embodiments, processing gain is realized in accordance with 10×Log (n). Data acquisition time is defined as $T_{acq} = n \times T_{prf}$. Single-frequency spectral analysis is executed for synthetic Doppler and the Doppler frequency is known.

Figure 44:
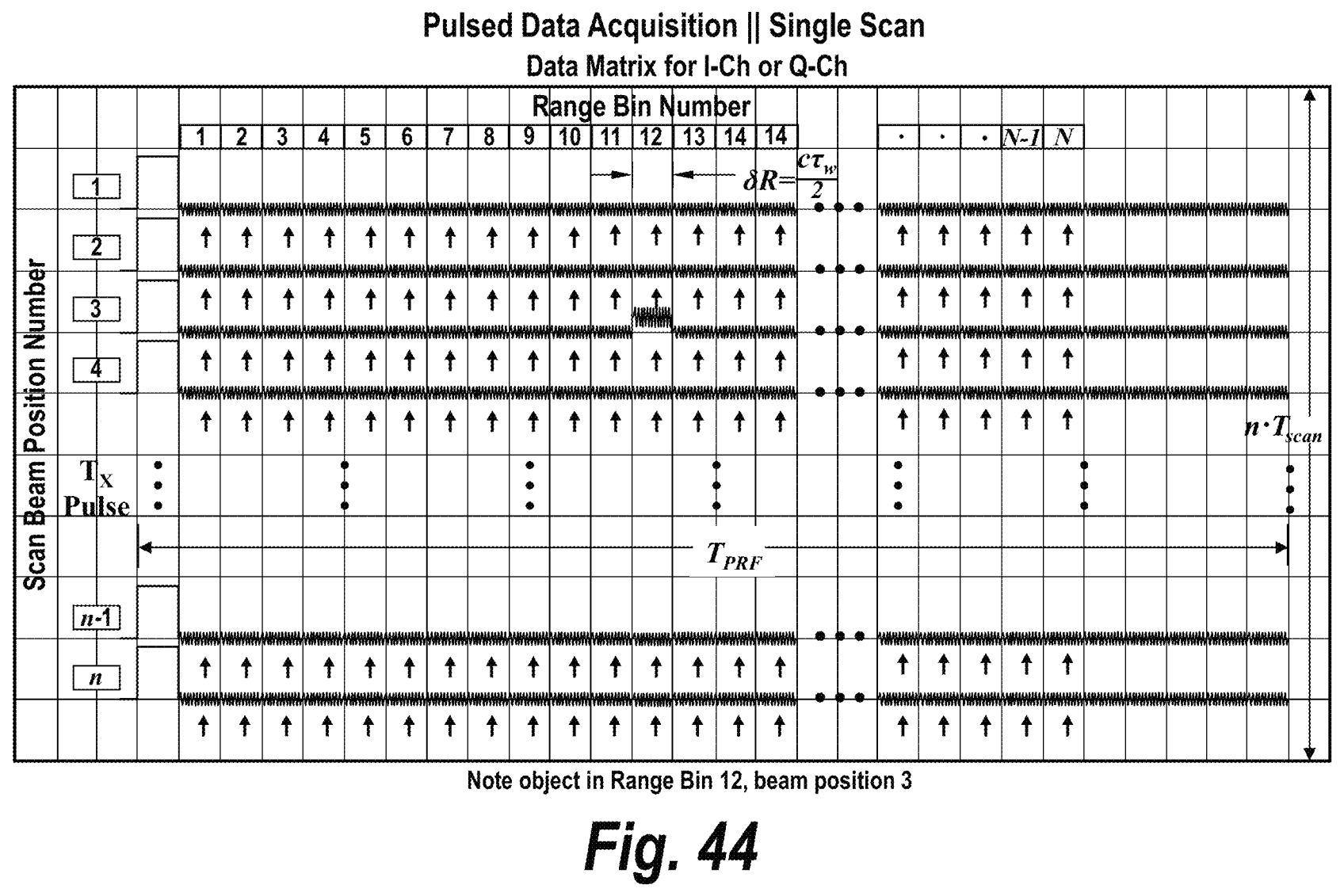

FIG. 44 includes a schematic diagram illustrating data acquisition for I-channel and Q-channel for a single scan, according to exemplary embodiments. FIG. 44 represents I-channel and Q-channel receiver output. The arrows in FIG. 44 represent range bin sample data points, similar to FIGS. 8 and 40. It is noted that an object appears in range bin 12 at beam position 3. Referring to FIG. 44, N data points are acquired at each beam scan position (k) over the time interval Tprf. A single scan is required to fill a k×N data matrix at each beam scan position. At each beam scan position, the range bin signal level maybe evaluated for object detection. If a single scan in utilized, no processing gain is available. The beam scan position dwell time must be increased to accommodate multiple PRFs to provide processing gain.

FIG. 45 includes a schematic diagram illustrating data acquisition for I-channel and Q-channel for multiple scans, at beam position 3, according to exemplary embodiments. It is noted that an object appears in range bin 12. Referring to FIG. 45, single-scan data acquisition is repeated for n scans. A k×N data matrix is formed for each scan beam position. Therefore, the complete data matrix is 3-dimensional and is indexed by beam scan position k. Signal processing requires an n-point spectral analysis for each range bin (N) at each beam position (k), following incremental phase addition (i×Δϕ), where i∈1, . . . , n.

FIG. 46 includes a table listing parameters associated with data for multiple beam angle positions. As shown, the pulsed data acquisition time $T_{acq}$ is calculated as $$T_{acq} = n \times T_{scan} = 0.0512 \text{ second.}$$

Figure 47:
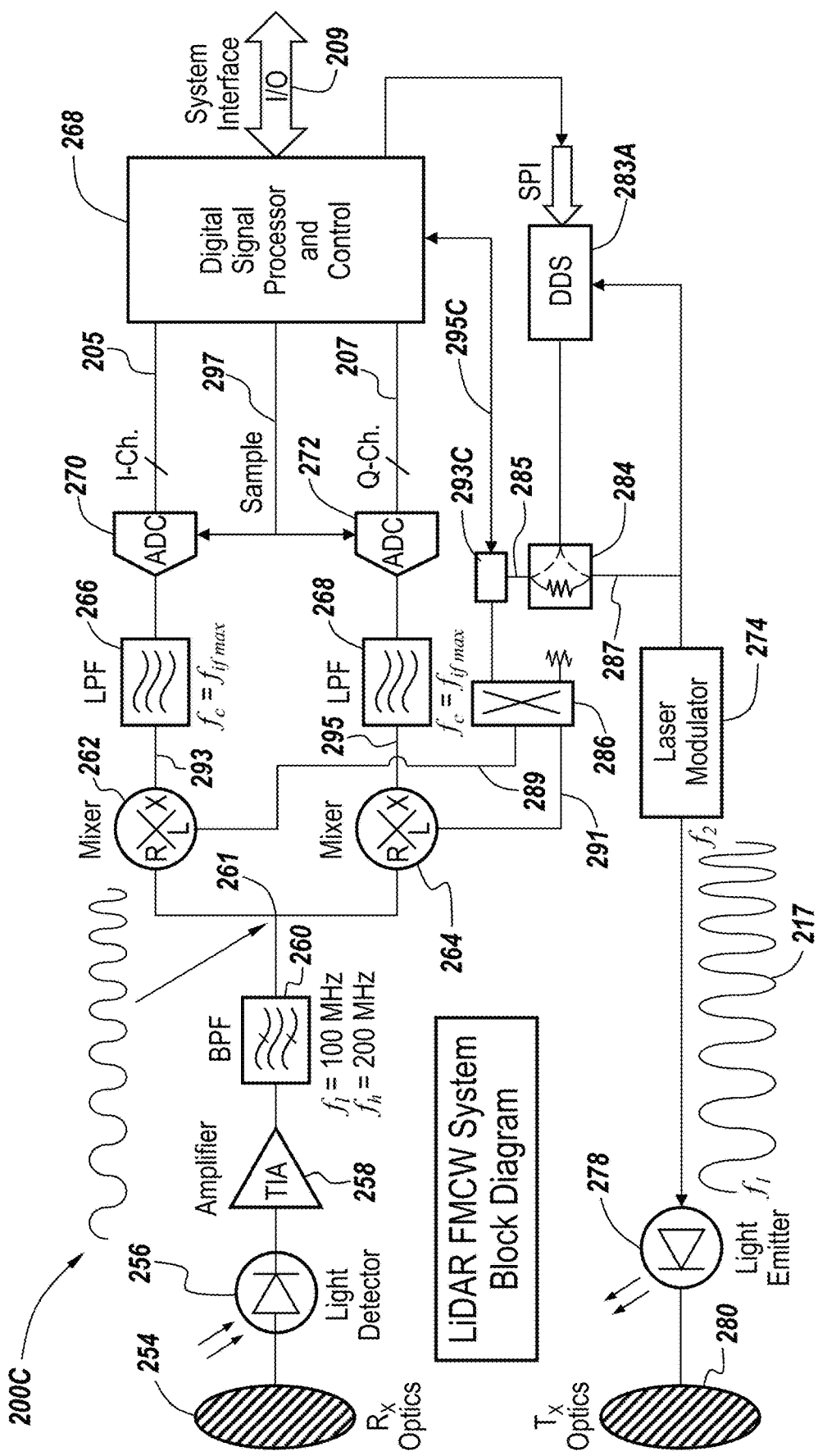
FIG. 47 includes a schematic functional block diagram which illustrates a LiDAR system using FMCW transmit envelope modulation illustrated in FIG. 3 and quadrature demodulation, with variations from the system illustrated in FIG. 29, according to some exemplary embodiments.

As described above, according to exemplary embodiments, the synthetic Doppler of the disclosure can be implemented using a variety of techniques. For example, in another implementation, a phase modulator can be inserted directly in the local oscillator (LO) path to the quadrature demodulator. FIG. 47 includes a schematic functional block diagram which illustrates a LiDAR system 200C using FMCW transmit envelope modulation illustrated in FIG. 3 and quadrature demodulation, with variations from the system illustrated in FIG. 29, according to some exemplary embodiments. The block diagram of FIG. 47 differs from the block diagram of FIG. 29 in that FIG. 47 illustrates phase modulator 293C inserted between output 285 of power splitter 284 and the input of 90-degree power splitter 286. The phase shift introduced to produce the synthetic "Doppler" of the exemplary embodiments is controlled by DSPC 268 via control line/interface 295C. The remaining elements of FIG. 47 are the same as those of FIG. 29 and are identified by like reference numerals. It should also be noted that, although not illustrated in FIG. 47, the LiDAR system 200C of FIG. 47 can include the scanning capability illustrated in and described in detail herein in connection with FIG. 22.

Application of the synthetic Doppler technique of the present disclosure described herein in detail provides an advantageous operational feature in an environment including relative motion. The technique enables differentiation of stationary and moving target objects, as well as target objects which are decreasing and increasing in range. Along these lines, according to the present disclosure, the synthetic Doppler incremental phase is added to all range bin columns of the first FFT. Because the synthetic Doppler frequency is known, all the range bins of stationary objects will be located at the known synthetic Doppler frequency. Further, all closing objects will be located in frequency bins above the synthetic Doppler frequency, while objects of increasing range will be located below the synthetic Doppler frequency. The same signal processing gain is available to stationary and moving objects.

The experimental data indicates further opportunities to exploit the signal processing gain. Additional modulation and coding waveforms are considered with system performance objectives of increased processing gain, measurement accuracy and spatial resolution.

Any of the embodiments of scanning LiDAR detection systems described herein in detail can be of the type described in copending U.S. patent application Ser. No. 15/410,158, filed on Jan. 19, 2017, of the same assignee as the present application, the entire contents of which are incorporated herein by reference. According to the exemplary embodiments, the scanning LiDAR detection systems of the present disclosure combine wide field of view with long detection range and high resolution. To achieve this in a biaxial system, i.e., a system in which the transmission optical axis is not the same as the reception optical axis, various features are combined in the system.

For example, in some exemplary embodiments, the present system includes a high-sensitivity detector that can detect the relatively small number of photons reflected back from long range. Also, the detection device, i.e., detector array, of the present system can be of relatively large size, thus providing an optical aperture collecting returning light from a relatively wide field of view. The detection system, i.e., detector array, of the present disclosure can have relatively high bandwidth to allow capture of a relatively short-duration light pulse. In some particular exemplary embodiments, the waveform is a pulsed frequency-modulated continuous-wave (FMCW) signal having a pulse repetition frequency (PRF) of 50-150 MHz. At 50% duty cycle, the light pulse duration can be 3.3-10 ns, which is captured by the high-bandwidth detector array of the disclosure.

Additionally, it is known that ambient light, such as sunlight, can cause shot noise in the detection system. According to the present disclosure, the amount of ambient light, e.g., sunlight, impinging on the detection system is substantially reduced. Dynamic range is maximized such that both bright objects at short distance and low-reflectivity objects at long range can be detected with the same configuration.

Thus, the scanning LiDAR system of the disclosure reduces the amount of ambient light and the signal light from objects at short distance that can reach the detection system by means of spatial filtering matching the far field laser pattern. This enables the combination of a large sensitive detector, a narrow laser beam and high signal-to-noise ratio (SNR) at long range in daytime conditions.

According to the present disclosure, in some exemplary embodiments, a fixed or moving mask is positioned in the focal plane of a receiver lens in the detection system, i.e., LiDAR sensor. The mask includes a set of slits and is aligned with the scan pattern of the transmitter. This enables the use of avalanche photodiode detectors (APDs) in the optical detector array. In alternative embodiments, silicon photomultipliers (SiPMs), also referred to as multi-pixel photon counters (MPPCs), can be used in the optical detector array. The SiPM array is an array of light-sensitive microcells, each in a binary single photon counting mode. Alternatively, APDs in the array are analog components, i.e., not operated in Geiger/photon counting mode. The array provides a very high gain over a large detector area combined with analog output and large bandwidth.

The LiDAR systems according to some embodiments of the present disclosure reduce ambient light by a factor of 5 to 500, and typically by a factor of 5 to 50. This results in increased signal-to-noise ratio (SNR) and increased range in daytime conditions. The system increases dynamic range due to focus change with respect to distance. The effective sensitivity of the APDs or SiPMs is increased, in the case of SiPMs, due to the non-linearity of the components. According to some exemplary embodiments, with the LiDAR system of the disclosure focused at infinity, the focal plane of the lens coincides with the slits in the mask. The focus shifts as the distance to a target object changes. At long range, the image plane will coincide with the focal plane of the lens, where the mask is placed. At closer range, the image plane will move away from the focal plane of the lens, i.e., further from the lens. This means that a significant amount of light will be blocked by the slit, and, therefore, the signal level at close range is substantially reduced, leading to increased dynamic range.

Figure 48:
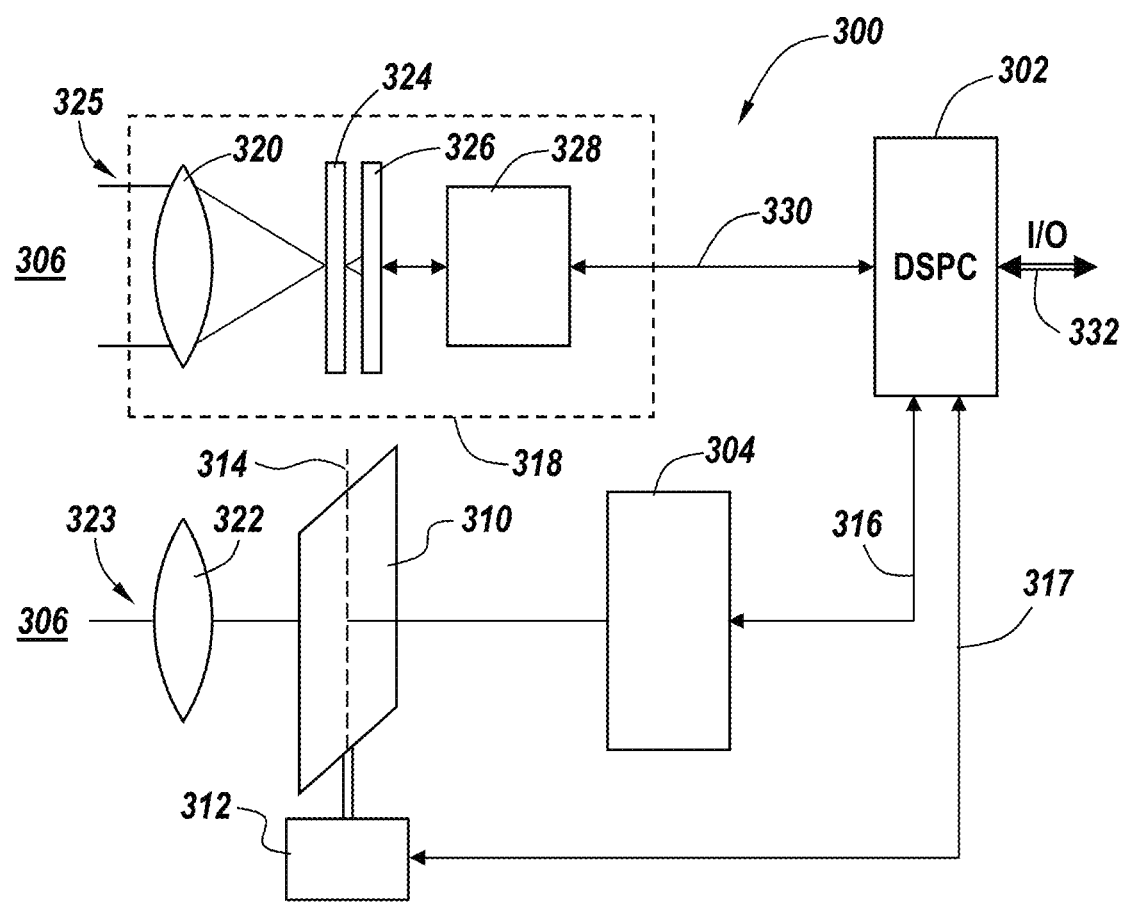
FIG. 48 includes a schematic functional block diagram of a scanning LiDAR system, according to exemplary embodiments.

FIG. 48 includes a schematic functional block diagram of a scanning LiDAR system 300, according to exemplary embodiments. Referring to FIG. 48, system 300 includes a digital signal processor and controller (DSPC) 302, which performs all of the control and signal processing required to carry out the LiDAR detection functionality described herein in detail. An optical source 304 operates under control of DSPC 302 via one or more control signals 316 to generate the one or more optical signals transmitted into a region 306 being analyzed. Among other functions, control signals 316 can provide the necessary control to perform wave shaping such as, in some exemplary embodiments, pulsed frequency-modulated continuous-wave (FMCW) modulation envelope control to produce the pulsed FMCW optical signal of some exemplary embodiments. Optical source 304 can include a single laser, or optical source 304 can include multiple lasers, which can be arranged in a one-dimensional or two-dimensional array. One or more optical signals 308 from source 304, which can be the pulsed FMCW optical signal of some exemplary embodiments, impinge on scanning mirror 310, which can be a microelectromechanical system (MEMS) scanning mirror. Scanning mirror 310 is rotatable about an axis 314 by an actuator 312, which operates under control of one or more control signals 317 provided by DSPC 302 to control the rotation angle of scanning mirror 310, such that the one or more output optical signals are scanned at various angles into region 306. The output optical signals pass through a lens or glass plate 322, which generates one or more collimated optical signals which are scanned across region 306. In some exemplary embodiments, lens or glass plate 322 collectively refers to optical elements which shape the output signals such that the divergence of each optical signal is substantially reduced or minimize.

Returning optical signals 325 are received from region 306 at receive subsystem 318. Receive subsystem 318 includes a lens 320 which receives and focuses light 325 returning from region 306. According to exemplary embodiments, mask 324 is located at the focal plane of lens 320, such that the returning light is focused at mask 324. Light passing through mask 324 impinges on optical detector array 326, which, in some exemplary embodiments, can include SiPM or MPPC photomultipliers. Detector array 326 converts the received optical signals to electrical signals, and a processor 328 generates digital signals based on the electrical signals and transmits the digital signals 330 to DSPC 302 for processing to develop target object identification, tracking and/or other operations. Reports of detections to one or more user interfaces or memory or other functions can be carried out via I/O port 332.

Figure 49A:
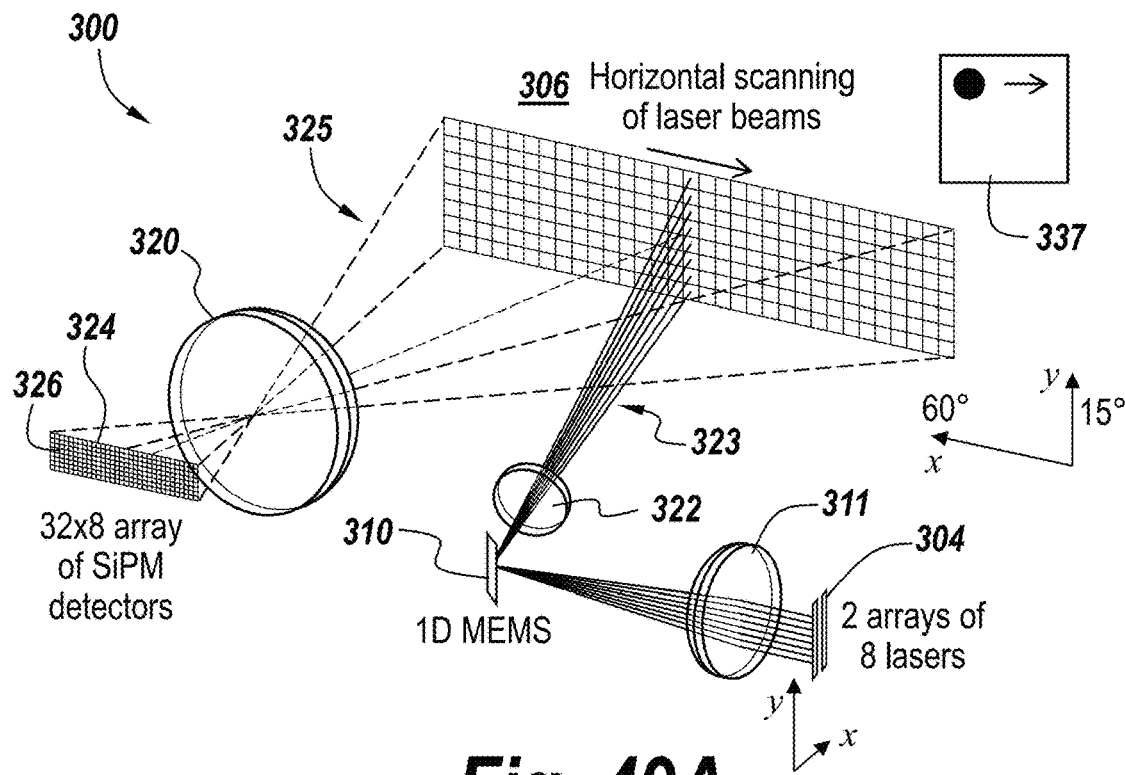
FIGS. 49A and 49B include schematic functional diagrams illustrating portions of the scanning LiDAR system of FIG. 48. Specifically.
Figure 49B:
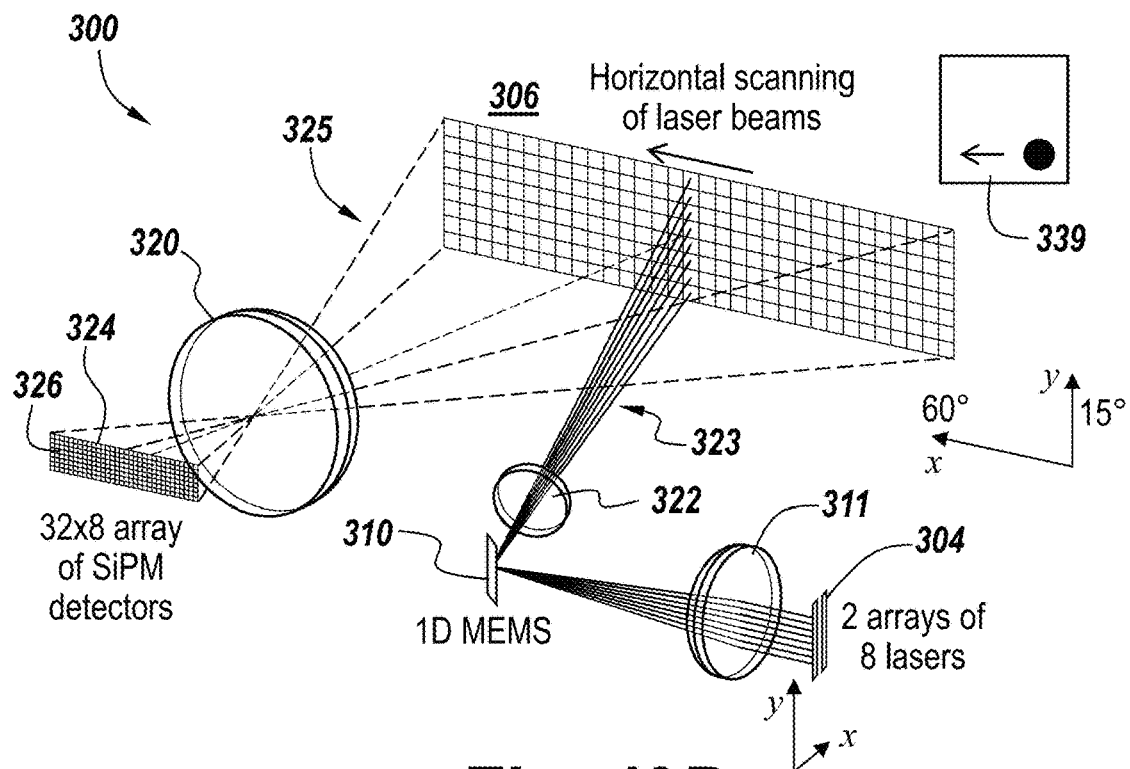

FIGS. 49A and 49B include schematic functional diagrams illustrating portions of scanning LiDAR system 100 of FIG. 48, according to exemplary embodiments. FIGS. 49A and 49B illustrate scanning of the transmitted optical signals into region 306 and reception of returning optical signals for a first angular direction of scanning of scanning mirror 310 about axis 314 and a second opposite angular scanning direction of scanning mirror 310 about axis 314, respectively.

Referring to FIGS. 48, 49A and 49B, optical source 304 can include one or more linear arrays of lasers disposed along parallel axes. That is, each linear array of lasers includes a plurality of lasers disposed along a vertical axis, i.e., a y-axis. In the exemplary embodiment illustrated in FIGS. 49A and 49B, two linear arrays are disposed along parallel axes in the y-axis direction. The axes are displaced along a horizontal axis, i.e., an x-axis. Thus, as illustrated in FIGS. 49A and 49B, the two parallel linear laser arrays create a two-dimensional array of laser outputs transmitted orthogonal to the x-y plane. In some particular exemplary embodiments, each of two linear arrays includes eight (8) lasers disposed along the y-axis, for a total of sixteen (16) lasers in the two-dimensional array. It will be understood that any number of lasers can be used, in accordance with the present embodiments. For example, in some particular exemplary embodiments, two linear arrays of eleven (11) lasers, i.e., a total of twenty-two (22) lasers, are used.

Continuing to refer to FIGS. 48, 49A and 49B, in some exemplary embodiments, the optical output signals from the laser array in source 304 are focused by a lens 311 onto MEMS scanning mirror 310. The optical signals are reflected from scanning mirror 310 through glass plate or lens 322, which generates the substantially mutually parallel collimated optical output signals 323. Controlled rotation of scanning mirror 310 via actuator 312 and DSPC 302 scans the substantially mutually parallel collimated optical output signals 323 over region 306. Light 325 returning from region 306, for example, light reflected from one or more target objects, is received at lens 320 of receive subsystem 318. Lens 320 focuses the returning light 325 onto mask 324, which is positioned in front of optical detector array 326, which, as illustrated in FIGS. 49A and 49B, can be, for example, a 32×8 array of APDs. As noted above the detectors in detector array 326 can also be SiPMs. Thus, in the particular illustrated exemplary embodiments, 32×8 SiPM detectors are arranged to provide a focal plane detector. Detector array 326 converts the received optical signals to electrical signals, and processor 328 generates digital signals based on the electrical signals and transmits the digital signals 330 to DSPC 302 for processing to develop target object identification, tracking and/or other operations. Reports of detections to one or more user interfaces or memory or other functions can be carried out via I/O port 332.

Thus, as illustrated in FIGS. 49A and 49B, in some particular exemplary embodiments, two arrays of 1×8 lasers are used to generate 16 individual laser beams, each beam with a nominal divergence of <0.1°. The vertical divergence of the group of 8 beams is nominally approximately 15°. Scanning mirror 310 is controlled to scan across a nominal range of approximately 60°, i.e., ±30° from its centered position. These angular limits are illustrated in FIGS. 49A and 49B in the diagrams of the x-y plane. FIG. 49A illustrates the case in which the output optical signals 323 are scanned in a first direction (to the right in FIG. 49A) via angular rotation of scanning mirror 310 in a first angular direction, and FIG. 49B illustrates the case in which the output signals 323 are scanned in a second direction (to the right in FIG. 49B) via angular rotation of scanning mirror 310 in a second angular direction. The resulting returning optical signals are scanned across the columns of the 32×8 detector array 326 illuminating pixels in the array in a predetermined order determined by the scanning of the output optical signals 323 into region 306, as illustrated in the schematic illustrations of pixel illumination scanning 337 and 339 in FIGS. 4A and 49B, respectively. It will be understood that all of these parameters are exemplary nominal values. According to the present disclosure, any number of lasers can be used, having a group beam divergence of greater than or less than 15°, and the angular scanning limits can be greater than or less than +30° from the centered position of scanning mirror 310.

According to the exemplary embodiments, since detector array has eight detectors in the vertical (y) direction, only one vertical linear array, i.e., column, is turned on at a time. That is, detector array 326 is read out one column at a time, in synchronization with the laser scan. This time multiplexing provides a "rolling shutter" which limits the influence of environmental light, i.e., sunlight, since only one column of detectors is receiving at a time. That is, the rolling shutter provides an approach by which only the detectors where the laser is currently illuminating the scene are read at a given instant, such that sunlight is eliminated or substantially reduced from the rest of the field of view. Additionally, mask 324, implemented in the form of a two-dimensional array of slits, is placed in front of detector array 326 to reduce further the amount of ambient light reaching detector array 326.

Figure 50:
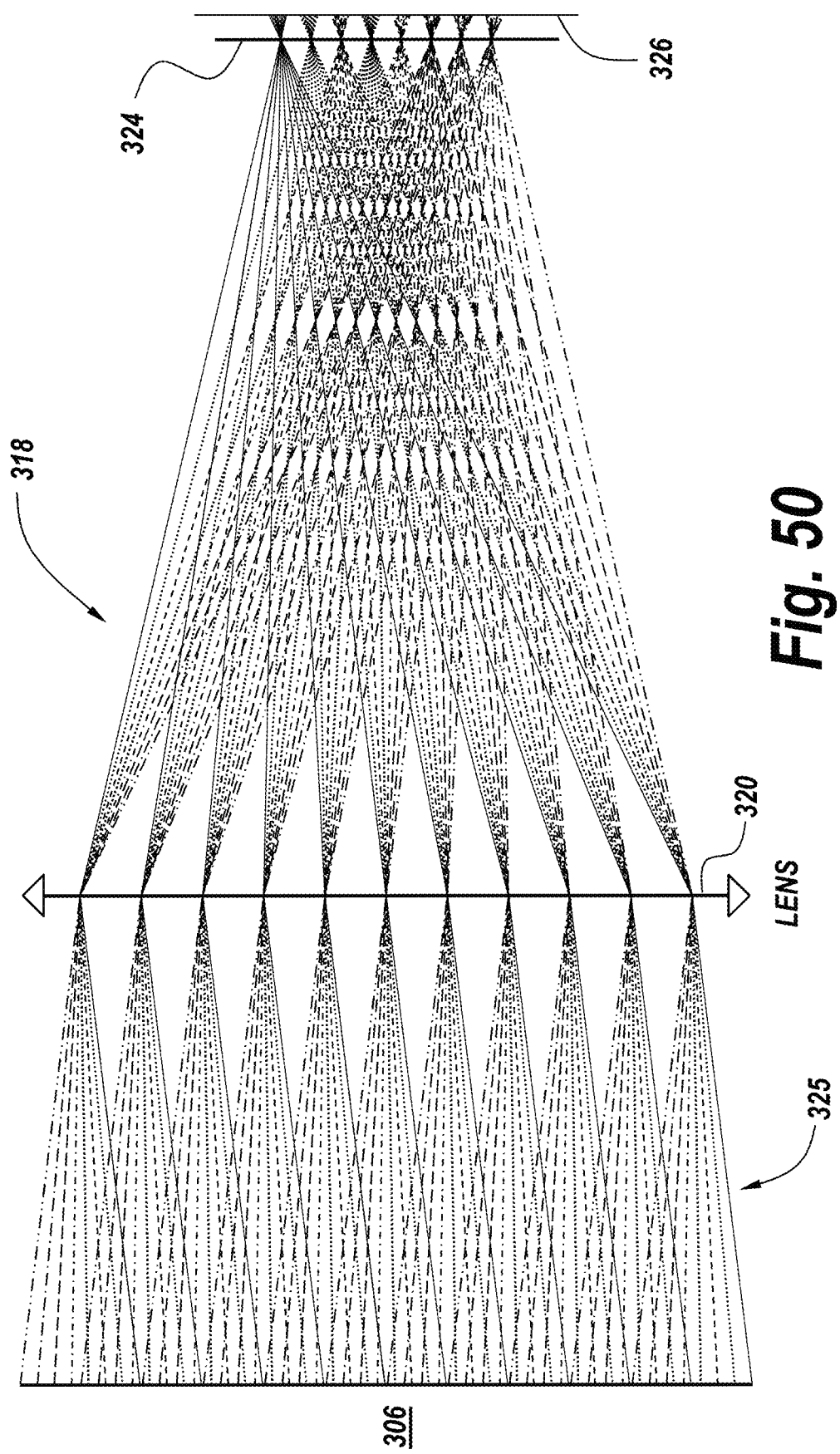
FIG. 50 includes a schematic diagram of a receive subsystem of the scanning LiDAR system of FIGS. 48, 49A and 49B, according to exemplary embodiments.

FIG. 50 is a schematic diagram of receive subsystem 318, according to exemplary embodiments. Referring to FIG. 50, and with reference to the foregoing detailed description of FIGS. 48, 49A and 49B, light 325 returning from region 306 impinges on lens 320. Mask 324 is placed at the focal plane of lens 320, such that light 325 is focused at mask 324. Light passing through mask 324 is received at detector array 326.

Figure 51:
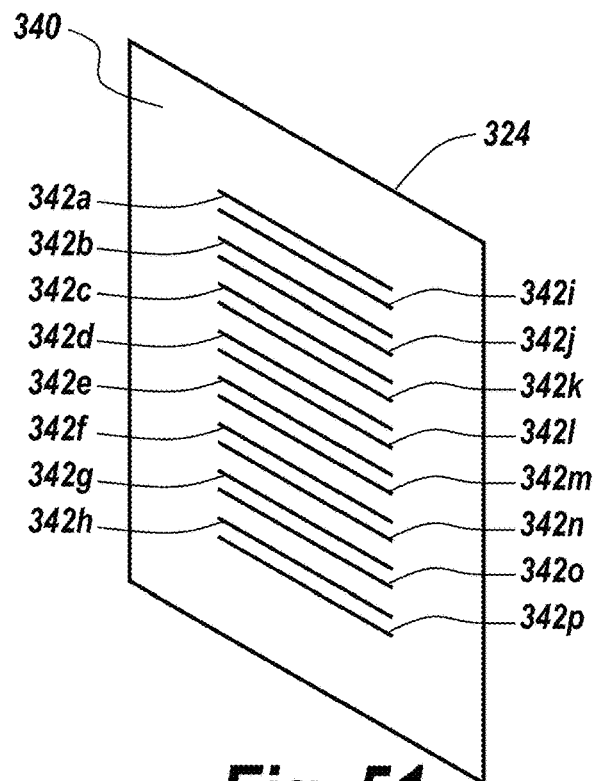
FIG. 51 includes a schematic diagram of a mask in the receive subsystem of FIG. 50, according to exemplary embodiments.

FIG. 51 includes a schematic diagram of mask 324, according to some exemplary embodiments. Mask 324 includes an optically opaque portion 340 and a plurality of optically transparent horizontal slits 342a-342p. It is noted that the use of 16 slits is consistent with the particular illustrative exemplary embodiment described herein in which light source 304 includes two linear arrays of eight lasers each. It will be understood that where a different laser configuration or quantity is used, mask 324 would include a different number of slits 342. For example, in the case in which source 304 includes two linear arrays of 11 lasers, mask 324 would include 22 slits 342.

Referring to FIG. 51, it is noted that alternating slits 342 are associated with the same linear laser array in source 304. That is, specifically, each of alternating slits 342a through 342h is associated with returning light generated by a respective one of the eight lasers in one of the vertical linear arrays of lasers in source 304, and each of alternating slits 342i through 342p is associated with returning light generated by a respective one of the eight lasers in the other of the vertical linear arrays of lasers in source 304. In accordance with some exemplary embodiments, the linear arrays of lasers of source 304 are offset vertically with respect to each other. As a result, the alternating groups of slits 342a-342h and 342i-342p are offset vertically with respect to each other on mask 324, such that returning light associated with each laser is in alignment with its corresponding slit.

Mask 324 can be made of one of various possible materials, such as plastic, metal, metal foil, or other material. Slits 342 can be formed in mask 324 by laser. In other embodiments, opaque portion 340 and slits 342 can be formed by photolithographic processes. For example, the opaque portion 340 can be formed of an optically sensitive opaque material, and slits 342 can be formed by selective exposure of the optically sensitive opaque material, e.g., through a patterned mask, followed by appropriate developing and further processing to generate the transparent slits 342.

Figure 52:
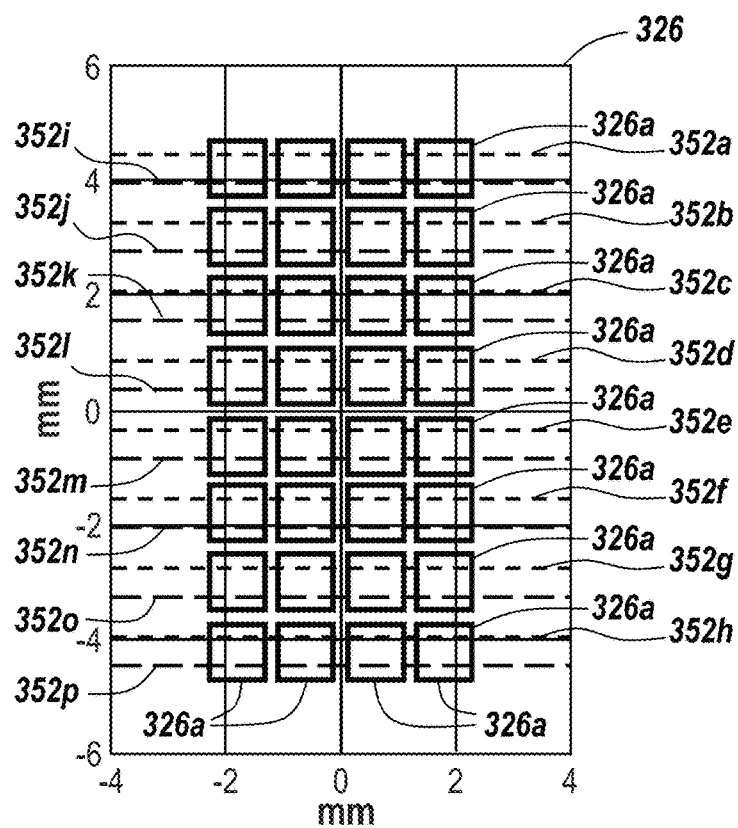
FIG. 52 includes a schematic elevational view of a portion of a detector array in the receive subsystem of FIG. 50, according to exemplary embodiments.

FIG. 52 includes a schematic elevational view of a portion of detector array 326, according to some exemplary embodiments. Referring to FIG. 52, eight rows of four detectors 326a are illustrated. That is, 32 of the 256 detectors 326a in detector array 326 are illustrated for clarity of illustration and description. As described above, according to the present disclosure, each of detectors 326a can be an APD or SiPM. FIG. 52 also illustrates the received pulses of light 325 returning from region after being focused by lens 320 and passing through slits 342 in mask 324. These received pulses appear in FIG. 52 as broken lines along array 326 of detectors 326a. Specifically, broken lines 352a through 352h illustrate pulses of returning light 325 impinging on array 326 after passing through slits 342a through 342h, respectively, of mask 340. Similarly, broken lines 352i through 352p illustrate pulses of returning light 325 impinging on array 326 after passing through slits 342i through 342p, respectively, of mask 340. Thus, referring to FIGS. 48-52, because of the vertical, y-axis offset between the linear arrays of lasers in source 304, each detector 326a of array 326 receives and processes light from a plurality of lasers, e.g., two lasers as illustrated in FIG. 52, the light passing through a respective plurality of slits 342, e.g., two slits, in mask 324.

Thus, according to the present disclosure, in some exemplary embodiments, mask 324 having 2N horizontal slits is placed in front of detector array 326 of detectors 326a, the array 326 having N detectors 326a in the vertical, i.e., y, direction. Mask 324 is aligned with the scan pattern of 2N horizontally alternately scanning laser beams. Continuing to refer to FIG. 52, in some particular exemplary embodiments, slits 342 could be as small as the diffraction limit allows, i.e., $\lambda \times$f-number~1 µm. In some embodiments, the width of slits 342 can be ~0.1 mm, due to alignment tolerances. With two 0.1 mm slits 342 per 1 mm$^2$ detector element 3126a, ambient light is reduced by a nominal factor of 5, but a factor of ~500 is also possible.

According to the exemplary embodiments, array 326 is an array of APDs or SiPMs, which provide certain advantages and improvements. For example, the large size and short response time of the detector elements 326a provide array 326 with a large detection area. This in turn enables a large light-collecting aperture of the receiving subsystem lens. The increased light provides better signal-to-noise ratio (SNR) and longer range. Also, with mask 324 in focus, but detector array 326 out of focus, local saturation of detector elements 326a is avoided. This results in increased dynamic range and further increased performance in high levels of ambient light.

According to the exemplary embodiments, with mask 324 in the focal plane of lens 320, all signal light passes through slits 342 in mask 324 at long distances. Without mask 324, the optical signal intensity would vary inversely with the square of the distance. Therefore, at short range, signal intensity would be extremely high, which can cause a drop in system dynamic range. With mask 324 inserted as described herein in detail, only a small fraction of the returning light at short distances passes through slits 342, which eliminates the reduction in dynamic range caused by light returning from short-range target objects.

Figure 53:
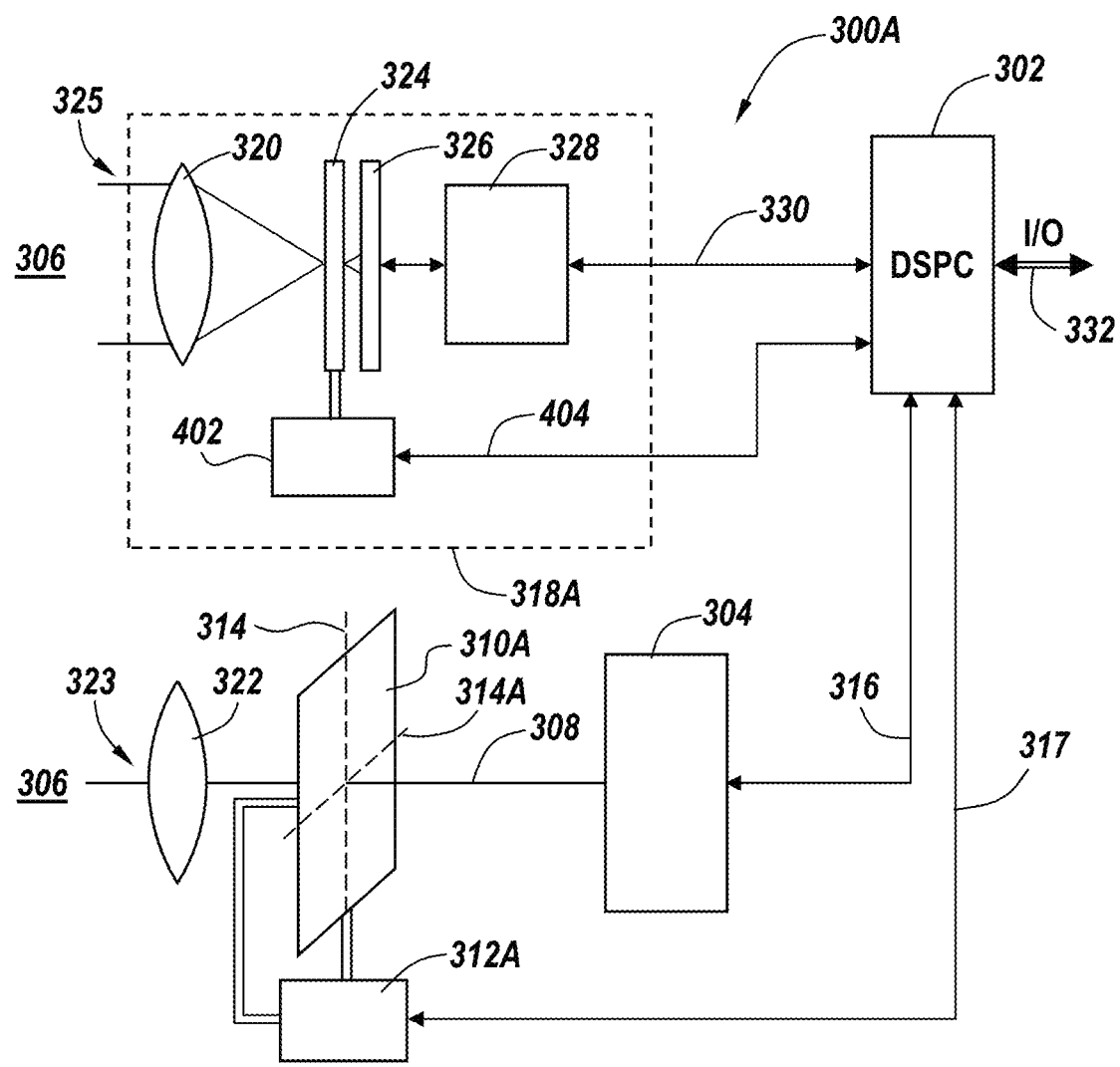
FIG. 53 includes a schematic functional block diagram of a scanning LiDAR system, in which horizontal and vertical scanning are performed, according to exemplary embodiments.
Figure 54:
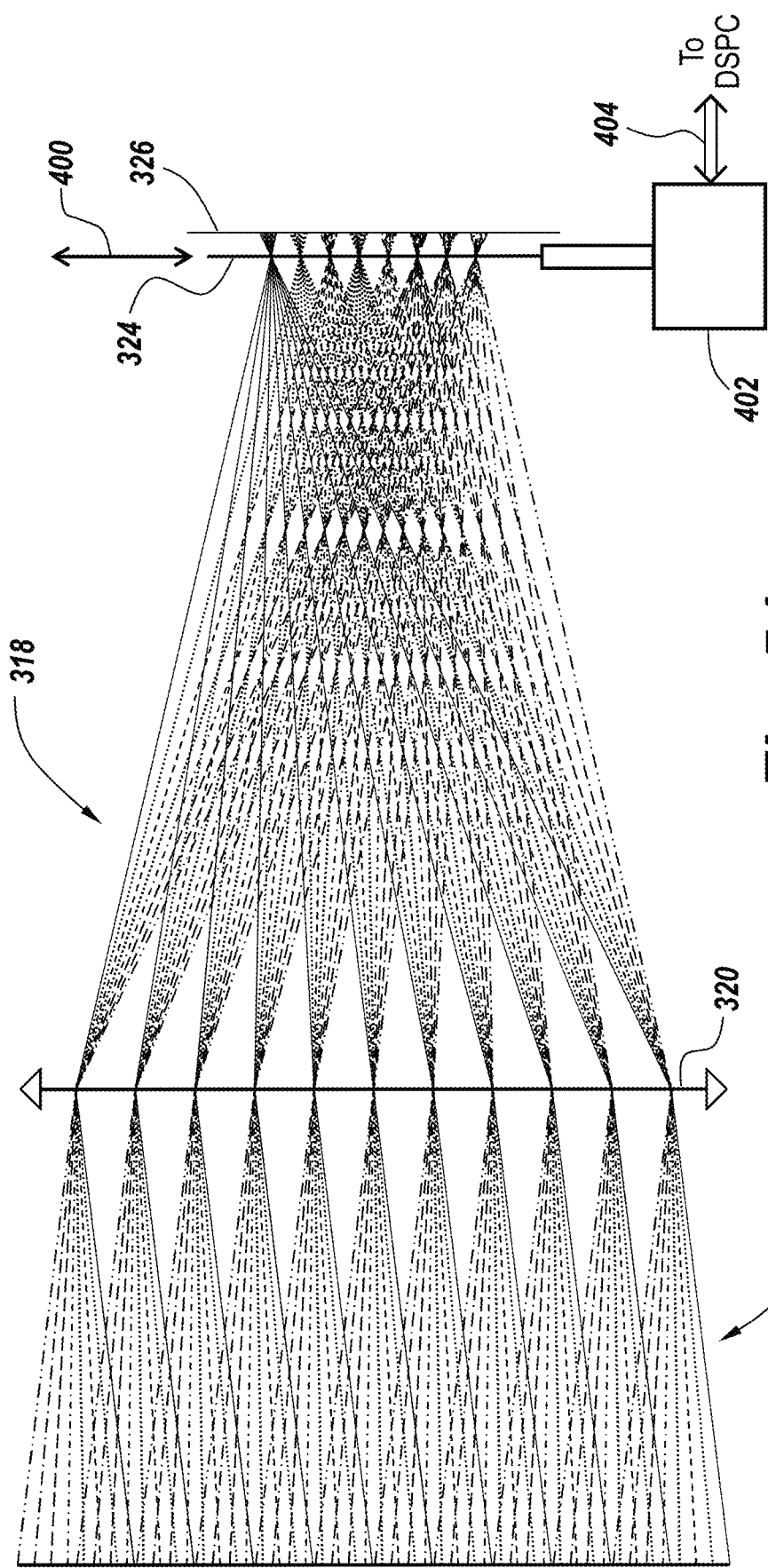
FIG. 54 includes a schematic diagram of a receive subsystem of the scanning LiDAR system of FIG. 53, in which horizontal and vertical scanning are performed, according to exemplary embodiments.

In some embodiments, in addition to horizontal scanning as described above in detail, scanning can also be carried out vertically. The vertical scanning can be performed in order to increase vertical resolution. FIG. 53 includes a schematic functional block diagram of a scanning LiDAR system 300A, in which horizontal and vertical scanning are performed, according to exemplary embodiments. FIG. 54 includes a schematic diagram of receive subsystem 318A in scanning LiDAR system 300A of FIG. 53, in which horizontal and vertical scanning are performed, according to exemplary embodiments. Referring to FIGS. 53 and 54, elements that are substantially the same as those in FIGS. 48, 49A, 49B and 50 are identified by the same reference numerals. Referring to FIGS. 53 and 54, in this embodiment, actuator 312A, in addition to initiating and controlling horizontal scanning of scanning mirror 310A about vertical axis 314, initiates and controls vertical scanning of scanning mirror 310A about horizontal axis 314A. In this alternative embodiment, mask 324 is also moved vertically alternately up and down in synchronization with the vertical scanning of scanning mirror 310A, as indicated by arrow 400 in FIG. 54. Vertical movement of mask 324 is initiated by a mechanical actuation device, such as a piezoelectric actuator 402, in synchronization with scanning of scanning mirror 310A, such that alignment of slits 342 of mask 324 with returning light 325 is maintained. This synchronization is accomplished via interface 404 with DSPC 302.

Figure 55:
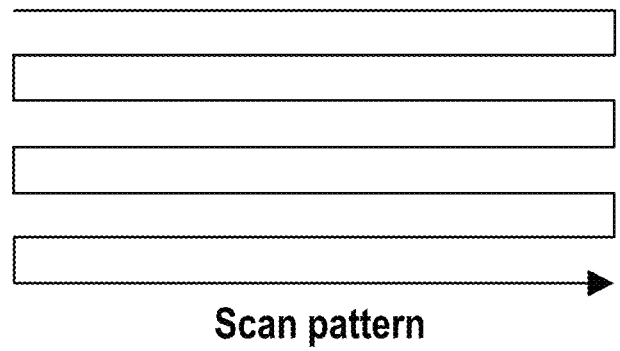
FIG. 55 includes a schematic diagram illustrating the pattern of light beams scanned over the detector array of the receive subsystem of FIG. 54, in the case in which vertical and horizontal scanning are performed, according to exemplary embodiments.

FIG. 55 is a schematic diagram illustrating the pattern of light beams scanned over detector array 326, in the case in which vertical and horizontal scanning are used, according to exemplary embodiments. Referring to FIG. 55, in some embodiments, as illustrated by the scan pattern, at the end of each horizontal scan line, scanning mirror 310A is rotated one step vertically. At the same time, mask 324 is moved vertically to ensure alignment of slits 342 in mask 324. This process of horizontal scan lines separated by vertical scanning increments results in the serpentine pattern of light beams impinging on detector array 326, as illustrated in FIG. 55.

In the foregoing detailed description, scanning LiDAR systems of the exemplary embodiments are shown as having biaxial configurations. That is, the systems are illustrated and described as having separate output (transmission) axes and input (reception) axes. Output signals are transmitted into the region being analyzed along a first axis, and returning light signals are received from the region along a second axis different than the first axis. The present disclosure is also applicable to coaxial system configurations in which the input and output axes are substantially the same.

Figure 56A:
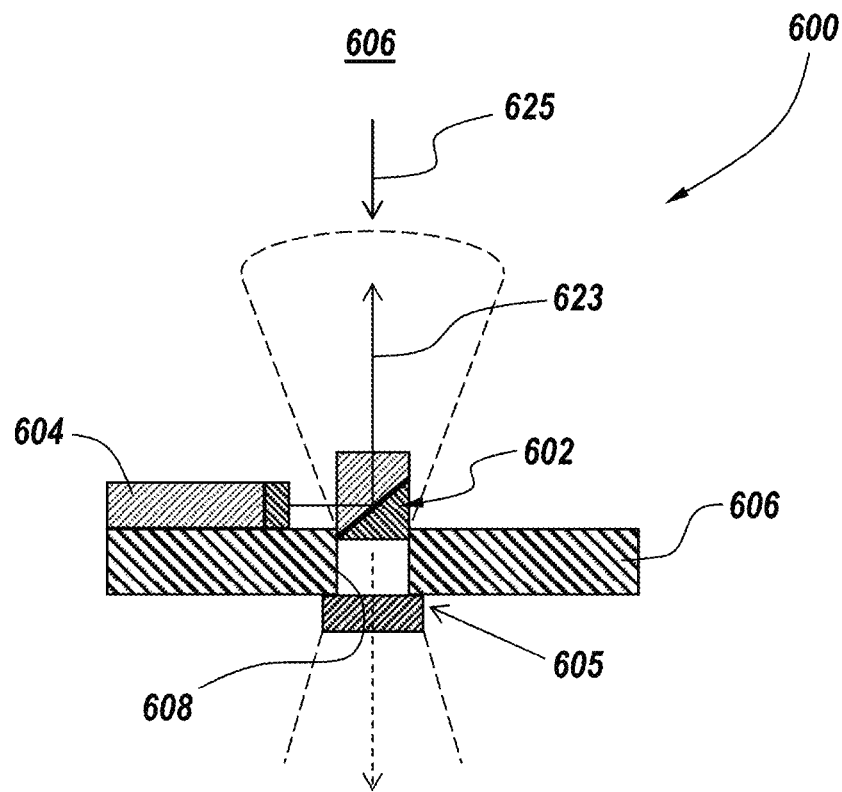
FIGS. 56A and 56B include schematic diagrams illustrating portions of a scanning LiDAR system in which a coaxial configuration is implemented, according to some exemplary embodiments.
Figure 56B:
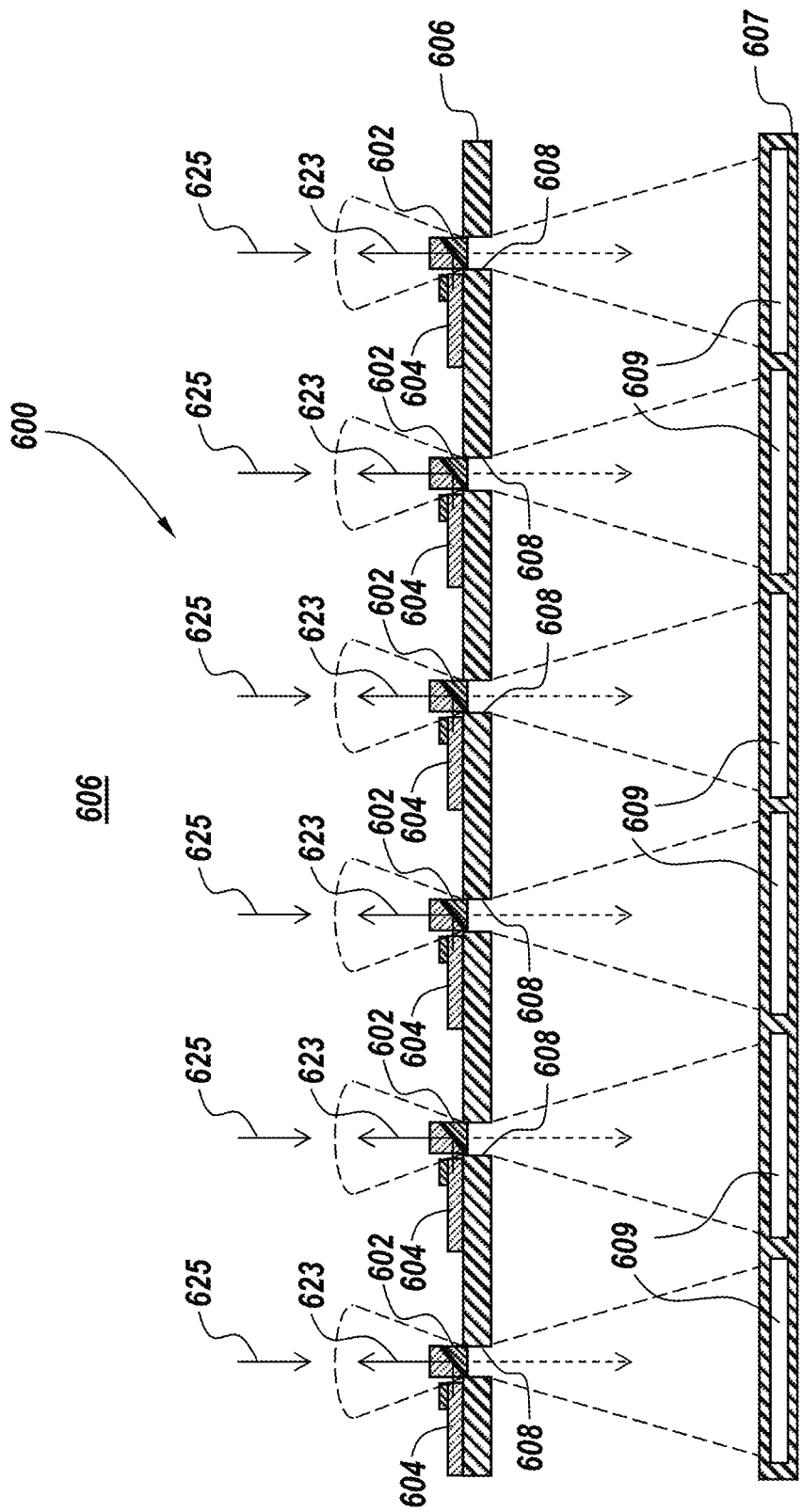

FIGS. 56A and 56B include schematic diagrams illustrating portions of a scanning LiDAR system 600 in which a coaxial configuration is implemented, according to some exemplary embodiments. FIG. 56A illustrates a single coaxial configuration, and FIG. 56B illustrates multiple coaxial configurations in parallel. Referring to FIGS. 56A and 56B, a laser light source 604 integrated on or in a substrate 606 generates an output beam of light. The output beam is reflected by a polarizing beam splitting cube 602 such that output signals 623 are transmitted into region 606. Returning light signals 625 from region 606 are transmitted through polarizing beam splitting cube 602, through an opening 608 in substrate 606. The light may pass through an optional bandpass filter 605, which further reduces the ambient light. The light is detected by detectors 609 in detector array 607.

Figure 57A:
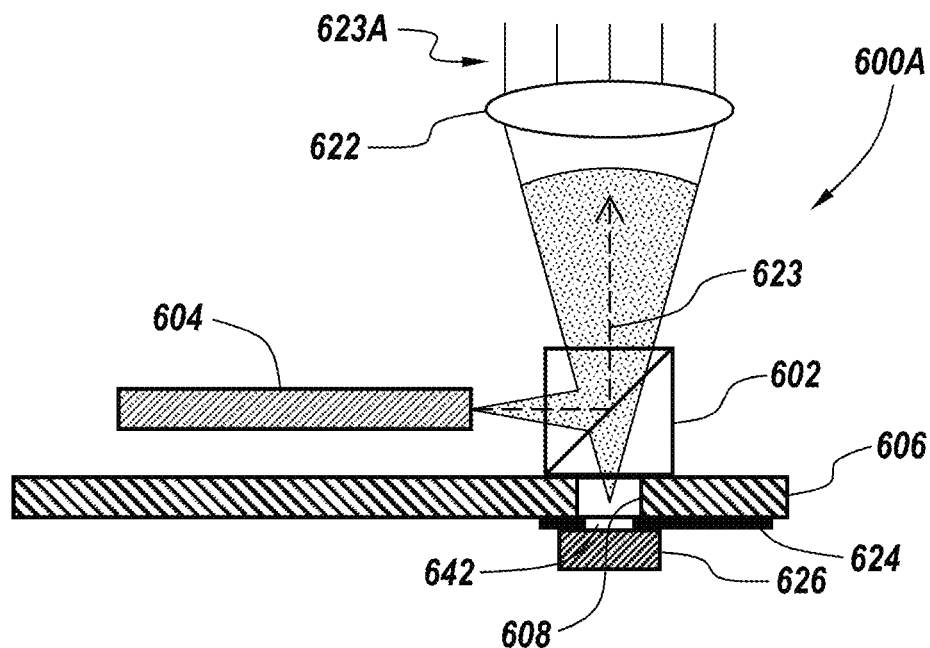
FIGS. 57A and 57B include schematic diagrams illustrating portions of scanning LiDAR systems in which a coaxial configuration is implemented, according to some exemplary embodiments.
Figure 57B:
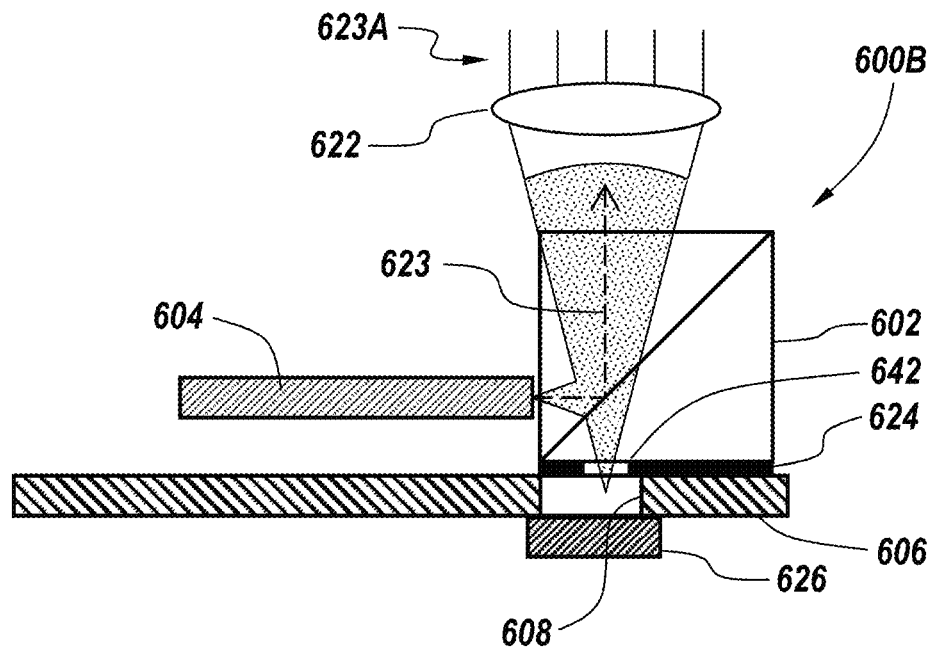

FIGS. 57A and 57B include schematic diagrams illustrating portions of scanning LiDAR systems 600A and 600B, respectively, in which a coaxial configuration is implemented, according to some exemplary embodiments. The primary difference between systems 600A, 600B of FIGS. 57A and 57B is that, in system 600A, mask 624 is under substrate 606, and, in system 600B, mask 624 is at the top side of substrate 606. In both systems 600A and 600B, incoming light from polarizing beam splitting cube 602 passes through slits 642 in mask 624 and impinges on APD or SiPM detector 626. In the embodiments of FIGS. 57A and 57B, lens 622 generates the substantially mutually parallel collimated optical output signals 623A. Controlled rotation of the scanning mirror scans the substantially mutually parallel collimated optical output signals 623A over the region being analyzed.

Figure 58:
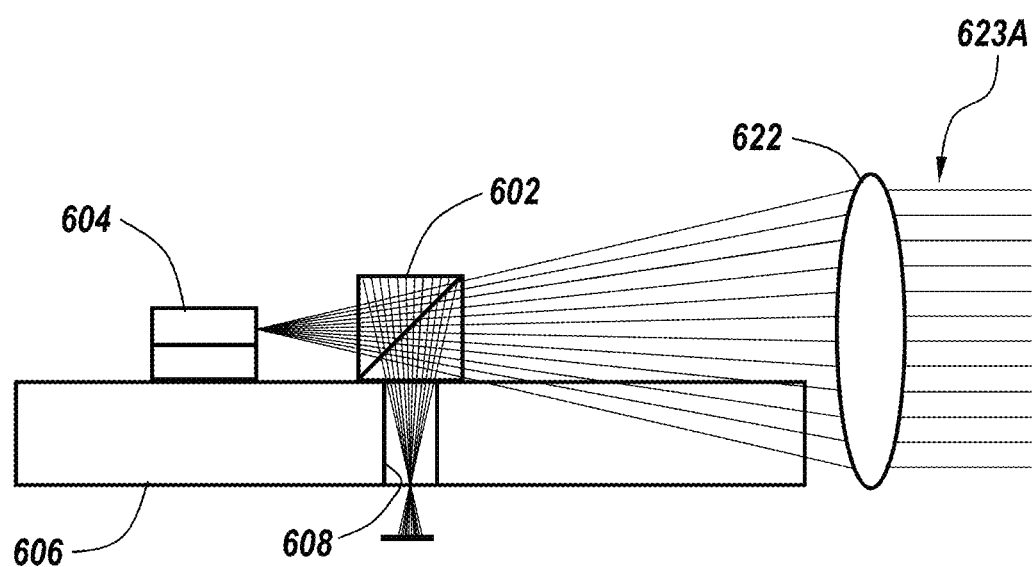
FIG. 58 includes a schematic diagram illustrating any of the coaxial scanning LIDAR systems described herein, illustrating the size relationship between the aperture or slit and the pupil of the laser source, according to some exemplary embodiments.

FIG. 58 includes a schematic diagram illustrating any of systems 300, 300A, 600, 600A, 600B, illustrating the size relationship between the opening 608 or slit 642 and the pupil of the laser source 604. As in the embodiments described in detail above, in the embodiment of FIG. 58, lens 622 generates the substantially mutually parallel collimated optical output signals 623A. Controlled rotation of the scanning mirror scans the substantially mutually parallel collimated optical output signals 623A over the region being analyzed.

It should be noted that polarizing beam splitting cube 602 in the embodiments described above in detail in connection with FIGS. 56A, 56B, 57A, 57B and 58 need not be a cube. In alternative embodiments, polarizing beam splitting cube 602 can be replaced with a polarizing beam splitting plate tilted at an appropriate angle with respect to the optical paths of the respective systems.

Figure 59:
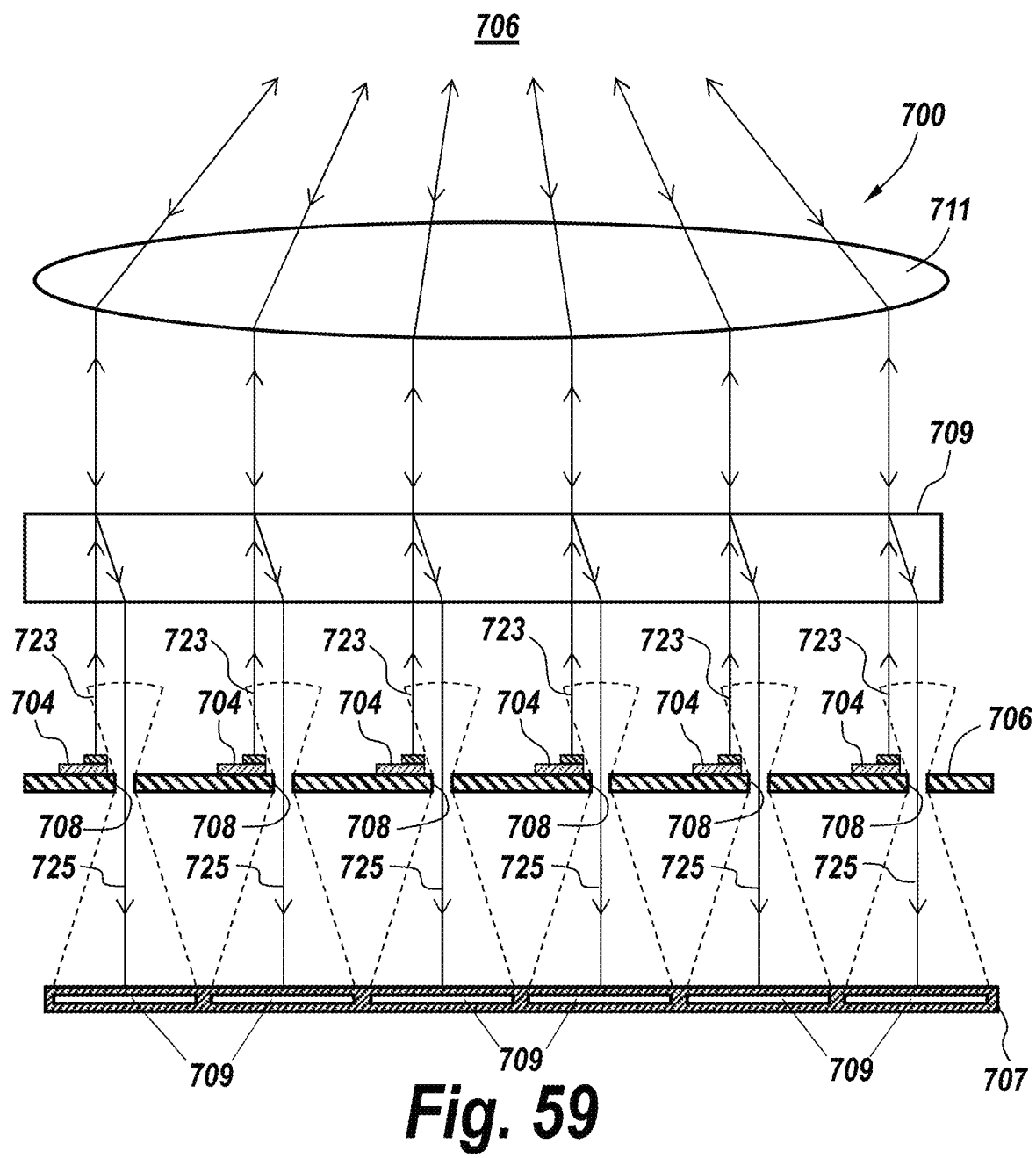
FIG. 59 includes a schematic diagram illustrating a portion of a scanning LiDAR system in which a coaxial configuration is implemented, according to some exemplary embodiments.

FIG. 59 includes a schematic diagram illustrating a portion of a scanning LiDAR system 700 in which a coaxial configuration is implemented, according to some exemplary embodiments. System 700 differs from systems 600, 600A and 600B in that, in system 400, no beam splitting cube is included. Instead, laser light source 704 provides output light 723 in a vertical direction into region 706 through an optical element such as birefringent crystal 409 and lens 411. Returning light 725 passes through lens 411 and birefringent crystal 409 such that the returning light is shifted to pass through openings 708 in substrate 706 toward detectors 709 of detector array 706. Birefringent crystal 409 affects the two polarization directions of the light differently. One is laterally shifted, and the other is not shifted. Hence, birefringent crystal 409 acts as a polarizing beam splitter. Birefringent crystal 409 can be made of a material such as calcite, or other similar material.

It will be understood that all of the detailed description above with respect to scanning LiDAR systems 100, 200, 200A, 200B, 100A and 200C is applicable to coaxial scanning LiDAR systems 300, 300A, 600, 600A, 600B and 700.

Figure 60:
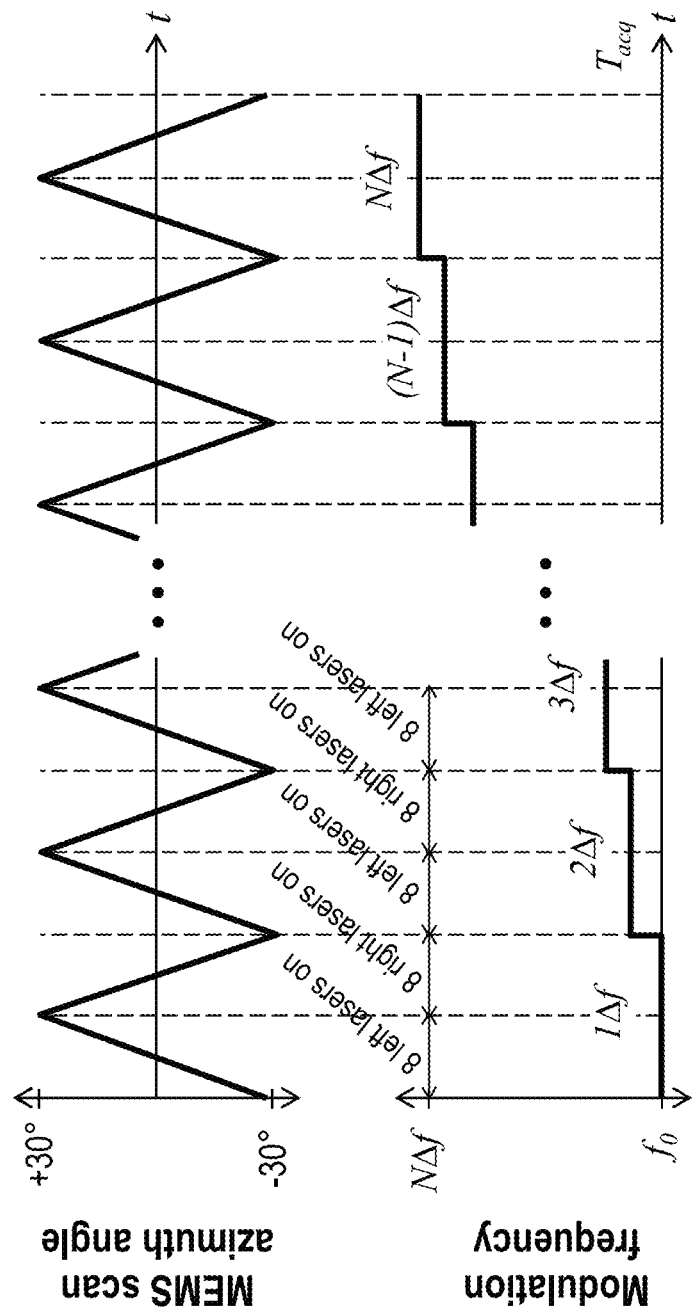
FIG. 60 includes schematic timing diagrams illustrating a timing relationship between frequency ramp sweeps of the illumination optical signal transmitted into the region being analyzed and the angular MEMS scanning mirror position, according to some exemplary embodiments.

FIG. 60 includes schematic timing diagrams illustrating a timing relationship between frequency ramp sweeps of the illumination optical signal transmitted into the region being analyzed and the angular MEMS scanning mirror position, according to some exemplary embodiments. Referring to FIGS. 49A, 49B and 60, in the illustrated embodiments, the frequency of the amplitude modulation can be stepped once for each MEMS mirror scan, that is, for each back-and-forth, "round trip" rotation between angular extents of rotation of the MEMS mirror, which is illustrated as +30° in the embodiments of FIG. 60. For each half scan, i.e., from −30° to +300, or vice versa, a different laser column, e.g., "right" column or "left" column, of the array of lasers illustrated in FIGS. 49A and 49B is activated, and reflected light from the active column is read. For the exemplary illustration of FIGS. 49A, 49B and 60, during the positive-going mirror rotation from −30° to +300, the eight "left" lasers are active, as illustrated in FIG. 49A; during the negative-going mirror rotation from +300 to −300, the eight "right" lasers are active, as illustrated in FIG. 49B. As described above in detail, the detected signals are mixed with the original signal in a demodulator circuit, resulting in I and Q signals in a matrix that can be analyzed by an FFT to filter out the return from different distances. In one particular exemplary embodiment, the I-Q matrix is generated for azimuth angles −30° to +300, and for 128 frequency steps, from 50 MHz to 150 MHz.

Figure 61:
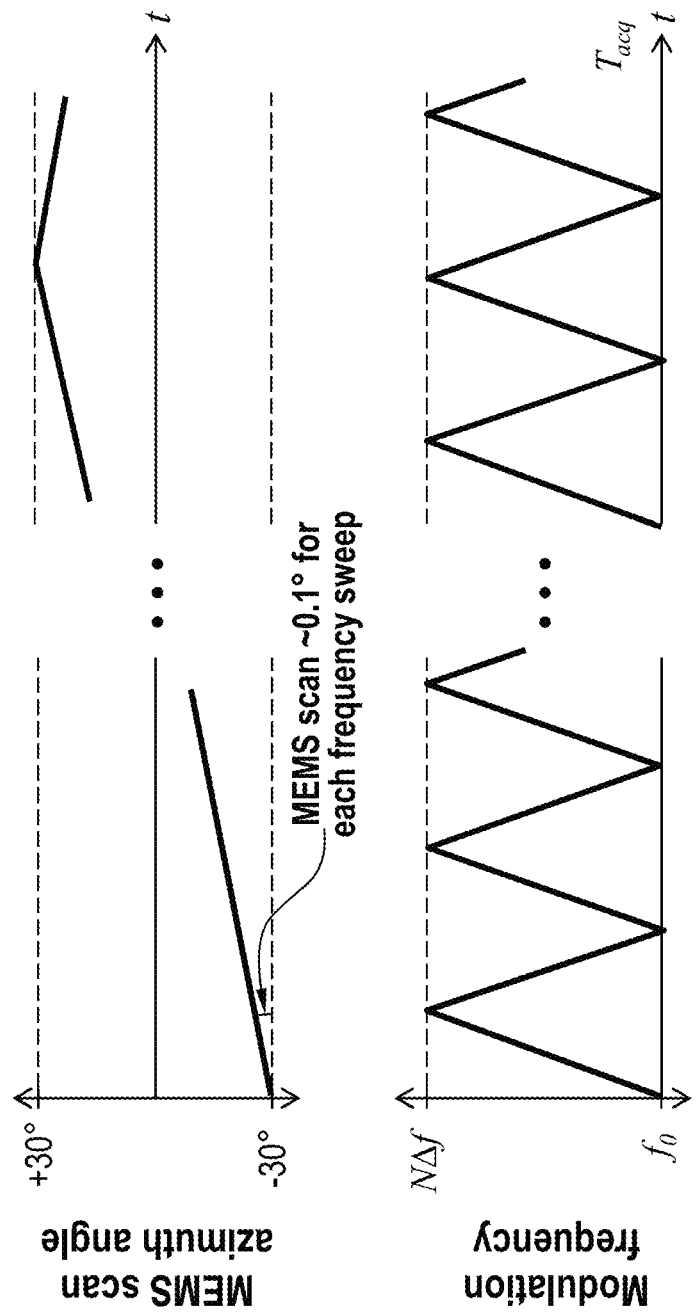
FIG. 61 includes schematic timing diagrams illustrating another timing relationship between frequency ramp sweeps of the illumination optical signal transmitted into the region being analyzed and the angular MEMS scanning mirror position, according to some exemplary embodiments.

FIG. 61 includes schematic timing diagrams illustrating another timing relationship between frequency ramp sweeps of the illumination optical signal transmitted into the region being analyzed and the angular MEMS scanning mirror position, according to some exemplary embodiments. In contrast to FIG. 60, in the approach of FIG. 61, the amplitude modulation is rapidly swept during the MEMS dwell time. That is, each frequency sweep is completed before the MEMS scanning mirror has moved the laser beams more than the desired resolution, e.g., approximately 0.1°.

According to the present disclosure, the use of an amplitude-modulated illumination waveform and correlated detection with demodulators maximizes the power on the target with a low-peak-power laser diode. This allows for detection of multiple reflections. Also, as described in detail herein, multiple laser beams in a comb configuration with limited beam divergence keeps acquisition time low by performing multiple detections in parallel. The rolling shutter limits interference from sunlight to increase SNR.

Figure 62:
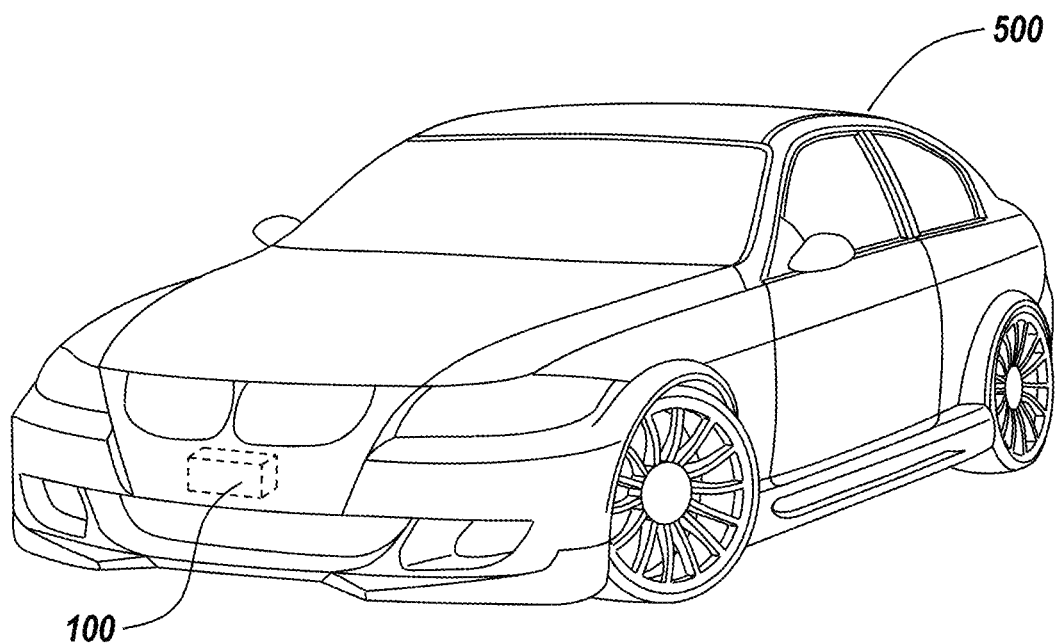
FIG. 62 includes a schematic perspective view of an automobile equipped with one or more LiDAR systems described herein in detail, according to some exemplary embodiments.

FIG. 62 includes a schematic perspective view of an automobile 500, equipped with one or more LiDAR systems 100, 200, 200A, 200B, 100A, 200C, 300, 300A, 600, 600A, 600B and 700 (referred to collectively by reference numeral 100), described herein in detail, according to exemplary embodiments. Referring to FIG. 62, it should be noted that, although only a single LiDAR system 100 is illustrated, it will be understood that multiple LiDAR systems 100 according to the exemplary embodiments can be used in automobile 500. Also, for simplicity of illustration, LiDAR system 100 is illustrated as being mounted on or in the front section of automobile 500. It will also be understood that one or more LiDAR systems 100 can be mounted at various locations on automobile 500. Also, although only system 100 is illustrated, it will be understood that any of the embodiments of LiDAR systems described herein can be used.

Figure 63:
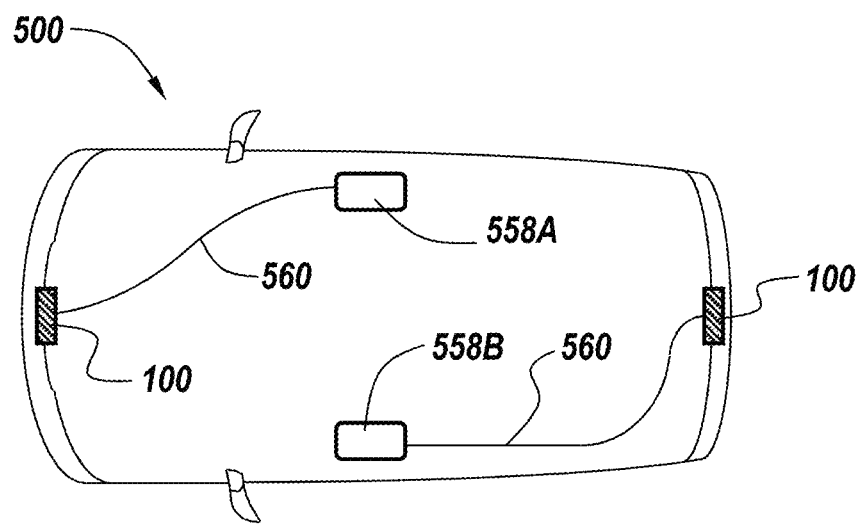
FIG. 63 includes a schematic top view of an automobile equipped with two LiDAR systems as described herein in detail, according to some exemplary embodiments.

FIG. 63 includes a schematic top view of automobile 500 equipped with two LiDAR systems 100, as described above in detail, according to exemplary embodiments. In the particular embodiments illustrated in FIG. 63, a first LiDAR system 100 is connected via a bus 560, which in some embodiments can be a standard automotive controller area network (CAN) bus, to a first CAN bus electronic control unit (ECU) 558A. Detections generated by the LiDAR processing described herein in detail in LiDAR system 100 can be reported to ECU 558A, which processes the detections and can provide detection alerts via CAN bus 560. Similarly, in some exemplary embodiments, a second LiDAR system 100 is connected via CAN bus 560 to a second CAN bus electronic control unit (ECU) 558B. Detections generated by the LiDAR processing described herein in detail in LiDAR system 100 can be reported to ECU 558B, which processes the detections and can provide detection alerts via CAN bus 560. It should be noted that this configuration is exemplary only, and that many other automobile LiDAR configurations within automobile 500 can be implemented. For example, a single ECU can be used instead of multiple ECUs. Also, the separate ECUs can be omitted altogether. Also, although only system 100 is illustrated, it will be understood that any of the embodiments of LiDAR systems described herein can be used.

It is noted that the present disclosure describes one or more scanning LiDAR systems installed in an automobile. It will be understood that the embodiments of scanning LiDAR systems of the disclosure are applicable to any kind of vehicle, e.g., bus, train, etc. Also, the scanning LiDAR systems of the present disclosure need not be associated with any kind of vehicle.

It is also noted that the foregoing detailed description is directed primarily to LiDAR detection systems. It will be understood that the present disclosure is also applicable to other forms of detection systems, such as radar systems.

It is also noted that the foregoing detailed description refers to direct detection LiDAR systems as exemplary embodiments. It will be understood that the various features and embodiments described herein with respect to scanning LiDAR systems with spatial filtering techniques can be applied to direct detection and homodyne/heterodyne LiDAR systems.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A LiDAR detection system, comprising:
a plurality of optical sources disposed along a first direction for generating a plurality of output optical signals disposed along the first direction;
optical transmission elements for transmitting the output optical signals into a region;
a scanning device for scanning the output optical signals over a second direction different than the first direction;
a receiver for receiving return optical signals at least partially generated by reflection of the transmitted output optical signals and generating receive signals indicative of the return optical signals, the receiver comprising a two-dimensional array of optical detectors;
a mask disposed in proximity to the array between the region and the array, the return optical signals impinging on the mask, the mask comprising a plurality of apertures disposed along a direction aligned with a first dimension of the array, each aperture being adapted such that the mask blocks a first portion of the return optical signals from impinging on the array and the aperture allows a second portion of the return optical signals to impinge on the array, wherein the receive signals are generated for a set of detectors in the array disposed along the first dimension of the array and aligned with the apertures in the mask and exposed to the received return optical signals, wherein the receive signals are generated for one set of detectors at a time, the sets of detectors being offset with respect to each other along a second dimension of the array substantially orthogonal to the first dimension of the array, wherein each detector in a set of detectors comprises multiple regions, a first region of each detector receiving a return optical signal at a first time and a second region of each detector receiving another return optical signal at a second time later than the first time, wherein the first and second times occur during different sweeps of the array; and a processor coupled to the receiver for receiving the receive signals and processing the receive signals to generate detections of one or more objects in the region.

2. The LiDAR detection system of claim 1, wherein the first portion of the return optical signals blocked by the mask are from at least one portion of the region that is not illuminated by the output optical signals.

3. The LiDAR detection system of claim 1, wherein the mask is located at or near a focal plane of a receiving lens in the receiver.

4. The LiDAR detection system of claim 1, wherein the scanning device comprises a scanning mirror for scanning the transmitted output optical signals at varying angles into the region.

5. The LiDAR detection system of claim 4, wherein the scanning mirror is a micro-electromechanical (MEMS) scanning mirror.

6. The LiDAR detection system of claim 1, wherein the transmitted output optical signals are frequency-modulated continuous-wave (FMCW) signals.

7. The LiDAR detection system of claim 1, wherein the transmitted output optical signals are pulsed signals.

8. The LiDAR detection system of claim 1, wherein the optical sources comprise lasers.

9. The LiDAR detection system of claim 1, wherein the LIDAR detection system is an automotive LiDAR detection system.

10. The LiDAR detection system of claim 1, wherein the array of optical detectors comprises at least one silicon photomultiplier (SiPM) detector.

11. The LiDAR detection system of claim 1, wherein the array of optical detectors comprises at least one avalanche photodiode detector (APD).

12. The LiDAR detection system of claim 1, wherein the array of optical detectors comprises at least one multi-pixel photon counter (MPPC) detector.

13. The LiDAR detection system of claim 1, wherein the optical transmission elements comprise at least one optical element which shapes the output optical signals such that the divergence of each output optical signal is substantially reduced or minimized.

14. The LiDAR detection system of claim 1, wherein the optical transmission elements comprise lasers.

15. The LiDAR detection system of claim 1, wherein the LiDAR detection system is an automotive LiDAR detection system.

16. The LiDAR detection system of claim 1, wherein the LiDAR detection system is a biaxial system.

17. The LiDAR detection system of claim 1, wherein the LiDAR detection system is a coaxial system.

* * * * *